(12) United States Patent
Seymour et al.

(10) Patent No.: US 10,649,636 B2
(45) Date of Patent: May 12, 2020

(54) SYSTEMS AND METHODS FOR ENABLING LOW-VISION USERS TO INTERACT WITH A TOUCH-SENSITIVE SECONDARY DISPLAY

(71) Applicant: Apple Inc., Cupertino, CA (US)

(72) Inventors: Eric T. Seymour, San Jose, CA (US); Gregory F. Hughes, Cupertino, CA (US); James P. Craig, San Francisco, CA (US); Susumu Harada, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 351 days.

(21) Appl. No.: 15/791,251

(22) Filed: Oct. 23, 2017

(65) Prior Publication Data

US 2018/0113600 A1    Apr. 26, 2018

Related U.S. Application Data

(60) Provisional application No. 62/412,752, filed on Oct. 25, 2016.

(51) Int. Cl.
*G06F 3/0484* (2013.01)
*G06F 3/0488* (2013.01)
(Continued)

(52) U.S. Cl.
CPC ........ *G06F 3/04845* (2013.01); *G06F 1/1692* (2013.01); *G06F 3/0236* (2013.01);
(Continued)

(58) Field of Classification Search
CPC ................. G06F 3/048485; G06F 3/04845
(Continued)

(56) References Cited

U.S. PATENT DOCUMENTS 9,106,553 B2\*  8/2015  Wong ...................... H04L 41/12
9,965,035 B2\*  5/2018  Santamaria ............. G06F 3/016
(Continued)

FOREIGN PATENT DOCUMENTS

CN      103513879 A      1/2014
CN      104137048 A      11/2014
(Continued)

OTHER PUBLICATIONS

Microsoft, "UIST 2010 Student Innovation Contest", Proceedings of the 2000 ACM SIGCRP Conference, Chicago, IL, Apr. 6-8, 2000, https://www.archive.org/web/20100815221235/https://www.microsoft.com/appliedsciences/content/projects/uist.aspx, 2 pages.
(Continued)

*Primary Examiner* — William D Titcomb
(74) *Attorney, Agent, or Firm* — Morgan, Lewis & Bockius LLP

(57) ABSTRACT

Disclosed herein are systems and methods that enable low-vision users to interact with touch-sensitive secondary displays. An example method includes: displaying, on a primary display, a first user interface for an application and displaying, on a touch-sensitive secondary display, a second user interface that includes a plurality of application-specific affordances that control functions of the application. Each respective affordance is displayed with a first display size. The method also includes: detecting, via the secondary display, an input that contacts at least one application-specific affordance. In response to detecting the input and while it remains in contact with the secondary display, the method includes: (i) continuing to display the first user interface on the primary display and (ii) displaying, on the primary display, a zoomed-in representation of the at least one application-specific affordance. The zoomed-in repre-
(Continued)

sentation is displayed with a second display size that is larger than the first display size.

39 Claims, 35 Drawing Sheets

(51) Int. Cl.
  *G09B 21/00* (2006.01)
  *G06F 1/16* (2006.01)
  *G06F 3/023* (2006.01)
(52) U.S. Cl.
  CPC ........ *G06F 3/0238* (2013.01); *G06F 3/04847* (2013.01); *G06F 3/04883* (2013.01); *G06F 3/04886* (2013.01); *G09B 21/008* (2013.01); *G06F 2203/04806* (2013.01)
(58) Field of Classification Search
  USPC ........................................................ 715/761
  See application file for complete search history.

(56) References Cited

U.S. PATENT DOCUMENTS

| | | | |
|---|---|---|---|
| 2002/0191029 | A1 | 12/2002 | Gillespie et al. |
| 2007/0013722 | A1 | 1/2007 | Souza |
| 2007/0152978 | A1 | 7/2007 | Kocienda et al. |
| 2009/0027347 | A1 | 1/2009 | Wakefield et al. |
| 2009/0259926 | A1* | 10/2009 | Deliyannis .......... G06F 17/2288 715/205 |
| 2009/0315867 | A1* | 12/2009 | Sakamoto ........... G06F 3/03547 345/184 |
| 2010/0081375 | A1* | 4/2010 | Rosenblatt ............ G08C 17/02 455/41.1 |
| 2011/0047459 | A1* | 2/2011 | Van Der Westhuizen ................... G06F 1/1692 715/702 |
| 2011/0210922 | A1 | 9/2011 | Griffin |
| 2011/0225544 | A1 | 9/2011 | Demar et al. |
| 2012/0226983 | A1* | 9/2012 | Goldenberg .......... G06F 3/0481 715/724 |
| 2013/0050090 | A1* | 2/2013 | Stewart ............... G06F 3/04886 345/168 |
| 2014/0100740 | A1* | 4/2014 | Chutorash .......... G01C 21/3661 701/36 |
| 2014/0191948 | A1* | 7/2014 | Kim ..................... G06F 3/0483 345/156 |
| 2014/0232944 | A1 | 8/2014 | Walker |
| 2014/0327621 | A1 | 11/2014 | Faggin et al. |

FOREIGN PATENT DOCUMENTS

| | | |
|---|---|---|
| CN | 104679334 A | 6/2015 |
| CN | 104965583 A | 10/2015 |
| CN | 105573656 A | 5/2016 |
| JP | 2005352924 | 12/2005 |
| WO | WO 2014/197339 A1 | 12/2014 |

OTHER PUBLICATIONS

Savov, "The MacBook OLED Touch Bar Rumor Has Been Turned Into a Cool 3D Concept: the Verge", https://web.archive.org/web/20160627230554/https://www.theverge.com/circuitbreaker/2016/6/10/11901930/macbook-pro-oled-touch-bar-3d-concept-rumor, Jun. 10, 2016, 4 pages.
YouTube, "2016 MacBook Pro's OLED Touch Bar Spy Photos!", https://www.youtube.com/watch?v=-X17Cq7HpSk&1c=UgiyoiY71G7WW3gCoAEC, Jun. 1, 2016, 4 pages.
YouTube, "UIST Student Innovation Contest 2010 Concept Overview", https://www.youtube.com/watch?v=ojusRO38Tdc, Aug. 9, 2010, 7 pages.
Innovation Patent, dated Nov. 8, 2017, received in Australian Patent Application No. 2017101426, which corresponds with U.S. Appl. No. 15/791,251, 1 page.
Office Action, dated Dec. 12, 2017, received in Australian Patent Application No. 2017101426, which corresponds with U.S. Appl. No. 15/791,251, 6 pages.
Office action, dated Oct. 27, 2017, received in Danish Patent Application No. 201770595, which corresponds with U.S. Appl. No. 15/791,251, 11 pages.
Office action, dated Feb. 26, 2018, received in Danish Patent Application No. 201770595, which corresponds with U.S. Appl. No. 15/791,251, 3 pages.
Invitation to Pay Additional Fees, dated Feb. 13, 2018, received in International Patent Application No. PCT/US2017/058075, which corresponds with U.S. Appl. No. 15/791,251, 22 pages.
Patent, dated Jan. 8, 2019, received in Danish Patent Application No. 201770595, which corresponds with U.S. Appl. No. 15/791,251, 5 pages.
International Search Report and Written Opinion, dated Apr. 6, 2018, received in International Patent Application No. PCT/US2017/058075, which corresponds with U.S. Appl. No. 15/791,251, 22 pages.
Office Action, dated Apr. 20, 2018, received in Danish Patent Application No. 201770595, which corresponds with U.S. Appl. No. 15/791,251, 2 pages.
Notice of Allowance, dated Jul. 26, 2018, received in Danish Danish Patent Application No. 201770595, which corresponds with U.S. Appl. No. 15/791,251, 2 pages.
Office Action, dated Oct. 24, 2019, received in Chinese Patent Application No. 201711007537.0, which corresponds with U.S. Appl. No. 15/791,251, 8 pages.

\* cited by examiner

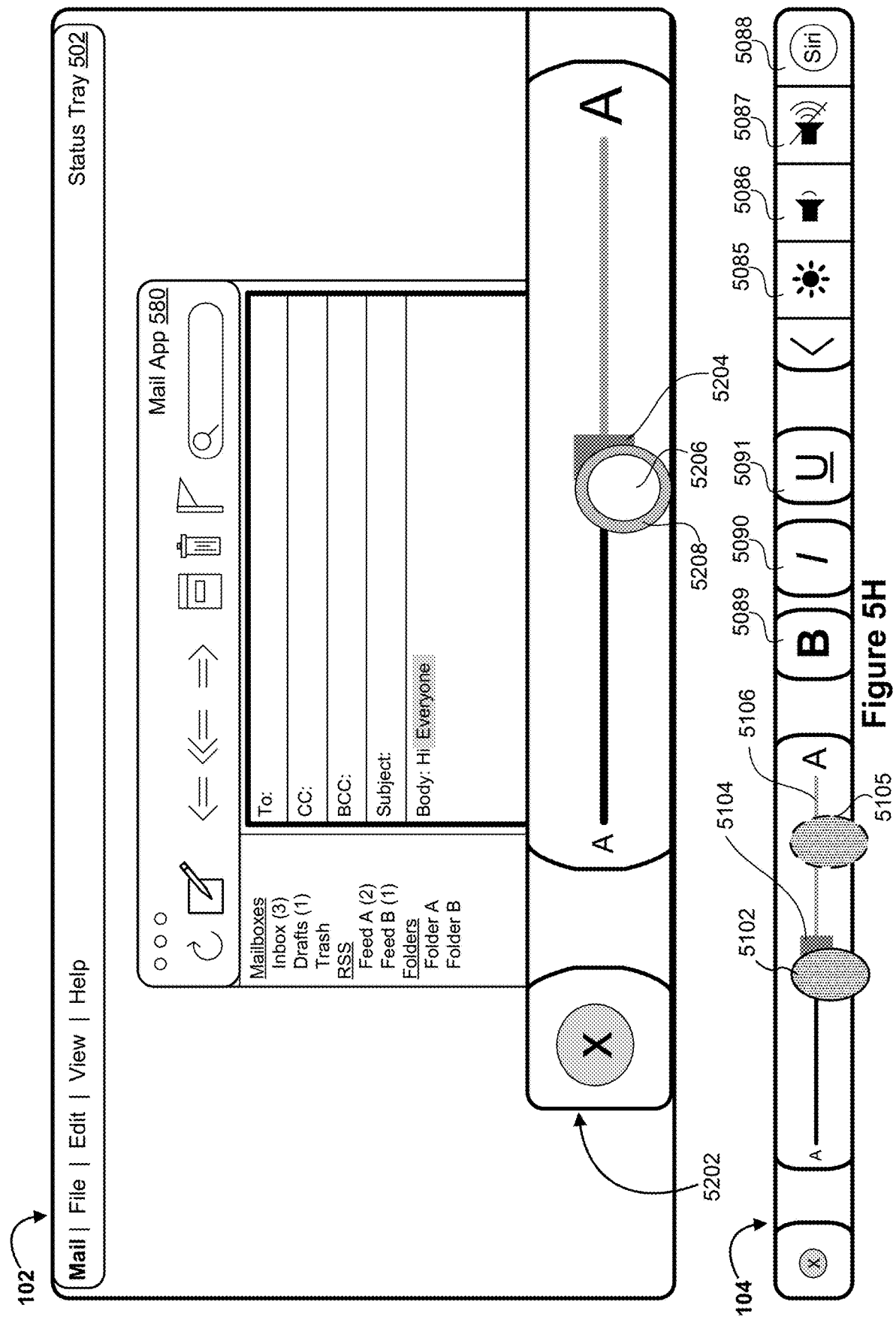

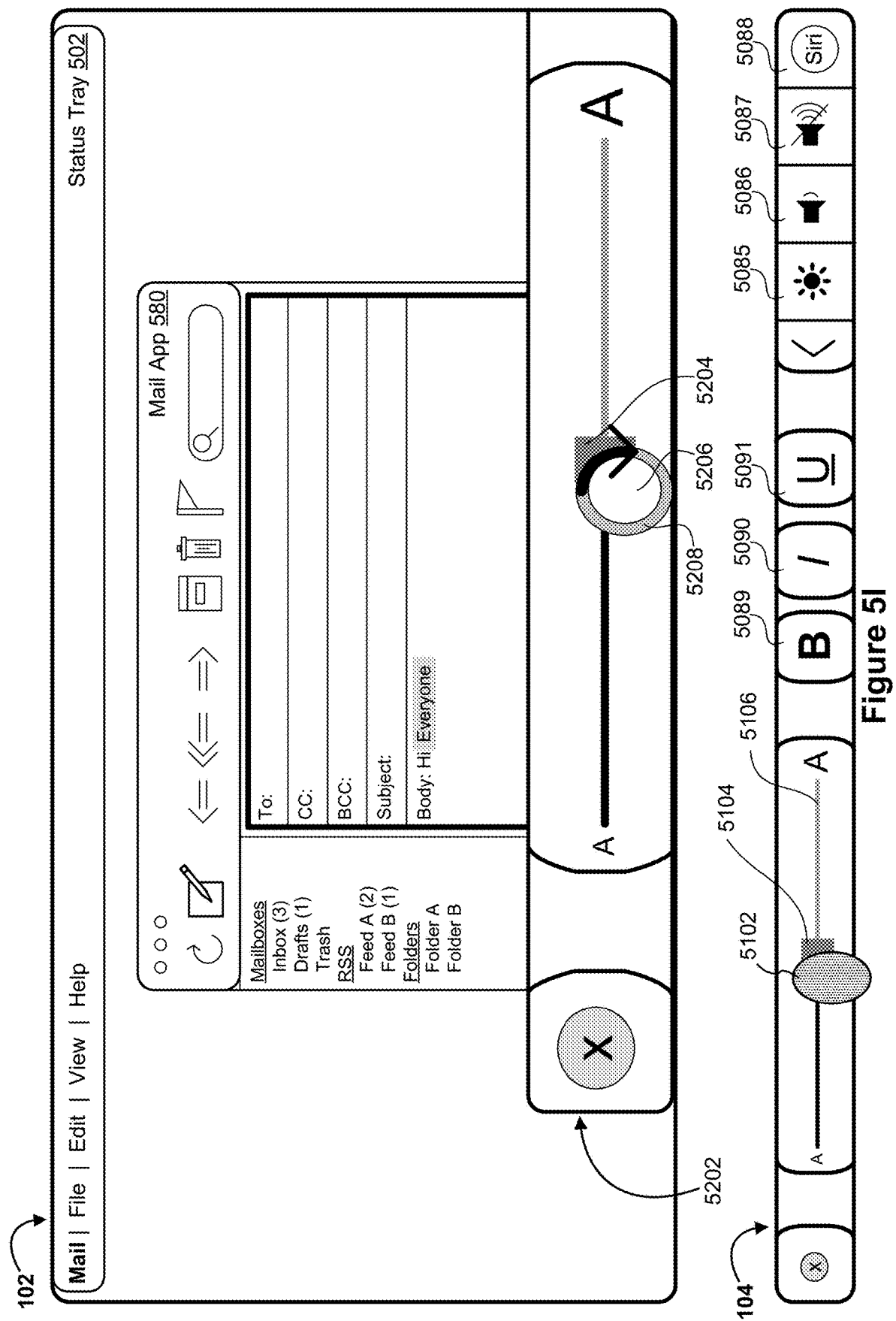

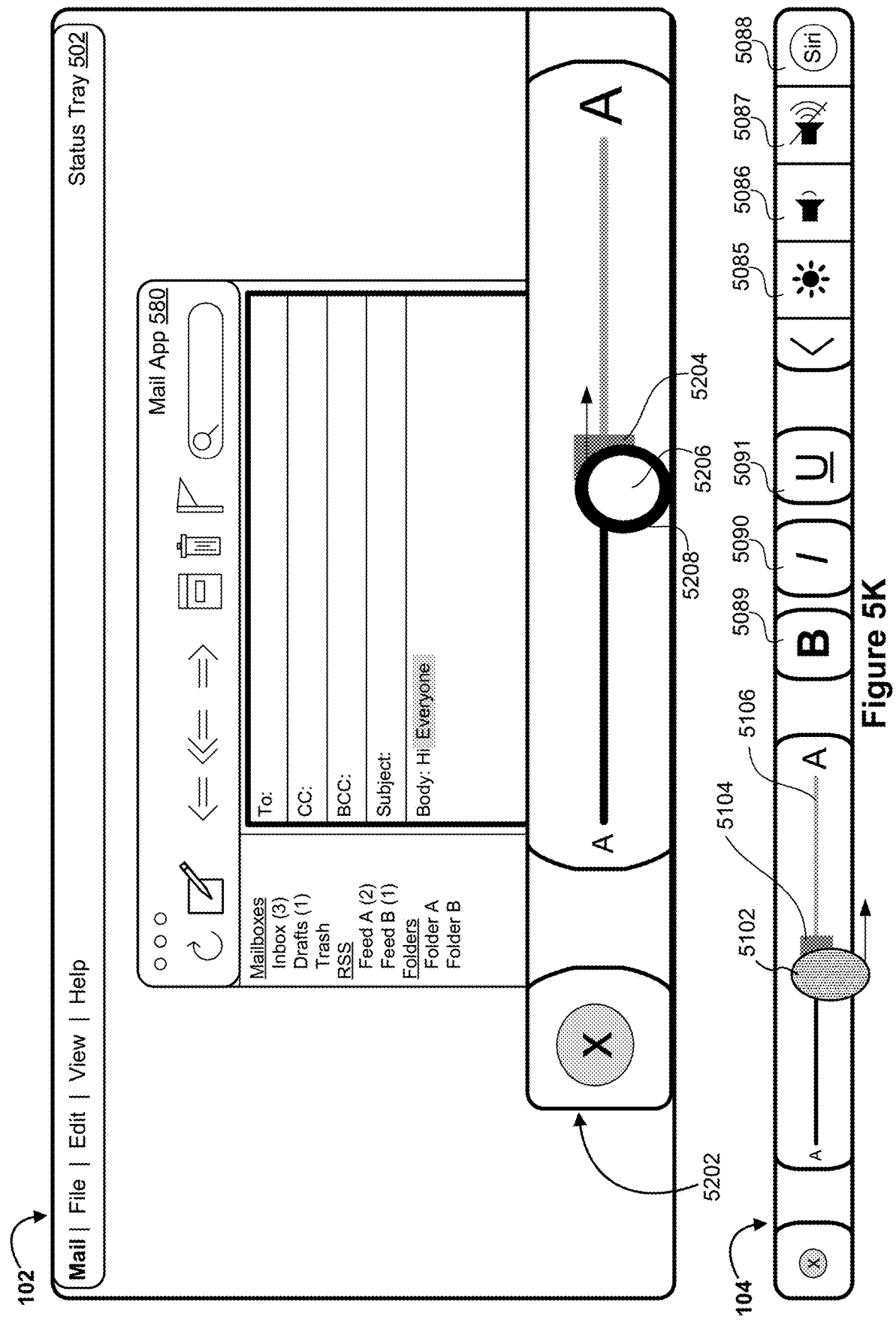

600

```
┌─────────────────────────────────────────────────────────────┐
│ At a computing system with one or more processors, a first  │──602
│ housing that includes a primary display, memory, and a      │
│ second housing at least partially containing a              │
│ touch-sensitive secondary display that is distinct from the │
│ primary display                                             │
│ ┌─────────────────────────────────────────────────────────┐ │──604
│ │ The second housing also at least partially contains a   │ │
│ │ physical keyboard                                       │ │
│ └─────────────────────────────────────────────────────────┘ │
│ ┌─────────────────────────────────────────────────────────┐ │──606
│ │ The second housing is not connected to the first housing│ │
│ │ ┌─────────────────────────────────────────────────────┐ │ │──608
│ │ │ The second housing is part of a wearable computing  │ │ │
│ │ │ device                                              │ │ │
│ │ └─────────────────────────────────────────────────────┘ │ │
│ └─────────────────────────────────────────────────────────┘ │
└─────────────────────────────────────────────────────────────┘
                              ↓
┌─────────────────────────────────────────────────────────────┐
│ Display, on the primary display, a first user interface for │──610
│ an application                                              │
└─────────────────────────────────────────────────────────────┘
                              ↓
┌─────────────────────────────────────────────────────────────┐
│ Display, on the touch-sensitive secondary display, a second │──612
│ user interface that includes a plurality of                 │
│ application-specific affordances that control functions     │
│ available within the application, and each of the plurality │
│ of application-specific affordances is displayed with a     │
│ first display size                                          │
│ ┌─────────────────────────────────────────────────────────┐ │──614
│ │ Each of the plurality of application-specific          │ │
│ │ affordances is only selectable via one or more inputs  │ │
│ │ at the touch-sensitive secondary display               │ │
│ └─────────────────────────────────────────────────────────┘ │
└─────────────────────────────────────────────────────────────┘
                              ↓
┌─────────────────────────────────────────────────────────────┐
│ Detect, via the touch-sensitive secondary display, an input │──616
│ that contacts at least one application-specific affordance  │
│ of the plurality of application-specific affordances        │
└─────────────────────────────────────────────────────────────┘
                              ↓
┌─────────────────────────────────────────────────────────────┐
│ In response to detecting the input and while the input      │──618
│ remains in contact with the touch-sensitive secondary       │
│ display:                                                    │
│                                                             │
│   (i) Continue to display, on the primary display, the      │
│   first user interface for the application and              │
│                                                             │
│   (ii) Display, on the primary display, a zoomed-in         │
│   representation of the at least one application-specific   │
│   affordance, wherein the zoomed-in representation of the   │
│   at least one application-specific affordance is displayed │
│   with a second display size that is larger than the first  │
│   display size                                              │
│                            (A)                              │
└─────────────────────────────────────────────────────────────┘
                              ↓
                             (B)

```
While the input remains in contact with the at least one application-specific     ⌐632
affordance at the touch-sensitive secondary display, detect a tap gesture at
the touch-sensitive secondary display that does not contact the at least one
application-specific affordance; and
In response to detecting the tap gesture, activate the at least one application-
specific affordance
```

```
Detect, at the touch-sensitive secondary display, a predefined gesture that       ⌐634
manipulates a zoom level that is used to display the zoomed-in representation
of the at least one application-specific affordance at the primary display; and
In response to detecting the predefined gesture, update the zoomed-in
representation at the primary display as the zoom level is manipulated using
the predefined gesture
```

702 — At a computing system with one or more processors, a first housing that includes a primary display, memory, and a second housing at least partially containing a touch-sensitive secondary display that is distinct from the primary display

704 — The second housing also at least partially contains a physical keyboard

706 — The second housing is not connected to the first housing

708 — The second housing is part of a wearable computing device

710 — Operate the touch-sensitive secondary display in an accessibility mode

712 — While operating the touch-sensitive secondary display in the accessibility mode:

714 — Display, on the primary display, a first user interface for an application

716 — Display, on the touch-sensitive secondary display, a second user interface that includes a plurality of application-specific affordances that control functions available within the application and at least one system-level affordance that controls a system-level function. Each respective affordance is displayed with a first display size

718 — Each respective affordance is only selectable via one or more inputs at the secondary display

720 — Detect, via the touch-sensitive secondary display, an input that contacts at least one application-specific affordance of the plurality of application-specific affordances

722 — In response to detecting the input and while the input remains in contact with the touch-sensitive secondary display:

(i) Continue to display, on the primary display, the first user interface for the application and (ii) Display, on the primary display, a zoomed-in representation of the at least one application-specific affordance, wherein the zoomed-in representation of the at least one application-specific affordance is displayed with a second display size that is larger than the first display size (A)

```
While the input remains in contact with the at least one application-specific      736
affordance at the touch-sensitive secondary display, detect a tap gesture at
the touch-sensitive secondary display that does not contact the at least one
application-specific affordance; and In response to detecting the tap gesture, activate the at least one application-
specific affordance
```

```
Detect, at the touch-sensitive secondary display, a predefined gesture that        738
manipulates a zoom level that is used to display the zoomed-in representation
of the at least one application-specific affordance at the primary display; and In response to detecting the predefined gesture, update the zoomed-in
representation at the primary display as the zoom level is manipulated using
the predefined gesture
```

802 — At a computing system with one or more processors, a first housing that includes a primary display, memory, and a second housing at least partially containing a touch-sensitive secondary display that is distinct from the primary display

804 — The second housing also at least partially contains a physical keyboard

806 — The second housing is not connected to the first housing

808 — The second housing is part of a wearable computing device

↓

810 — Display, on the primary display, a first user interface for an application

↓

812 — Display, on the touch-sensitive secondary display, a second user interface that includes (i) a plurality of application-specific affordances that control functions available within the application and (ii) at least one system-level affordance that controls a system-level function

814 — Each respective affordance is only selectable via one or more inputs at the touch-sensitive secondary display

↓

816 — Detect, via the touch-sensitive secondary display, an input that contacts at least one application-specific affordance of the plurality of application-specific affordances

↓

818 — In response to detecting the input and while it remains in contact with the secondary display:

(i) Continue to display, on the primary display, the first user interface for the application and (ii) Display, on the primary display, a zoomed-in representation of the at least one application-specific affordance

↓

820 — While the input remains in contact with the touch-sensitive secondary display:

(i) Detect, via the touch-sensitive secondary display, a second input that is not over the first application-specific affordance;
   (ii) In response to detecting the second input, activate the first application-specific affordance (A)

```
┌─────────────────────────────────────────────────────────────────┐ ⌐834
│ Detect, at the touch-sensitive secondary display, a predefined gesture that │
│ manipulates a zoom level that is used to display the zoomed-in representation │
│ of the at least one application-specific affordance at the primary display; and │
│                                                                 │
│ In response to detecting the predefined gesture, update the zoomed-in │
│ representation at the primary display as the zoom level is manipulated using │
│ the predefined gesture.                                         │
└─────────────────────────────────────────────────────────────────┘
```

Figure 8C

SYSTEMS AND METHODS FOR ENABLING LOW-VISION USERS TO INTERACT WITH A TOUCH-SENSITIVE SECONDARY DISPLAY

RELATED APPLICATIONS

This application claims priority to U.S. Provisional Application Ser. No. 62/412,752, filed Oct. 25, 2016, which is herein incorporated by reference in its entirety.

TECHNICAL FIELD

The disclosed embodiments relate to touch-sensitive secondary display devices and, more specifically, to improved techniques for enabling low-vision users to interact with touch-sensitive secondary displays.

BACKGROUND

Occlusion problems often prevent many users from appreciating and using features available through touch-sensitive input devices that are also used to display affordances. For example, users of touch-sensitive secondary displays that may be located above a physical keyboard may not be able to view certain affordances because their fingers are occluding or covering up the affordances while they are displayed at a secondary display. Moreover, the affordances displayed in such secondary displays are often small. These problems are particularly acute for low-vision users, who may have difficulties seeing certain affordances that are displayed at a secondary display, and these difficulties are worsened and amplified by the aforementioned occlusion problems.

SUMMARY

The embodiments described herein address the above shortcomings by providing devices and methods that seamlessly offer zoomed-in representations of affordances at a primary display, in response to user interactions at a touch-sensitive secondary display device, thereby enabling low-vision users to interact with touch-sensitive secondary displays (i.e., these users are now able to view a zoomed-in representation at the primary display and then determine appropriate inputs to provide at the secondary display). Such devices and methods also reduce the amount of mode switching (e.g., moving one's hands between keyboard and mouse, and also moving one's eyes from keyboard to display) required of a user and thereby reduce the number of inputs required to activate a desired function (e.g., number of inputs required to select menu options is reduced, as explained in more detail below). Such devices and methods also make more information available on a limited screen (e.g., a touch-sensitive secondary display is used to provide more information to a user and this information is efficiently presented using limited screen space). Such devices and methods also provide improved man-machine interfaces, e.g., by providing emphasizing effects to make information more discernable on a touch-sensitive secondary display, by providing sustained interactions so that successive inputs from a user directed to either a touch-sensitive secondary display or a primary display cause the device to provide outputs which are then used to facilitate further inputs from the user (e.g., affordances are displayed at the touch-sensitive secondary display that allow users to quickly preview how information will be rendered on a primary display, by providing inputs at the touch-sensitive secondary display, as discussed below), and by requiring fewer interactions from users to achieve desired results. In some instances, the touch-sensitive secondary display is also referred to herein as a dynamic function row (and vice versa). For these reasons and those discussed below, the devices and methods described herein reduce power usage and improve battery life of electronic devices.

In accordance with some embodiments, a method is performed at a computing system with one or more processors, a first housing that includes a primary display, memory, and a second housing (that is distinct from the first housing) at least partially containing a touch-sensitive secondary display that is distinct from the primary display (as discussed below, the second housing and the touch-sensitive secondary display may be components of any device that includes a smaller display than that of the primary display, e.g., the touch-sensitive secondary display is part of a wearable computing device, such as a watch, or the touch-sensitive secondary display is located above a physical keyboard in the second housing). The method includes: displaying, on the primary display, a first user interface for an application. The method also includes: displaying, on the touch-sensitive secondary display, a second user interface that includes a plurality of application-specific affordances that control functions available within the application, where each of the plurality of application-specific affordances is displayed with a first display size. The method additionally includes: detecting, via the touch-sensitive secondary display, an input that contacts at least one application-specific affordance of the plurality of application-specific affordances. In response to detecting the input and while the input remains in contact with the touch-sensitive secondary display, the method includes: (i) continuing to display, on the primary display, the first user interface for the application and, (ii) displaying, on the primary display, a zoomed-in representation of the at least one application-specific affordance, where the zoomed-in representation of the at least one application-specific affordance is displayed with a second display size that is larger than the first display size.

In some instances, users of computing systems (in particular, low-vision users) may be unable to accurately view icons or affordances that are displayed with a small display size (such as those shown on a smart watch). Populating a touch-sensitive secondary display with application-specific affordances and then displaying a zoomed-in representation of one of those affordances at a larger, primary display in response to a single input provides these users with clear visual feedback indicating which affordance they may be selecting. Providing this improved visual feedback to the user enhances operability of the device and makes the human-machine interface more efficient (e.g., by helping the user to provide proper inputs and reducing user mistakes when operating/interacting with affordances displayed on the secondary display). Additionally, allowing these users to accurately view affordances displayed on a small screen enables a sustained interaction with the touch-sensitive secondary display that would not otherwise be possible due to frequent mistakes (e.g., incorrect selections) and the additional time and effort needed to correct those mistakes.

In accordance with some embodiments, a method is performed at a computing system with one or more processors, a first housing that includes a primary display, memory, and a second housing (that is distinct from the first housing) at least partially containing a touch-sensitive secondary display that is distinct from the primary display (as discussed below, the second housing and the touch-sensitive secondary display may be components of any device that includes a smaller display than that of the primary display, e.g., the touch-sensitive secondary display is part of a wearable computing device, such as a watch, or the touch-sensitive secondary display is located above a physical keyboard in the second housing). The method includes: operating the touch-sensitive secondary display in an accessibility mode. While operating the touch-sensitive secondary display in the accessibility mode, the method includes: displaying, on the primary display, a first user interface for an application; displaying, on the touch-sensitive secondary display, a second user interface that includes: (i) a plurality of application-specific affordances that control functions available within the application, and (ii) at least one system-level affordance that controls a system-level function, wherein each of the plurality of application-specific affordances and the at least one system-level affordance are displayed with a first display size; detecting, via the touch-sensitive secondary display, an input that contacts at least one application-specific affordance of the plurality of application-specific affordances; and in response to the detecting the input and while the input remains in contact with the touch-sensitive secondary display: (A) continuing to display, on the primary display, the first user interface for the application and (B) displaying, on the primary display, a zoomed-in representation of the at least one application-specific affordance, wherein the zoomed-in representation of the at least one application-specific affordance is displayed with a second display size that is larger than the first display size.

In some instances, low-vision users of computing systems rely on memorized key locations on a keyboard so that they are able to accurately provide inputs to a computing system. For computing systems that include a touch-sensitive secondary display with often-changing affordances (e.g., affordances that change to provide functions that are useful to a user based on what they are doing within a particular application), these users are not able to rely solely on memorization to provide accurate inputs. Displaying a zoomed-in representation of at least one affordance of the application-specific affordance improves operability of the computing system, because low-vision users are able to interact with controls available at the touch-sensitive secondary display that may be too small (or may be occluded from view because a user's finger is covering up the displayed controls) for the low-vision users to view accurately. In this way, low-vision users are able to take advantage of an improved man-machine interface by, e.g., having sustained interactions with a touch-sensitive secondary display (instead of having to constantly correct erroneous inputs).

In accordance with some embodiments, a method is performed at a computing system with one or more processors, a first housing that includes a primary display, memory, and a second housing (that is distinct from the first housing) at least partially containing a touch-sensitive secondary display that is distinct from the primary display (as discussed below, the second housing and the touch-sensitive secondary display may be components of any device that includes a smaller display than that of the primary display, e.g., the touch-sensitive secondary display is part of a wearable computing device, such as a watch, or the touch-sensitive secondary display is located above a physical keyboard in the second housing). The method includes: displaying, on the primary display, a first user interface for an application. The method also includes: displaying, on the touch-sensitive secondary display, a second user interface that includes: (i) a plurality of application-specific affordances that control functions available within the application and (ii) at least one system-level affordance that controls a system-level function. The method additionally includes: detecting, via the touch-sensitive secondary display, a first input over a first application-specific affordance of the plurality of application-specific affordances. While the first input remains in contact with the first application-specific affordance, the method includes: (i) detecting, via the touch-sensitive secondary display, a second input that is not over the first application-specific affordance and (ii) in response to detecting the second input, activating the first application-specific affordance.

Allowing activation of an affordance that is in contact with an input in response to a tap gesture that is not over the affordance (a "split-tap gesture") enhances operability of the device and makes the human-machine interface more efficient (e.g., by allowing users to place a first finger over a desired affordance and then use a different finger to perform a selection of that desired affordance, thereby ensuring that only the desired affordance is activated and helping to minimize erroneous selections/activations). Additionally, allowing users to move their first finger freely around the touch-sensitive secondary display (without selecting affordances) allows users to maintain a sustained interaction with the touch-sensitive secondary display (by exploring which affordances are displayed at the touch-sensitive secondary display), that would not otherwise be possible due to frequent mistakes (e.g., incorrect or accidental selections of affordances) and the additional time and effort needed to correct those mistakes.

In accordance with some embodiments, a computing system includes a first housing with a primary display unit configured to display user interfaces, a second housing (that is distinct from the first housing) at least partially containing a touch-sensitive secondary display that is distinct from the primary display and that is configured to receive user inputs and to display user interfaces, and a processing unit that is in communication with the primary display unit and the touch-sensitive secondary display unit. The processing unit is configured to: display, on the primary display, a first user interface for an application; display, on the touch-sensitive secondary display, a second user interface that includes a plurality of application-specific affordances that control functions available within the application, and each of the plurality of application-specific affordances is displayed with a first display size; detect, via the touch-sensitive secondary display, an input that contacts at least one application-specific affordance of the plurality of application-specific affordances; and in response to detecting the input and while the input remains in contact with the touch-sensitive secondary display: (i) continue to display, on the primary display, the first user interface for the application and (ii) display, on the primary display, a zoomed-in representation of the at least one application-specific affordance, wherein the zoomed-in representation of the at least one application-specific affordance is displayed with a second display size that is larger than the first display size.

In accordance with some embodiments, a computing system includes a first housing with a primary display unit configured to display user interfaces, a second housing (that is distinct from the first housing) at least partially containing a touch-sensitive secondary display that is distinct from the primary display and that is configured to receive user inputs and to display user interfaces, and a processing unit that is in communication with the primary display unit and the touch-sensitive secondary display unit. The processing unit is configured to: operate the touch-sensitive secondary display in an accessibility mode; while operating the touch-sensitive secondary display in the accessibility mode: display, on the primary display, a first user interface for an application; display, on the touch-sensitive secondary display, a second user interface that includes: (i) a plurality of application-specific affordances that control functions available within the application and (ii) at least one system-level affordance that controls a system-level function, wherein each of the plurality of application-specific affordances and the at least one system-level affordance are displayed with a first display size; detect, via the touch-sensitive secondary display, an input that contacts at least one application-specific affordance of the plurality of application-specific affordances; and in response to the detecting the input and while the input remains in contact with the touch-sensitive secondary display: (A) continue to display, on the primary display, the first user interface for the application and (B) display, on the primary display, a zoomed-in representation of the at least one application-specific affordance, wherein the zoomed-in representation of the at least one application-specific affordance is displayed with a second display size that is larger than the first display size.

In accordance with some embodiments, a computing system includes a first housing with a primary display unit configured to display user interfaces, a second housing (that is distinct from the first housing) at least partially containing a touch-sensitive secondary display that is distinct from the primary display and that is configured to receive user inputs and to display user interfaces, and a processing unit that is in communication with the primary display unit and the touch-sensitive secondary display unit. The processing unit is configured to: display, on the primary display, a first user interface for an application; display, on the touch-sensitive secondary display, a second user interface that includes: (i) a plurality of application-specific affordances that control functions available within the application and (ii) at least one system-level affordance that controls a system-level function; detect, via the touch-sensitive secondary display, a first input over a first application-specific affordance of the plurality of application-specific affordances; and while the first input remains in contact with the first application-specific affordance: (i) detect, via the touch-sensitive secondary display, a second input that is not over the first application-specific affordance and (ii) in response to detecting the second input, activate the first application-specific affordance.

In accordance with some embodiments, a computing system includes one or more processors, a first housing with a primary display, a second housing at least partially containing a touch-sensitive secondary display that is distinct from the primary display and optionally containing one or more sensors to detect intensity of contacts with the touch-sensitive secondary surface, and memory storing one or more programs, the one or more programs configured for execution by the one or more processors and the one or more programs include instructions for performing or causing performance of the operations of any of the methods described herein. In accordance with some embodiments, a computer-readable storage medium has stored therein instructions that, when executed by the computing system, cause the computing system to perform or cause performance of the operations of any of the methods described herein. In accordance with some embodiments, a graphical user interface on the primary display of the computing system is provided, and the graphical user interface includes one or more of the elements displayed in any of the methods described herein, which are updated in response to inputs, as described in any of the methods described herein. In accordance with some embodiments, the computing system includes means for performing or causing performance of the operations of any of the methods described herein. In accordance with some embodiments, an information processing apparatus, for use in the computing system, includes means for performing or causing performance of the operations of any of the methods described herein.

Thus, computing systems that include both primary and touch-sensitive secondary displays are provided with faster, more efficient and usable/user-friendly methods and interfaces for enabling low-vision users to interact with affordances displayed at touch-sensitive secondary displays, thereby improving operability of the computing system by, e.g., allowing users to have sustained interactions with the touch-sensitive secondary display.

BRIEF DESCRIPTION OF DRAWINGS

For a better understanding of the various described embodiments, reference should be made to the Description of Embodiments below, in conjunction with the following drawings in which like reference numerals refer to corresponding parts throughout the figures.

FIGS. 6A-6C show a flowchart of a method of enabling low-vision users to interact with touch-sensitive secondary displays, in accordance with some embodiments.

FIGS. 7A-7C show a flowchart of a method of enabling low-vision users to interact with touch-sensitive secondary displays, in accordance with some embodiments.

FIGS. 8A-8C show a flowchart of a method of enabling low-vision users to interact with touch-sensitive secondary displays, in accordance with some embodiments.

DESCRIPTION OF EMBODIMENTS

Figure 1A:
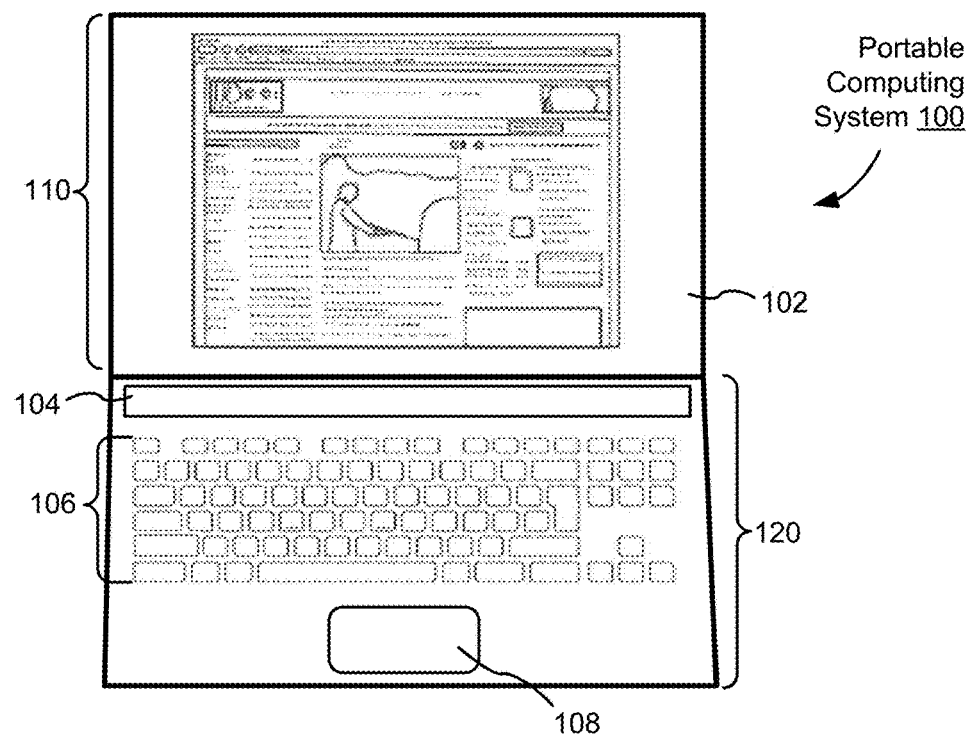
FIG. 1A is an illustrative diagram of a portable computing system (e.g., a laptop computer), in accordance with some embodiments.

FIGS. 1A-1B, 2A-2D, 3A-3E, and 4 provide a description of example devices. FIGS. 5A-5N are schematics of a display used to illustrate example user interfaces for enabling low-vision users to interact with touch-sensitive secondary displays. FIGS. 6A-6C, 7A-7C, and 8A-8C are flowcharts of methods of enabling low-vision users to interact with touch-sensitive secondary displays. The user interfaces in FIGS. 5A-5N are used to illustrate the methods and/or processes in FIGS. 6A-6C, 7A-7C, and 8A-8C.

Example Devices and Systems

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1B:
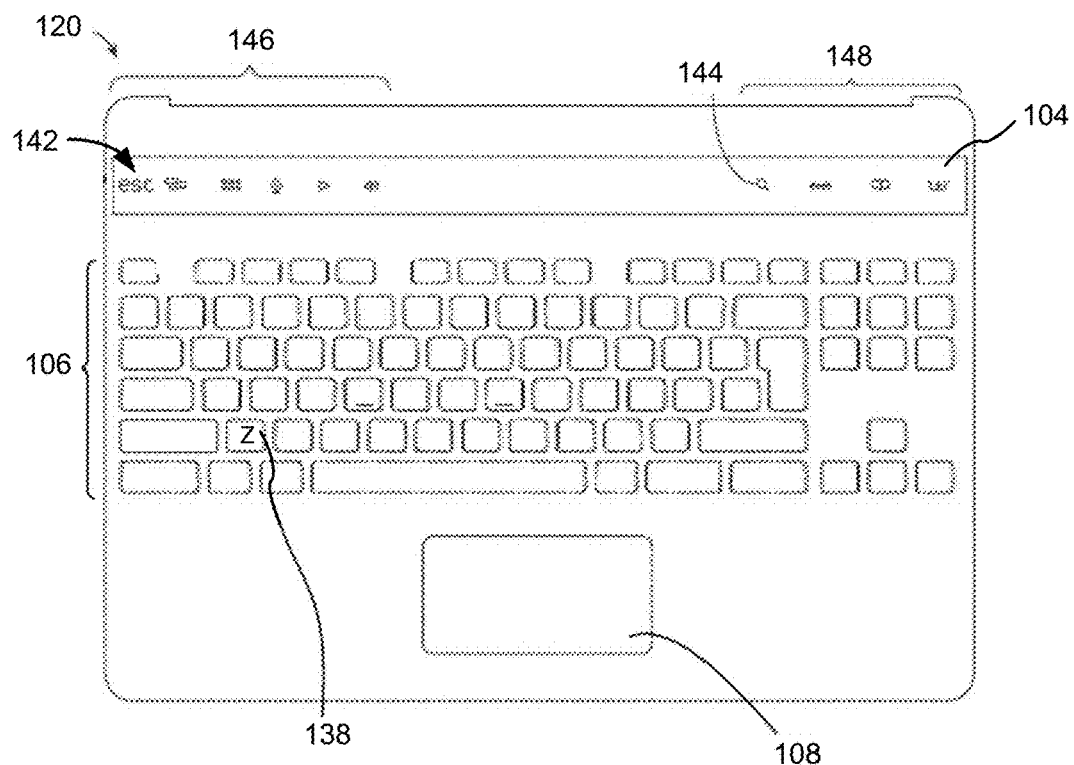
FIG. 1B is an illustrative diagram of a body portion of the portable computing system in FIG. 1A, in accordance with some embodiments.

FIG. 1A is an illustrative diagram of a portable computing system 100, in accordance with some embodiments. Portable computing system 100 may be, for example, a laptop computer, such as a MACBOOK® device, or any other portable computing device. Portable computing system 100 includes: (A) a display portion 110 (also referred to herein as a first housing 110 or housing 110) with a primary display 102; and (B) a body portion 120 (also referred to as a second housing 120 or housing 120) with a dynamic function row 104, a set of physical (i.e., movably actuated) keys 106, and a touchpad 108 partially contained within a same housing. Display portion 110 is typically mechanically, electrically, and communicatively coupled with body portion 120 of portable computing system 100. For example, portable computing system 100 may include a hinge, allowing display portion 110 to be rotated relative to body portion 120. Portable computing system 100 includes one or more processors and memory storing one or more programs for execution by the one or more processors to perform any of the embodiments described herein. In some embodiments, dynamic function row 104, which is described in more detail with reference to FIG. 1B, is a touch screen display using resistive sensing, acoustic sensing, capacitive sensing, optical sensing, infrared sensing, or the like to detect user touch inputs and selections. In some embodiments, primary display 102 of display portion 110 is also a touch screen display.

FIG. 1B is an illustrative diagram of body portion 120 of portable computing system 100 in accordance with some embodiments. Body portion 120 includes a set of physical keys 106 (also referred to herein as "physical keys 106" and "keyboard 106"), a dynamic function row 104, and a touchpad 108 partially contained within a same housing. In some embodiments, dynamic function row 104, which is a touch screen, replaces a function row of the set of physical keys 106 allowing the space consumed by the set of physical keys 106 to be reduced, allowing for a smaller overall body portion 120 or allowing other portions, such as touchpad 108, to be larger. In some embodiments, dynamic function row 104 is approximately 18 inches in length relative to a major dimension of the set of physical keys 106. Although called a "row" for ease of explanation, in some other embodiments, the touch screen comprising dynamic function row 104 in FIG. 1A may take any other form such as a square, circle, a plurality of rows, column, a plurality of columns, a plurality of separate sectors, or the like. Although FIGS. 1A-1B show dynamic function row 104 replacing the function row of the set of physical keys 106, in some other embodiments, dynamic function row 104 may additionally and/or alternatively replace a numpad section, editing/function section, or the like of the set of physical keys 106.

Each physical key of the set of physical keys 106 has at least one associated input. The input may be a printable character, non-printable character, function, or other input. The input associated with a physical key may be shown by a letter, word, symbol, or other indicia shown (e.g., printed) on the surface of the key in Latin script, Arabic characters, Chinese characters, or any other script. For example, the particular physical key indicated at 138 is associated with alphabetic character "z" as indicated by the letter z shown on the key. In another example, a physical key labeled with the word "command" may be associated with a command function. For example, the set of physical keys 106 is associated with a QWERTY, Dvorak, or other keyboard layouts with alphanumeric, numeric, and/or editing/function sections (e.g., standard, extended, or compact) according to ISO/IEC 9995, ANSI-INCITS 154-1988, JIS X 6002-1980, or other similar standards.

A signal corresponding to an input associated with a physical key may be received by the processor of portable computing system 100 (or computing device 202 in FIGS. 2A-2D or peripheral keyboard 206 in FIGS. 2A-2B) when a key has been activated by a user. In an illustrative example, each key of the set of physical keys 106 includes two plates and a spring. A user may activate a key by pressing down on the key, which compresses the spring. When the spring is compressed, the two plates may come into contact, allowing electric current to flow through the connected plates. An input corresponding to the key may be provided to a processor in response to the flow of the current through the connected plates. For example, in response to activation of one of the set of keys 106 of peripheral keyboard 206 in FIG. 2C, an input corresponding to the activated key is provided to computing device 202. It will be recognized that other systems for movably actuated keys could be used.

In some embodiments, dynamic function row 104 is a touch screen display (the dynamic function row is also referred to herein as a touch-sensitive secondary display 104) that displays one or more user-selectable symbols 142 (sometimes also herein called "user interface elements," "user interface components," "affordances," "buttons," or "soft keys"). For example, dynamic function row 104 replaces the function row keys on a typical keyboard. A user may select a particular one of the one or more user-selectable symbols 142 by touching a location on the touch screen display that corresponds to the particular one of the one or more user-selectable symbols 142. For example, a user may select the user-selectable symbol indicated by magnifying glass symbol 144 by tapping dynamic function row 104 such that the user's finger contacts dynamic function row 104 at the position of the magnifying glass indicator 214. In some embodiments, a tap contact or a tap gesture includes touch-down of a contact and lift-off of the contact within a predetermined amount of time (e.g., 250 ms or the like). In some embodiments, the touch screen display of dynamic function row 104 is implemented using resistive sensing, acoustic sensing, capacitive sensing, optical sensing, infrared sensing, or the like to detect user inputs and selections.

When a user selects a particular one of the one or more user-selectable symbols 142, a signal corresponding to the particular one of the one or more user-selectable symbols 142 is generated by dynamic function row 104. For example, when a user taps "esc" on dynamic function row 104, dynamic function row 104 transmits a signal indicating a user input corresponding to an escape function to the processor of portable computing system 100 (or computing device 202 in FIGS. 2A-2D).

In some embodiments, when a particular one of the one or more user-selectable symbols 142 is selected, dynamic function row 104 transmits a signal corresponding to a position on the touch screen display where the particular one of the one or more user-selectable symbols 142 is displayed, to the processor of portable computing system 100 (or computing device 202 in FIGS. 2A-2D). For example, dynamic function row 104 may transmit a signal including a position value (0 to 20) depending on the position on the touch screen display of the particular one of the one or more user-selectable symbols 142 that was selected. In the illustrative example of FIG. 1B, the "esc" symbol may have a position value of 0, magnifying glass symbol 144 may have a position value of 16, and so on. A processor of portable computing system 100 (or computing device 202 in FIGS. 2A-2D) may receive the signal indicating the position value of the selected user-selectable symbol and interpret the position value using contextual information, such as an element of a graphical user interface displayed on primary display 102 of display portion 110 (or peripheral display device 204, FIGS. 2A-2D) that is currently active or that has focus.

Each of the one or more user-selectable symbols 142 may include an indicator, such as a symbol (e.g., a magnifying glass symbol as shown at 144), an abbreviated word (e.g., "esc"), an unabbreviated word, a character, an image, an animated image, a video, or the like. In some embodiments, a respective one of the one or more user-selectable symbols 142 is capable of receiving user input(s).

An input may be associated with each of the one or more user-selectable symbols 142. The input may be a function, character, numerical value, and the like. A respective one of the one or more user-selectable symbols 142 may include an indicator that corresponds to the input for the respective one of the one or more user-selectable symbols 142. For example, in FIG. 1B, the user-selectable symbol with the abbreviated word "esc" indicates to the user that an escape function is associated with the user-selectable symbol. A function associated with the one or more user-selectable symbols 142 may be activated when the user selects a user-selectable symbol. For example, an escape function may be activated when a user selects the user-selectable symbol with the indicator "esc." Activation of the function may have different effects depending on the current state of portable computing system 100 (or computing device 202 in FIGS. 2A-2D). For example, when a dialog box is open on primary display 102 of display portion 110 (or peripheral display device 204, FIGS. 2A-2D), activating an escape function on dynamic function row 104 may close the dialog box. In another example, when a game application is being executed by a processor of portable computing system 100 (or computing device 202 in FIGS. 2A-2D), activating an escape function on dynamic function row 104 may pause the game.

In some embodiments, functions may be associated with combinations of movably actuated keys and/or user-selectable symbols. For example, simultaneous actuation of a command key and "c" key (i.e., command+c) may be associated with a "copy" function. In another example, simultaneous actuation of the command key and selection of the user-selectable symbol with the indicator "esc" (i.e., command+esc) may activate a function to open a particular application such as a media player application. In yet another example, simultaneous selection of two user-selectable symbols (e.g., the user-selectable symbol with the indicator "esc" and the user-selectable symbol 144 with the magnifying glass indicator) may result in activation of a function, such as a specialized search function.

In some embodiments, a first subset 146 of the one or more user-selectable symbols 142 of dynamic function row 104 may be associated with one group of functions and a second subset 148 of the one or more user-selectable symbols 142 of dynamic function row 104 may be associated with a second group of functions. For example, the user-selectable symbols in first subset 146 may be global functions (e.g., system-level functions or affordances), and the user-selectable symbols in second subset 148 may be application-specific functions. As such, the user-selectable symbols in second subset 148 change when the focus shifts from a first element of a graphical user interface displayed on primary display 102 (e.g., a first window corresponding to an Internet browser application) to a second element of the graphical user interface (e.g., a second window corresponding to an e-mail application). In contrast, the user-selectable symbols in first subset 146 are maintained when the focus shifts from the first element of the graphical user interface to the second element of the graphical user interface.

In some embodiments, the user-selectable symbols in second subset 148 are determined based on an active user interface element display on primary display 102 that is in focus. In some embodiments, the term "in focus" can refer to the active element of the user interface (e.g., a window associated with an application, a particular toolbar or menu associated with an application, or the operating system) that is currently in the foreground and actively running or is controllable by input received from a user of the computing system such as a key press, mouse click, voice command, gestural motion, or the like.

In some embodiments, the first subset 146 of the one or more user-selectable symbols 142 corresponding to global user-selectable symbols occupies a first area of dynamic function row 104 (e.g., the left half of dynamic function row 104), and the second subset 148 of the one or more user-selectable symbols 142 occupies a second area of dynamic function row 104 (e.g., the right half of dynamic function row 104). It will be realized that other proportions of dynamic function row 104 may be allocated to the first subset 146 and the second subset 148. In some embodiments, when no application has focus, the second area of dynamic function row 104 may not include any user-selectable symbols. In some embodiments, dynamic function row 104 includes three or more subsets of user-selectable symbols. In some embodiments, dynamic function row 104 includes a single set of user-selectable symbols that are not divided into subsets. While a single row of user-selectable symbols are shown in dynamic function row 104 in FIG. 1B, it will be recognized that dynamic function row 104 may include multiple rows of user-selectable symbols.

In some embodiments, the change in focus changes which element of the graphical user interface displayed on primary display 102 of display portion 110 (or peripheral display device 204, FIGS. 2A-2D) is active and which element will receive user input. The user input may be received from a keyboard, mouse, touchpad, or other user input device. Additionally and/or alternatively, in some embodiments, the change in focus changes an element that is shown in the foreground of a graphical user interface displayed on primary display 102 of display portion 110 (or peripheral display device 204, FIGS. 2A-2D).

In some embodiments, the change in focus occurs in response to user input, for example, in response to user selection of an element of a graphical user interface (e.g., a different window) displayed on primary display 102 of display portion 110 (or peripheral display device 204, FIGS. 2A-2D) or in response to user selection of a user-selectable symbol (e.g., one of the affordances/symbols displayed on dynamic function row 104). The user selection may be a key stroke, a mouse click, a mouse over, a command+tab input, or the like. In some embodiments, the change in focus occurs in response to a determination by an operating system of portable system 100 (or computing device 202 in FIGS. 2A-2D). For example, when a user closes an application window that has focus, the operating system may give focus to a different application, such as an application that had focus prior to the closed application window. In another example, when a user closes an application window that has focus, the operating system may give focus to a dialog box prompting the user to save changes made to a document via the application.

In some embodiments, the change in focus may be a change from one element associated with an application to another element associated with the same application (e.g., from an e-mail composition window of an e-mail application to an inbox list window of an e-mail application or from one tab of an Internet browser application to another tab of an Internet browser application). In some embodiments, the change in focus may be a change from an element associated with one application to an element associated with another application (e.g., from an Internet browser window to an e-mail application window). Further, in some embodiments, the change in focus may be a change from an element associated with an application to an element associated with an operating system, such as a system dialog box, a system setting control (e.g., volume control), a window associated with a file/folder navigation application (e.g., Apple Inc.'s FINDER application), etc. Additionally, focus may also be directed to a dialog box, file directory, setting control (e.g., volume control), or any other element of a graphical user interface for which information can be presented to a user and/or user input can be received.

Figure 2A:
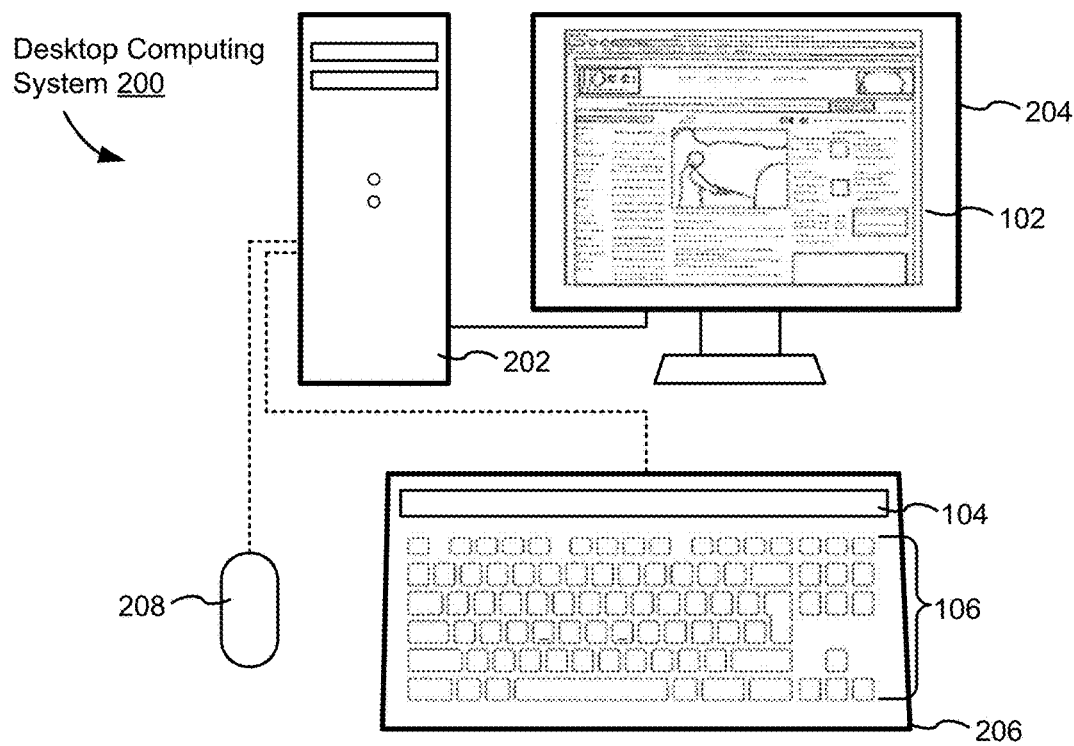
FIG. 2A is an illustrative diagram of a first implementation of a desktop computing system, in accordance with some embodiments.

FIG. 2A is an illustrative diagram of a first implementation of desktop computing system 200 in accordance with some embodiments. Desktop computing system 200 includes a computing device 202, a peripheral display device 204 with primary display 102, a peripheral keyboard 206, and a peripheral mouse 208. Computing device 202 includes one or more processors and memory storing one or more programs for execution by the one or more processors. In some embodiments, peripheral display device 204 may be integrated with computing device 202 such as an iMAC® device. In some embodiments, primary display 102 of peripheral display device 204 is a touch screen display. In FIG. 2A, peripheral display device 204 (also referred to herein as a first housing 204 or housing 204), peripheral keyboard 206, and peripheral mouse 208 are communicatively coupled to computing device 202 via a wired connection, such as USB or PS/2, or via a wireless communication link, using a communication protocol such as Bluetooth, Wi-Fi, or the like. For example, peripheral keyboard 206 (also referred to herein as second housing 206 or housing 206) is not more than fifteen feet from computing device 202 (e.g. approximately three feet away). In FIG. 2A, peripheral keyboard 206 includes dynamic function row 104 and a set of physical keys 106 at least partially contained within a same housing. In some embodiments, dynamic function row 104, which is described in more detail with reference to FIG. 1B, is a touch screen display. In some embodiments, peripheral keyboard 206 includes one or more processors and memory storing one or more programs that may be executed by the one or more processors of peripheral keyboard 206 to perform any of the embodiments described herein. In some embodiments, peripheral keyboard 206 relays signals indicating user inputs (e.g., key strokes and selections of user-selectable symbols/affordances displayed by dynamic function row 104) to computing device 202.

Figure 2B:
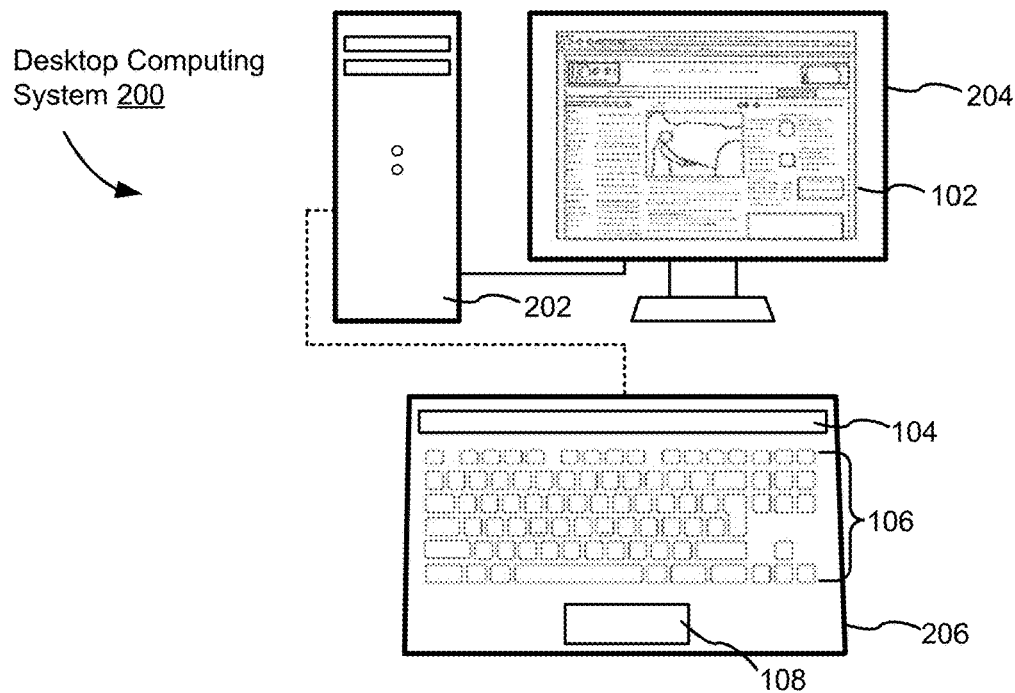
FIG. 2B is an illustrative diagram of a second implementation of a desktop computing system, in accordance with some embodiments.

FIG. 2B is an illustrative diagram of a second implementation of desktop computing system 200 in accordance with some embodiments. In FIG. 2B, desktop computing system 200 includes a computing device 202, a peripheral display device 204 with primary display 102, and a peripheral keyboard 206. In FIG. 2B, peripheral display device 204 and peripheral keyboard 206 are communicatively coupled to computing device 202 via a wired connection, such as USB or PS/2, or via a wireless communication link, using a communication protocol such as Bluetooth, Wi-Fi, or the like. In FIG. 2B, peripheral keyboard 206 includes dynamic function row 104, a set of physical keys 106, and touchpad 108 at least partially contained within a same housing. In some embodiments, dynamic function row 104, which is described in more detail with reference to FIG. 1B, is a touch screen display. In some embodiments, peripheral keyboard 206 includes one or more processors and memory storing one or more programs that may be executed by the one or more processors of peripheral keyboard 206 to perform any of the embodiments described herein. In some embodiments, peripheral keyboard 206 relays signals indicating user inputs (e.g., key strokes, user interactions with touchpad 108, and selections of user-selectable symbols/affordances displayed by dynamic function row 104) to computing device 202.

Figure 2C:
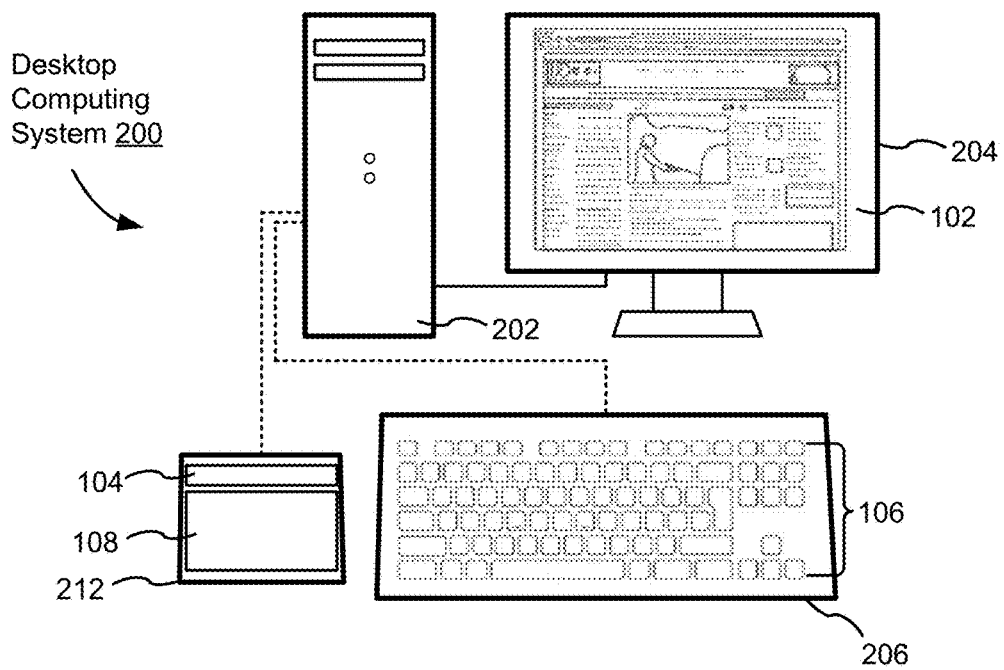
FIG. 2C is an illustrative diagram of a third implementation of a desktop computing system, in accordance with some embodiments.

FIG. 2C is an illustrative diagram of a third implementation of desktop computing system 200 in accordance with some embodiments. In FIG. 2C, desktop computing system 200 includes a computing device 202, a peripheral display device 204 with primary display 102, a peripheral keyboard 206, and a first peripheral input mechanism 212. In FIG. 2C, peripheral display device 204, peripheral keyboard 206, and the first peripheral input mechanism 212 are communicatively coupled to computing device 202 via a wired connection, such as USB or PS/2, or via a wireless communication link, using a communication protocol such as Bluetooth, Wi-Fi, or the like. In FIG. 2C, peripheral keyboard 206 includes a set of physical keys 106, and the first peripheral input mechanism 212 includes dynamic function row 104 and touchpad 108 at least partially contained within a same housing. In some embodiments, dynamic function row 104, which is described in more detail with reference to FIG. 1B, is a touch screen display. In some embodiments, the first peripheral input mechanism 212 includes one or more processors and memory storing one or more programs that may be executed by the one or more processors of the first peripheral input mechanism 212 to perform any of the embodiments described herein. In some embodiments, the first peripheral input mechanism 212 relays signals indicating user inputs (e.g., user interactions with touchpad 108 and user selections of user-selectable symbols/affordances displayed by dynamic function row 104) to computing device 202.

Figure 2D:
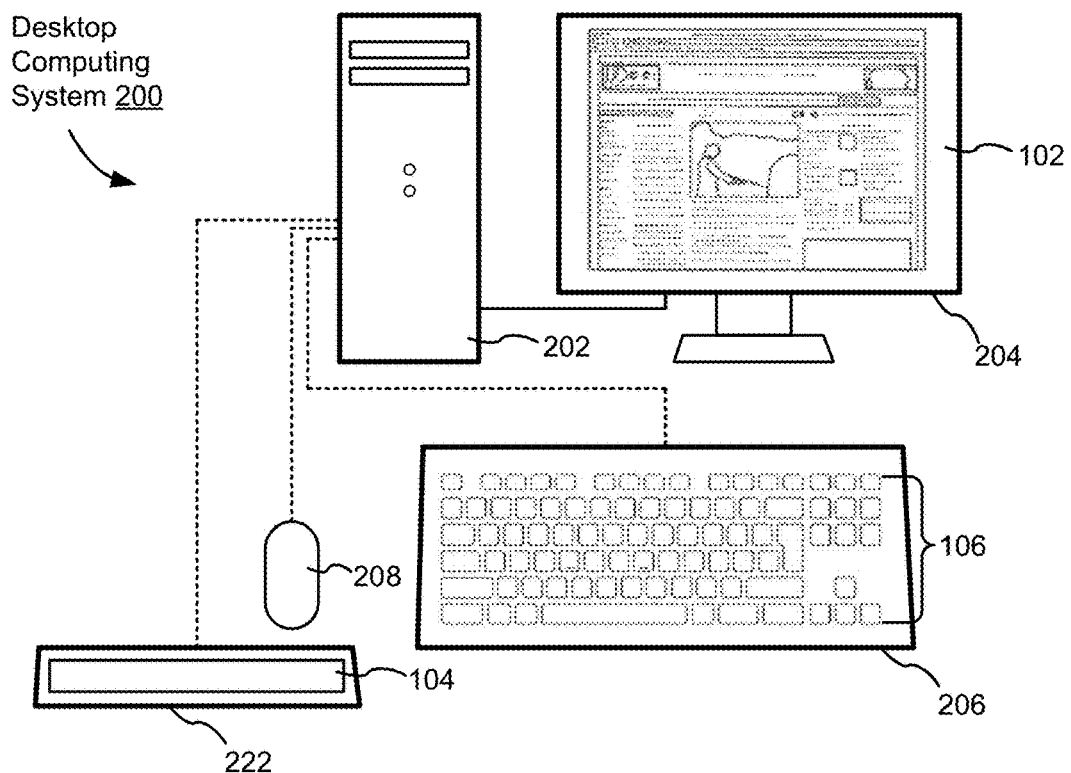
FIG. 2D is an illustrative diagram of a fourth implementation of a desktop computing system, in accordance with some embodiments.

FIG. 2D is an illustrative diagram of a fourth implementation of desktop computing system 200 in accordance with some embodiments. In FIG. 2D, desktop computing system 200 includes a computing device 202, a peripheral display device 204 with primary display 102, a peripheral keyboard 206, a peripheral mouse 208, and a second peripheral input mechanism 222. In FIG. 2D, peripheral display device 204, peripheral keyboard 206, peripheral mouse 208, and the second peripheral input mechanism 222 are communicatively coupled to computing device 202 via a wired connection, such as USB or PS/2, or via a wireless communication link, using a communication protocol such as Bluetooth, Wi-Fi, or the like. In FIG. 2A, peripheral keyboard 206 includes dynamic function row 104 and a set of physical keys 106. In FIG. 2D, peripheral keyboard 206 includes a set of physical keys 106, and the second peripheral input mechanism 222 includes dynamic function row 104 at least partially contained within the housing of the second peripheral input mechanism 222. In some embodiments, dynamic function row 104, which is described in more detail with reference to FIG. 1B, is a touch screen display. In some embodiments, the second peripheral input mechanism 222 includes one or more processors and memory storing one or more programs that may be executed by the one or more processors of the second peripheral input mechanism 222 to perform any of the embodiments described herein. In some embodiments, the second peripheral input mechanism 222 relays signals indicating user inputs (e.g., user selections of user-selectable symbols/affordances displayed by dynamic function row 104) to computing device 202.

Figure 3A:
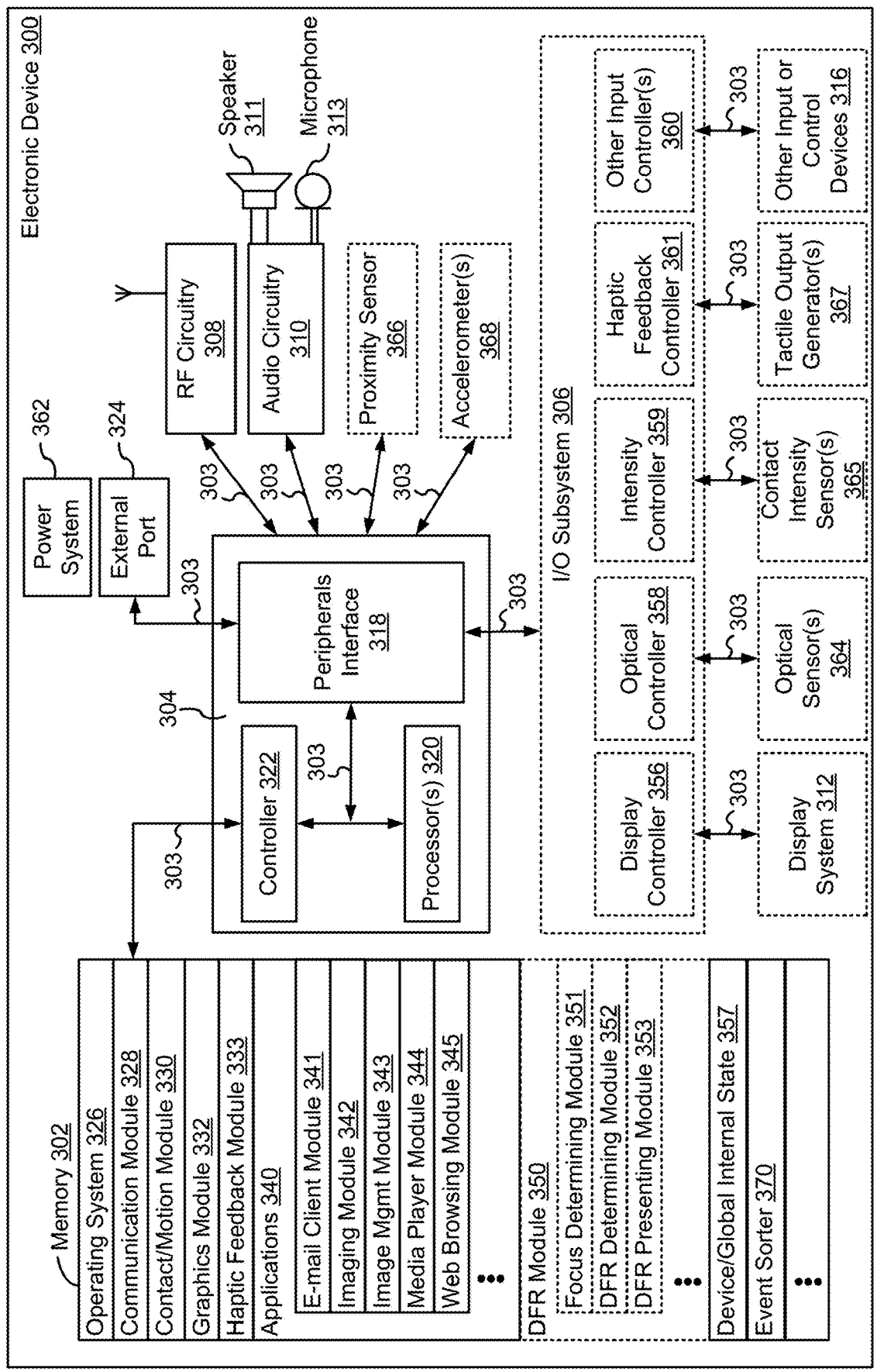
FIG. 3A is a block diagram of an electronic device, in accordance with some embodiments.

FIG. 3A is a block diagram of an electronic device 300, in accordance with some embodiments. In some embodiments, electronic device 300 is a portable electronic device, such as a laptop (e.g., portable computing system 100, FIG. 1A). In some embodiments, electronic device 300 is not a portable device, but is a desktop computer (e.g., computing device 202 of desktop computing system 200, FIGS. 2A-2D), which is communicatively coupled with a peripheral display system (e.g., peripheral display device 204, FIGS. 2A-2D) and optionally a peripheral touch-sensitive surface (e.g., a touchpad 108, FIGS. 2B-2C and/or a touch-sensitive display, such as peripheral display device 204, FIGS. 2A-2D and/or dynamic function row 104, FIGS. 2A-2D).

Electronic device 300 typically supports a variety of applications, such as one or more of the following: a drawing application, a presentation application, a word processing application, a website creation application, a disk authoring application, a spreadsheet application, a gaming application, a video conferencing application, an e-mail application, an instant messaging application, an image management application, a digital camera application, a digital video camera application, a web browser application, and/or a media player application.

The various applications that are executed on electronic device 300 optionally use at least one common physical user-interface device, such as the touch-sensitive surface. One or more functions of the touch-sensitive surface as well as corresponding information displayed by electronic device 300 are, optionally, adjusted and/or varied from one application to the next and/or within an application. In this way, a common physical architecture (such as the touch-sensitive surface) of electronic device 300 optionally supports the variety of applications with user interfaces that are intuitive and transparent to the user.

Electronic device 300 includes memory 302 (which optionally includes one or more computer readable storage mediums), memory controller 322, one or more processing units (CPU(s)) 320, peripherals interface 318, RF circuitry 308, audio circuitry 310, speaker 311, microphone 313, input/output (I/O) subsystem 306, other input or control devices 316, and external port 324. Electronic device 300 optionally includes a display system 312 (e.g., primary display 102 of display portion 110, FIG. 1A and/or dynamic function row 104, FIGS. 1A-1B), which may be a touch-sensitive display (sometimes also herein called a "touch screen" or a "touch screen display"). Electronic device 300 optionally includes one or more optical sensors 364. Electronic device 300 optionally includes one or more intensity sensors 365 for detecting intensity of contacts on a touch-sensitive surface such as touch-sensitive display or a touchpad. Electronic device 300 optionally includes one or more tactile output generators 367 for generating tactile outputs on a touch-sensitive surface such as touch-sensitive display or a touchpad (e.g., touchpad 108, FIGS. 1A-1B). These components optionally communicate over one or more communication buses or signal lines 303.

As used in the specification, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or touch/track pad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that electronic device 300 is only an example and that electronic device 300 optionally has more or fewer components than shown, optionally combines two or more components, or optionally has a different configuration or arrangement of the components. The various components shown in FIG. 3A are implemented in hardware, software, firmware, or a combination thereof, including one or more signal processing and/or application specific integrated circuits.

Memory 302 optionally includes high-speed random access memory and optionally also includes non-volatile memory, such as one or more magnetic disk storage devices, flash memory devices, or other non-volatile solid-state memory devices. Access to memory 302 by other components of electronic device 300, such as CPU(s) 320 and peripherals interface 318, is, optionally, controlled by memory controller 322. Peripherals interface 318 can be used to couple input and output peripherals to CPU(s) 320 and memory 302. The one or more processing units 320 run or execute various software programs and/or sets of instructions stored in memory 302 to perform various functions for electronic device 300 and to process data. In some embodiments, peripherals interface 318, CPU(s) 320, and memory controller 322 are, optionally, implemented on a single chip, such as chip 304. In some other embodiments, they are, optionally, implemented on separate chips.

RF (radio frequency) circuitry 308 receives and sends RF signals, also called electromagnetic signals. RF circuitry 308 converts electrical signals to/from electromagnetic signals and communicates with communications networks and other communications devices via the electromagnetic signals. RF circuitry 308 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 308 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g, and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 310, speaker 311, and microphone 313 provide an audio interface between a user and electronic device 300. Audio circuitry 310 receives audio data from peripherals interface 318, converts the audio data to an electrical signal, and transmits the electrical signal to speaker 311. Speaker 311 converts the electrical signal to human-audible sound waves. Audio circuitry 310 also receives electrical signals converted by microphone 313 from sound waves. Audio circuitry 310 converts the electrical signals to audio data and transmits the audio data to peripherals interface 318 for processing. Audio data is, optionally, retrieved from and/or transmitted to memory 302 and/or RF circuitry 308 by peripherals interface 318. In some embodiments, audio circuitry 310 also includes a headset jack. The headset jack provides an interface between audio circuitry 310 and removable audio input/output peripherals, such as output-only headphones or a headset with both output (e.g., a headphone for one or both ears) and input (e.g., a microphone).

I/O subsystem 306 couples the input/output peripherals of electronic device 300, such as display system 312 and other input or control devices 316, to peripherals interface 318. I/O subsystem 306 optionally includes display controller 356, optical sensor controller 358, intensity sensor controller 359, haptic feedback controller 361, and one or more other input controllers 360 for other input or control devices. The one or more other input controllers 360 receive/send electrical signals from/to other input or control devices 316. The other input or control devices 316 optionally include physical buttons (e.g., push buttons, rocker buttons, etc.), dials, slider switches, joysticks, click wheels, and so forth. In some alternate embodiments, other input controller(s) 360 are, optionally, coupled with any (or none) of the following: a keyboard, infrared port, USB port, and a pointer device such as a mouse. The one or more physical buttons optionally include an up/down button for volume control of speaker 311 and/or microphone 313.

Display system 312 (e.g., primary display 102 of display portion 110, FIG. 1A and/or dynamic function row 104, FIGS. 1A-1B) provides an output interface (and, optionally, an input interface when it is a touch-sensitive display) between electronic device 300 and a user. Display controller 356 receives and/or sends electrical signals from/to display system 312. Display system 312 displays visual output to the user. The visual output optionally includes graphics, text, icons, video, and any combination thereof (collectively termed "graphics"). In some embodiments, some or all of the visual output corresponds to user-interface objects/elements.

In some embodiments, display system 312 (e.g., primary display 102 of display portion 110, FIG. 1A and/or dynamic function row 104, FIGS. 1A-1B) is a touch-sensitive display with a touch-sensitive surface, sensor, or set of sensors that accepts input from the user based on haptic and/or tactile contact. As such, display system 312 and display controller 356 (along with any associated modules and/or sets of instructions in memory 302) detect contact (and any movement or breaking of the contact) on display system 312 and convert the detected contact into interaction with user-interface objects (e.g., one or more soft keys, icons, web pages, or images) that are displayed on display system 312. In one example embodiment, a point of contact between display system 312 and the user corresponds to an area under a finger of the user.

Display system 312 (e.g., primary display 102 of display portion 110, FIG. 1A and/or dynamic function row 104, FIGS. 1A-1B) optionally uses LCD (liquid crystal display) technology, LPD (light emitting polymer display) technology, LED (light emitting diode) technology, or OLED (organic light emitting diode) technology, although other display technologies are used in other embodiments. In some embodiments, when display system 312 is a touch-sensitive display, display system 312 and display controller 356 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with display system 312. In one example embodiment, projected mutual capacitance sensing technology is used, such as that found in the iPHONE®, iPODTOUCH®, and iPAD® from Apple Inc. of Cupertino, Calif.

Display system 312 (e.g., primary display 102 of display portion 110, FIG. 1A and/or dynamic function row 104, FIGS. 1A-1B) optionally has a video resolution in excess of 400 dpi (e.g., 500 dpi, 800 dpi, or greater). In some embodiments, display system 312 is a touch-sensitive display with which the user optionally makes contact using a stylus, a finger, and so forth. In some embodiments, the user interface is designed to work primarily with finger-based contacts and gestures. In some embodiments, electronic device 300 translates the rough finger-based input into a precise pointer/cursor position or command for performing the actions desired by the user.

In some embodiments, in addition to display system 312, electronic device 300 optionally includes a touchpad (e.g., touchpad 108, FIGS. 1A-1B) for activating or deactivating particular functions. In some embodiments, the touchpad is a touch-sensitive area of electronic device 300 that, unlike display system 312, does not display visual output. In some embodiments, when display system 312 is a touch-sensitive display, the touchpad is, optionally, a touch-sensitive surface that is separate from display system 312, or an extension of the touch-sensitive surface formed by display system 312.

Electronic device 300 also includes power system 362 for powering the various components. Power system 362 optionally includes a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in portable devices.

Electronic device 300 optionally also includes one or more optical sensors 364 coupled with optical sensor controller 358 in I/O subsystem 306. Optical sensor(s) 364 optionally includes charge-coupled device (CCD) or complementary metal-oxide semiconductor (CMOS) phototransistors. Optical sensor(s) 364 receive light from the environment, projected through one or more lens, and converts the light to data representing an image. In conjunction with imaging module 343, optical sensor(s) 364 optionally capture still images or video. In some embodiments, an optical sensor is located on the front of electronic device 300 so that the user's image is, optionally, obtained for video-conferencing while the user views the other video conference participants on display system 312.

Electronic device 300 optionally also includes one or more contact intensity sensor(s) 365 coupled with intensity sensor controller 359 in I/O subsystem 306. Contact intensity sensor(s) 365 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 365 receives contact intensity information (e.g., pressure information or a proxy for pressure information) from the environment. In some embodiments, at least one contact intensity sensor is collocated with, or proximate to, a touch-sensitive surface (e.g., touchpad 108, FIGS. 1A-1B or display system 312 when it is a touch-sensitive display).

Electronic device 300 optionally also includes one or more tactile output generators 367 coupled with haptic feedback controller 361 in I/O subsystem 306. Tactile output generator(s) 367 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor(s) 365 receives tactile feedback generation instructions from haptic feedback module 333 and generates tactile outputs that are capable of being sensed by a user of electronic device 300. In some embodiments, at least one tactile output generator is collocated with, or proximate to, a touch-sensitive surface (e.g., touchpad 108, FIGS. 1A-1B or display system 312 when it is a touch-sensitive display) and, optionally, generates a tactile output by moving the touch-sensitive surface vertically (e.g., in/out of a surface of electronic device 300) or laterally (e.g., back and forth in the same plane as a surface of electronic device 300).

Electronic device 300 optionally also includes one or more proximity sensors 366 coupled with peripherals interface 318. Alternately, proximity sensor(s) 366 are coupled with other input controller(s) 360 in I/O subsystem 306. Electronic device 300 optionally also includes one or more accelerometers 368 coupled with peripherals interface 318. Alternately, accelerometer(s) 368 are coupled with other input controller(s) 360 in I/O subsystem 306.

In some embodiments, the software components stored in memory 302 include operating system 326, communication module 328 (or set of instructions), contact/motion module 330 (or set of instructions), graphics module 332 (or set of instructions), applications 340 (or sets of instructions), and dynamic function row module 350 (or sets of instructions). Furthermore, in some embodiments, memory 302 stores device/global internal state 357 (or sets of instructions), as shown in FIG. 3A. Device/global internal state 357 includes one or more of: active application state, indicating which applications, if any, are currently active and/or in focus; display state, indicating what applications, views or other information occupy various regions of display system 312 (e.g., primary display 102 of display portion 110, FIG. 1A and/or dynamic function row 104, FIGS. 1A-1B) and/or a peripheral display system (e.g., primary display 102 of peripheral display device 204, FIGS. 2A-2D and/or dynamic function row 104, FIGS. 2A-2D); sensor state, including information obtained from various sensors and input or control devices 316 of electronic device 300; and location information concerning the location and/or attitude of electronic device 300.

Operating system 326 (e.g., DARWIN, RTXC, LINUX, UNIX, OS X, WINDOWS, or an embedded operating system such as VXWorks) includes various software components and/or drivers for controlling and managing general system tasks (e.g., memory management, storage device control, power management, etc.) and facilitates communication between various hardware and software components.

Communication module 328 facilitates communication with other devices (e.g., computing device 202, FIGS. 2A-2D; peripheral mouse 208, FIGS. 2A and 2D; peripheral keyboard 206, FIGS. 2A-2B; first peripheral input mechanism 212, FIG. 2C; and/or second peripheral input mechanism 222, FIG. 2D) over one or more external ports 324 and/or RF circuitry 308 and also includes various software components for sending/receiving data via RF circuitry 308 and/or external port 324. External port 324 (e.g., Universal Serial Bus (USB), FIREWIRE, etc.) is adapted for coupling directly to other devices or indirectly over a network (e.g., the Internet, wireless LAN, etc.). In some embodiments, external port 324 is a multi-pin (e.g., 30-pin) connector that is the same as, or similar to and/or compatible with the 30-pin connector used on iPod® devices.

Contact/motion module 330 optionally detects contact with display system 312 when it is a touch-sensitive display (in conjunction with display controller 356) and other touch sensitive devices (e.g., a touchpad or physical click wheel). Contact/motion module 330 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 330 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 330 also detects contact on a touchpad (e.g., touchpad 108, FIGS. 1A-1B).

In some embodiments, contact/motion module 330 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of electronic device 300). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 330 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap contact includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and in some embodiments also followed by detecting a finger-up (lift off) event.

Graphics module 332 includes various known software components for rendering and causing display of graphics on primary display 102 (e.g., primary display 102 of display portion 110, FIG. 1A or primary display 102 of peripheral display device 204, FIGS. 2A-2D) or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like. In some embodiments, graphics module 332 stores data representing graphics to be used. Each graphic is, optionally, assigned a corresponding code. Graphics module 332 receives, from applications etc., one or more codes specifying graphics to be displayed along with, if necessary, coordinate data and other graphic property data, and then generates screen image data to output to display controller 356.

Haptic feedback module 333 includes various software components for generating instructions used by tactile output generator(s) 367 to produce tactile outputs at one or more locations on electronic device 300 in response to user interactions with electronic device 300.

Applications 340 optionally include the following modules (or sets of instructions), or a subset or superset thereof:
e-mail client module 341 (sometimes also herein called "mail app" or "e-mail app") for receiving, sending, composing, and viewing e-mails;
imaging module 342 for capturing still and/or video images;
image management module 343 (sometimes also herein called "photo app") for editing and viewing still and/or video images;
media player module 344 (sometimes also herein called "media player app") for playback of audio and/or video; and
web browsing module 345 (sometimes also herein called "web browser") for connecting to and browsing the Internet.

Examples of other applications 340 that are, optionally, stored in memory 302 include messaging and communications applications, word processing applications, other image editing applications, drawing applications, presentation applications, JAVA-enabled applications, encryption applications, digital rights management applications, voice recognition applications, and voice replication applications.

In conjunction with one or more of RF circuitry 308, display system 312 (e.g., primary display 102 of display portion 110, FIG. 1A and/or dynamic function row 104, FIGS. 1A-1B), display controller 356, and contact module 330, graphics module 332, e-mail client module 341 includes executable instructions to create, send, receive, and manage e-mail in response to user instructions. In conjunction with image management module 343, e-mail client module 341 makes it very easy to create and send e-mails with still or video images taken with imaging module 342.

In conjunction with one or more of display system 312 (e.g., primary display 102 of display portion 110, FIG. 1A and/or dynamic function row 104, FIGS. 1A-1B), display controller 356, optical sensor(s) 364, optical sensor controller 358, contact module 330, graphics module 332, and image management module 343, imaging module 342 includes executable instructions to capture still images or video (including a video stream) and store them into memory 302, modify characteristics of a still image or video, or delete a still image or video from memory 302.

In conjunction with one or more of display system 312 (e.g., primary display 102 of display portion 110, FIG. 1A and/or dynamic function row 104, FIGS. 1A-1B), display controller 356, contact module 330, graphics module 332, and imaging module 342, image management module 343 includes executable instructions to arrange, modify (e.g., edit), or otherwise manipulate, label, delete, present (e.g., in a digital slide show or album), and store still and/or video images.

In conjunction with one or more of display system 312 (e.g., primary display 102 of display portion 110, FIG. 1A and/or dynamic function row 104, FIGS. 1A-1B), display controller 356, contact module 330, graphics module 332, audio circuitry 310, speaker 311, RF circuitry 308, and web browsing module 345, media player module 344 includes executable instructions that allow the user to download and play back recorded music and other sound files stored in one or more file formats, such as MP3 or AAC files, and executable instructions to display, present or otherwise play back videos (e.g., on primary display 102 of display portion 110, FIG. 1A or primary display 102 of peripheral display device 2014, FIGS. 2A-2B connected via external port 324).

In conjunction with one or more of RF circuitry 308, display system 312 (e.g., primary display 102 of display portion 110, FIG. 1A and/or dynamic function row 104, FIGS. 1A-1B), display controller 356, contact module 330, and graphics module 332, web browsing module 345 includes executable instructions to browse the Internet in accordance with user instructions, including searching, linking to, receiving, and displaying web pages or portions thereof, as well as attachments and other files linked to web pages.

Dynamic function row (DFR) module 350 includes: focus determining module 351, DFR determining module 352, and DFR presenting module 353. In some embodiments, focus determining module 351 is configured to determine an active user interface element that is in focus on the graphical user interface displayed by display system 312 (e.g., primary display 102 of display portion 110, FIG. 1A) or a peripheral display system (e.g., peripheral display device 204, FIGS. 2A-2D). In some embodiments, DFR determining module 352 is configured to determine graphics (e.g., a set of one or more affordances) based on the active user interface element that is in focus. In some embodiments, DFR presenting module 353 is configured to render the graphics determined by DFR determining module 352 on display system 312 (e.g., dynamic function row 104, FIGS. 1A-1B). DFR presenting module 353 includes various known software components for rendering and causing display of graphics on display system 312 (e.g., dynamic function row 104, FIGS. 1A-1B), including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations, and the like. In some embodiments, DFR module 350 includes other modules for: adjusting the sensitivity of dynamic function row 104; adjusting the audible and/or haptic feedback provided by dynamic function row 104; adjusting the settings of affordances and information displayed by dynamic function row 104 (e.g., size, brightness, font, language, and the like); adjusting the current power mode of dynamic function row 104 (e.g., normal and low-power modes); and the like.

In some embodiments, the dynamic function row module 350 interfaces with components that allow for providing predicted/proactive/suggested content items (including predicted recipients, suggested text completion strings, proactively suggested applications, etc.). Proactively suggesting content items is discussed in more detail in U.S. application Ser. No. 15/167,713, which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 302 optionally stores a subset of the modules and data structures identified above. Furthermore, memory 302 optionally stores additional modules and data structures not described above.

Figure 3B:
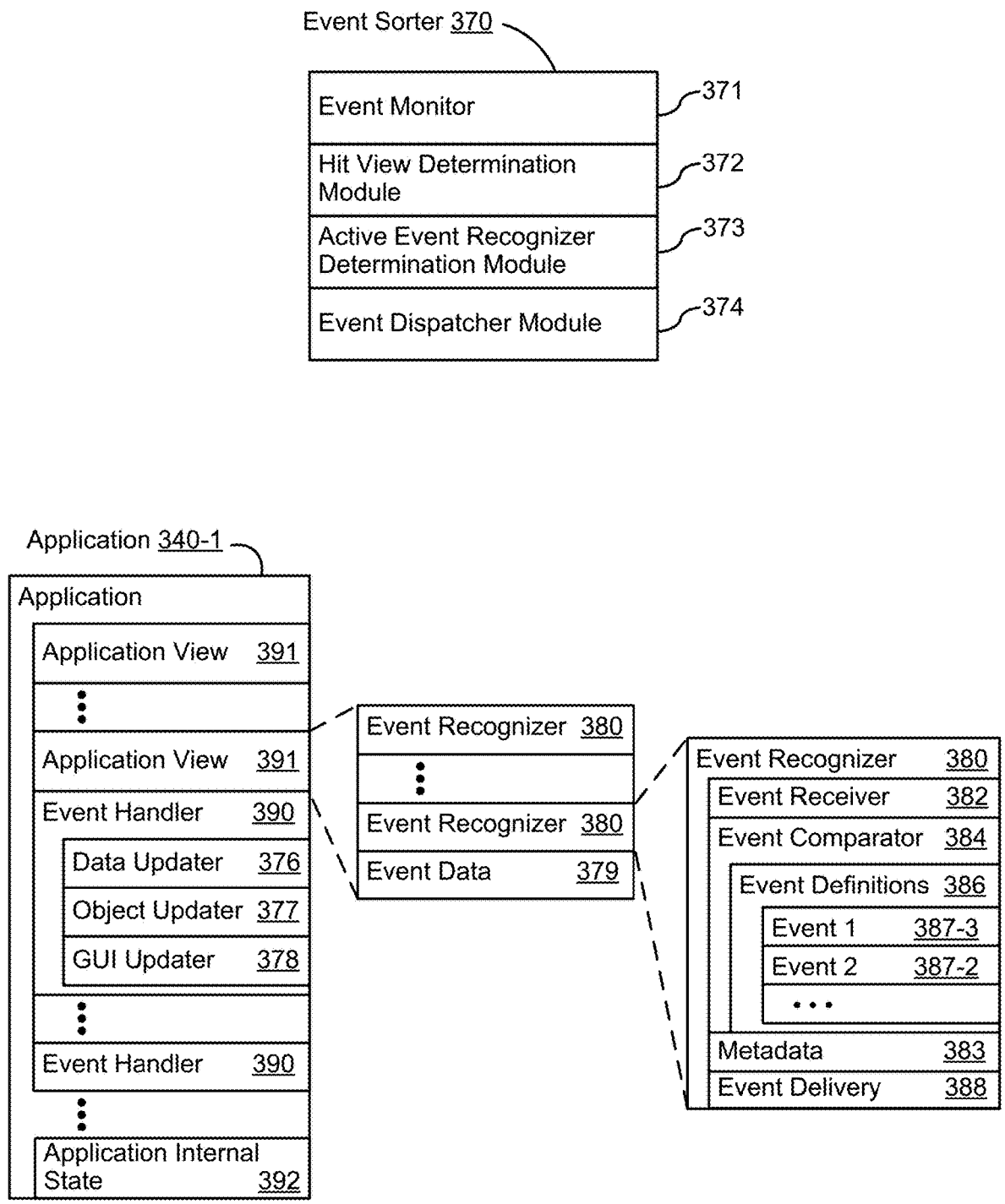
FIG. 3B is a block diagram of components for event handling of FIG. 3A, in accordance with some embodiments.

FIG. 3B is a block diagram of components for event handling of FIG. 3A, in accordance with some embodiments. In some embodiments, memory 302 (FIG. 3A) includes event sorter 370 (e.g., in operating system 326) and an application 340-1 (e.g., any of the aforementioned applications 341, 342, 343, 344, or 345).

Event sorter 370 receives event information and determines the application 340-1 and application view 391 of application 340-1 to which to deliver the event information. Event sorter 370 includes event monitor 371 and event dispatcher module 374. In some embodiments, application 340-1 includes application internal state 392, which indicates the current application view(s) displayed on display system 312 (e.g., primary display 102 of display portion 110, FIG. 1A and/or dynamic function row 104, FIGS. 1A-1B) when the application is active or executing. In some embodiments, device/global internal state 357 is used by event sorter 370 to determine which application(s) is (are) currently active or in focus, and application internal state 392 is used by event sorter 370 to determine application views 391 to which to deliver event information.

In some embodiments, application internal state 392 includes additional information, such as one or more of: resume information to be used when application 340-1 resumes execution, user interface state information that indicates information being displayed or that is ready for display by application 340-1, a state queue for enabling the user to go back to a prior state or view of application 340-1, and a redo/undo queue of previous actions taken by the user.

Event monitor 371 receives event information from peripherals interface 318. Event information includes information about a sub-event (e.g., a user touch on display system 312 when it is a touch-sensitive display, as part of a multi-touch gesture). Peripherals interface 318 transmits information it receives from I/O subsystem 306 or a sensor, such as proximity sensor(s) 366, accelerometer(s) 368, and/or microphone 313 (through audio circuitry 310). Information that peripherals interface 318 receives from I/O subsystem 306 includes information from display system 312 when it is a touch-sensitive display or another touch-sensitive surface (e.g., touchpad 108, FIGS. 1A-1B).

In some embodiments, event monitor 371 sends requests to the peripherals interface 318 at predetermined intervals. In response, peripherals interface 318 transmits event information. In other embodiments, peripheral interface 318 transmits event information only when there is a significant event (e.g., receiving an input above a predetermined noise threshold and/or for more than a predetermined duration).

In some embodiments, event sorter 370 also includes a hit view determination module 372 and/or an active event recognizer determination module 373.

Hit view determination module 372 provides software procedures for determining where a sub-event has taken place within one or more views, when display system 312 displays more than one view, where views are made up of controls and other elements that a user can see on the display.

Another aspect of the user interface associated with an application is a set of views, sometimes herein called application views or user interface windows, in which information is displayed and touch-based gestures occur. The application views (of an application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 372 receives information related to sub-events of a touch-based gesture. When an application has multiple views organized in a hierarchy, hit view determination module 372 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 373 determines which view or views within a view hierarchy should receive a particular sequence of sub-events. In some embodiments, active event recognizer determination module 373 determines that only the hit view should receive a particular sequence of sub-events. In other embodiments, active event recognizer determination module 373 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 374 dispatches the event information to an event recognizer (e.g., event recognizer 380). In embodiments including active event recognizer determination module 373, event dispatcher module 374 delivers the event information to an event recognizer determined by active event recognizer determination module 373. In some embodiments, event dispatcher module 374 stores in an event queue the event information, which is retrieved by a respective event receiver 382.

In some embodiments, operating system 326 includes event sorter 370. Alternatively, application 340-1 includes event sorter 370. In yet other embodiments, event sorter 370 is a stand-alone module, or a part of another module stored in memory 302, such as contact/motion module 330.

In some embodiments, application 340-1 includes a plurality of event handlers 390 and one or more application views 391, each of which includes instructions for handling touch events that occur within a respective view of the application's user interface. Each application view 391 of the application 340-1 includes one or more event recognizers 380. Typically, an application view 391 includes a plurality of event recognizers 380. In other embodiments, one or more of event recognizers 380 are part of a separate module, such as a user interface kit (not shown) or a higher level object from which application 340-1 inherits methods and other properties. In some embodiments, a respective event handler 390 includes one or more of: data updater 376, object updater 377, GUI updater 378, and/or event data 379 received from event sorter 370. Event handler 390 optionally utilizes or calls data updater 376, object updater 377 or GUI updater 378 to update the application internal state 392. Alternatively, one or more of the application views 391 includes one or more respective event handlers 390. Also, in some embodiments, one or more of data updater 376, object updater 377, and GUI updater 378 are included in an application view 391.

A respective event recognizer 380 receives event information (e.g., event data 379) from event sorter 370, and identifies an event from the event information. Event recognizer 380 includes event receiver 382 and event comparator 384. In some embodiments, event recognizer 380 also includes at least a subset of: metadata 383, and event delivery instructions 388 (which optionally include sub-event delivery instructions).

Event receiver 382 receives event information from event sorter 370. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 384 compares the event information to predefined event or sub-event definitions and, based on the comparison, determines an event or sub-event, or determines or updates the state of an event or sub-event. In some embodiments, event comparator 384 includes event definitions 386. Event definitions 386 contain definitions of events (e.g., predefined sequences of sub-events), for example, event 1 (387-1), event 2 (387-2), and others. In some embodiments, sub-events in an event 387 include, for example, touch begin, touch end, touch movement, touch cancellation, and multiple touching. In one example, the definition for event 1 (387-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (387-2) is a dragging on a displayed object. The dragging, for example, comprises a touch (or contact) on the displayed object for a predetermined phase, a movement of the touch across display system 312 when it is a touch-sensitive display, and lift-off of the touch (touch end). In some embodiments, the event also includes information for one or more associated event handlers 390.

In some embodiments, event definition 387 includes a definition of an event for a respective user-interface object. In some embodiments, event comparator 384 performs a hit test to determine which user-interface object is associated with a sub-event. For example, in an application view in which three user-interface objects are displayed on display system 312, when a touch is detected on display system 312 when it is a touch-sensitive display, event comparator 384 performs a hit test to determine which of the three user-interface objects is associated with the touch (sub-event). If each displayed object is associated with a respective event handler 390, the event comparator uses the result of the hit test to determine which event handler 390 should be activated. For example, event comparator 384 selects an event handler associated with the sub-event and the object triggering the hit test.

In some embodiments, the definition for a respective event 387 also includes delayed actions that delay delivery of the event information until after it has been determined whether the sequence of sub-events does or does not correspond to the event recognizer's event type.

When a respective event recognizer 380 determines that the series of sub-events do not match any of the events in event definitions 386, the respective event recognizer 380 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 380 includes metadata 383 with configurable properties, flags, and/or lists that indicate how the event delivery system should perform sub-event delivery to actively involved event recognizers. In some embodiments, metadata 383 includes configurable properties, flags, and/or lists that indicate how event recognizers interact, or are enabled to interact, with one another. In some embodiments, metadata 383 includes configurable properties, flags, and/or lists that indicate whether sub-events are delivered to varying levels in the view or programmatic hierarchy.

In some embodiments, a respective event recognizer 380 activates event handler 390 associated with an event when one or more particular sub-events of an event are recognized. In some embodiments, a respective event recognizer 380 delivers event information associated with the event to event handler 390. Activating an event handler 390 is distinct from sending (and deferred sending) sub-events to a respective hit view. In some embodiments, event recognizer 380 throws a flag associated with the recognized event, and event handler 390 associated with the flag catches the flag and performs a predefined process.

In some embodiments, event delivery instructions 388 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 376 creates and updates data used in application 340-1. For example, data updater 376 stores a video file used by media player module 344. In some embodiments, object updater 377 creates and updates objects used by application 340-1. For example, object updater 377 creates a new user-interface object or updates the position of a user-interface object. GUI updater 378 updates the GUI. For example, GUI updater 378 prepares display information and sends it to graphics module 332 for display on display system 312 (e.g., primary display 102 of display portion 110, FIG. 1A and/or dynamic function row 104, FIGS. 1A-1B).

In some embodiments, event handler(s) 390 includes or has access to data updater 376, object updater 377, and GUI updater 378. In some embodiments, data updater 376, object updater 377, and GUI updater 378 are included in a single module of an application 340-1 or application view 391. In other embodiments, they are included in two or more software modules.

It shall be understood that the foregoing discussion regarding event handling of user touches on touch-sensitive displays also applies to other forms of user inputs to operate electronic device 300 with input-devices, not all of which are initiated on touch screens. For example, mouse movement and mouse button presses, optionally coordinated with single or multiple keyboard presses or holds; contact movements such as taps, drags, scrolls, etc., on touchpads; pen stylus inputs; movement of the device; oral instructions; detected eye movements; biometric inputs; and/or any combination thereof are optionally utilized as inputs corresponding to sub-events which define an event to be recognized.

Figure 4:
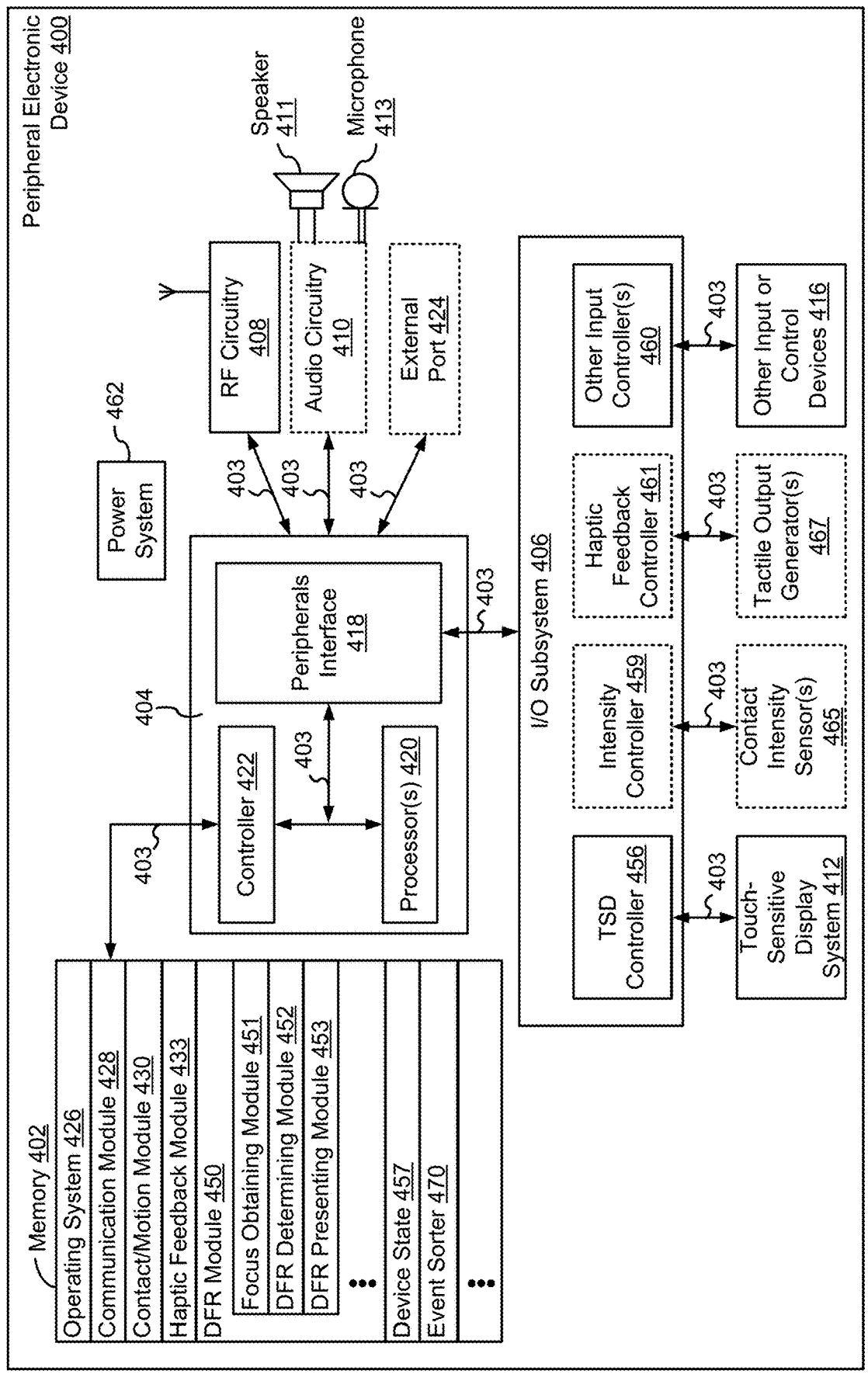
FIG. 4 is a block diagram of a peripheral electronic device, in accordance with some embodiments.
Figure 5A:
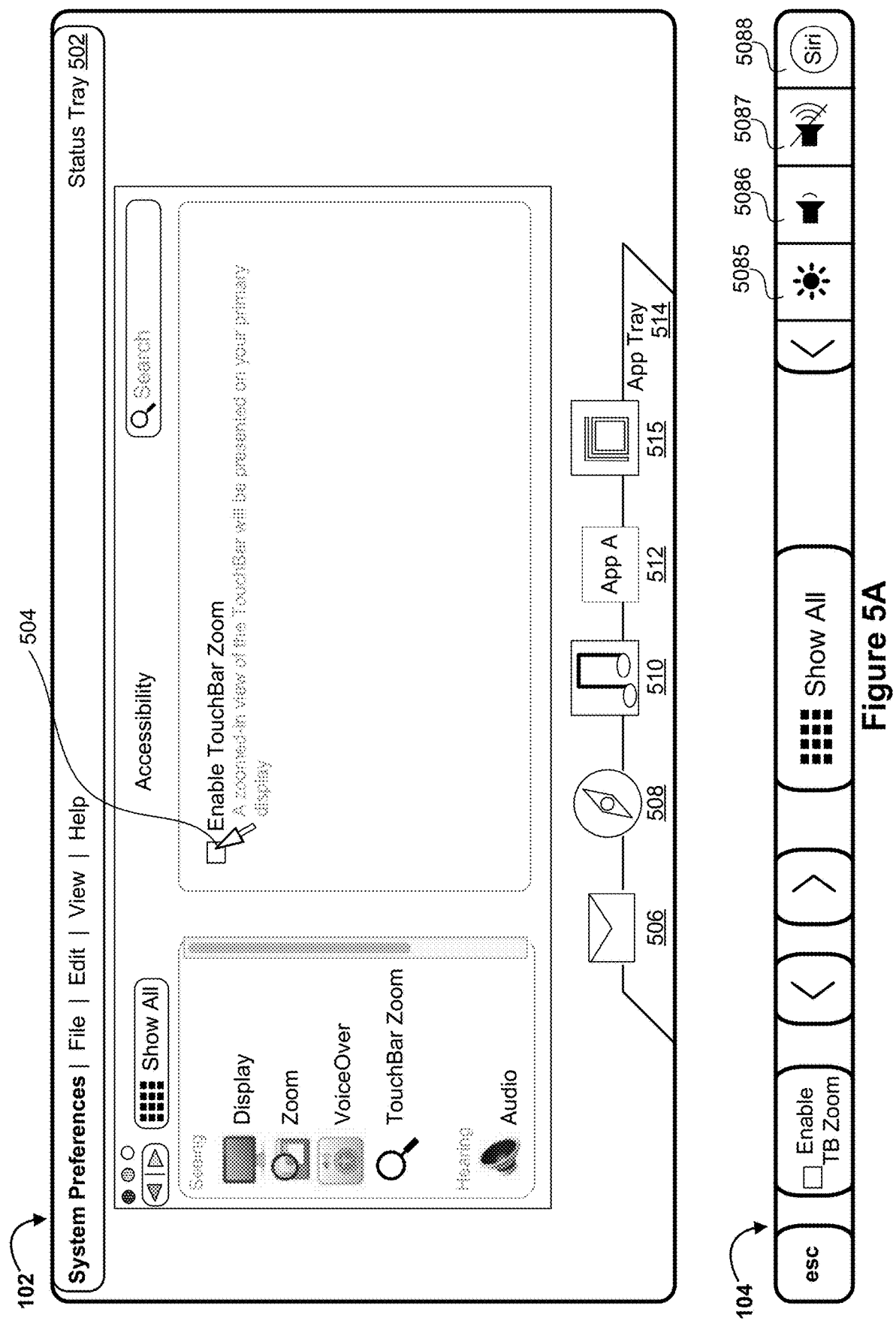
FIGS. 5A-5N are schematics of primary and secondary displays used to illustrate example user interfaces for enabling low-vision users to interact with touch-sensitive secondary displays, in accordance with some embodiments.

FIG. 4 shows a block diagram of a peripheral electronic device 400, in accordance with some embodiments. In some embodiments, peripheral electronic device 400 is a peripheral input and output device that at least partially contains a dynamic function row 104 and a physical input mechanism, such as a set of physical keys (e.g., the set of physical keys 106, FIGS. 2A-2B) and/or a touchpad (e.g., touchpad 108, FIGS. 2B-2C), within a same housing. Examples of peripheral electronic device 400 includes: peripheral keyboard (e.g., peripheral keyboard 206, FIGS. 2A-2B), a peripheral touch-sensitive surface (e.g., first peripheral input mechanism 212, FIG. 2C), or other peripheral input mechanisms (e.g., second peripheral input mechanism 222, FIG. 2D). Peripheral electronic device 400 is communicatively coupled with computing device 202 (FIGS. 2A-2D). For example, peripheral electronic device 400 is communicatively coupled with computing device 202 via a wired connection, such as USB or PS/2, or via a wireless communication link, using a communication protocol such as Bluetooth, Wi-Fi, or the like. Peripheral electronic device 400 may rely on some of the components or procedures in electronic device 300 (FIG. 3A) or some of these components or procedures may be completed by, located in, or housed by peripheral electronic device 400 instead of electronic device 300.

In some embodiments, peripheral electronic device 400 includes one or more of memory 402 (which optionally includes one or more computer readable storage mediums), memory controller 422, one or more processing units (CPU(s)) 420, peripherals interface 418, RF circuitry 408, audio circuitry 410, speaker 411, microphone 413, input/output (I/O) subsystem 406, other input or control devices 416, and external port 424. Peripheral electronic device 400 includes a touch-sensitive display system 412 (e.g., dynamic function row 104, FIGS. 2A-2D) (sometimes also herein called a "touch-sensitive display," a "touch screen," or a "touch screen display").

Peripheral electronic device 400 optionally includes one or more intensity sensors 465 for detecting intensity of contacts on a touch-sensitive surface such as touch-sensitive display system 412 or a touchpad (e.g., touchpad 108, FIGS. 2B-2C). Peripheral electronic device 400 optionally includes one or more tactile output generators 467 for generating tactile outputs on a touch-sensitive surface such as touch-sensitive display system 412 or a touchpad (e.g., touchpad 108, FIGS. 2B-2C). These components optionally communicate over one or more communication buses or signal lines 403.

Memory 402 optionally includes high-speed random access memory and optionally also includes non-volatile memory, such as one or more magnetic disk storage devices, flash memory devices, or other non-volatile solid-state memory devices. Access to memory 402 by other components of peripheral electronic device 400, such as CPU(s) 420 and peripherals interface 418, is, optionally, controlled by memory controller 422. Peripherals interface 418 can be used to couple CPU(s) 420 and memory 402 to I/O subsystem 406 and other circuitry. The one or more processing units 420 run or execute various software programs and/or sets of instructions stored in memory 402 to perform various functions for peripheral electronic device 400 and to process data. In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with communications networks and other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The wireless communication optionally uses any of a plurality of communications standards, protocols and technologies, including but not limited to near field communication (NFC), Bluetooth, Wireless Fidelity (Wi-Fi) (e.g., IEEE 802.11a, IEEE 802.11b, IEEE 802.11g, and/or IEEE 802.11n), Wi-MAX, or any other suitable communication protocol, including communication protocols not yet developed as of the filing date of this document.

Optional audio circuitry 410, speaker 411, and microphone 413 provide an audio interface between a user and peripheral electronic device 400. Audio circuitry 410 receives audio data from peripherals interface 418, converts the audio data to an electrical signal, and transmits the electrical signal to speaker 411. Speaker 411 converts the electrical signal to human-audible sound waves. Audio circuitry 410 also receives electrical signals converted by microphone 413 from sound waves. Audio circuitry 410 converts the electrical signals to audio data and transmits the audio data to peripherals interface 418 for processing. Audio data is, optionally, retrieved from and/or transmitted to memory 402 and/or RF circuitry 408 by peripherals interface 418. In some embodiments, audio circuitry 410 also includes a headset jack. The headset jack provides an interface between audio circuitry 410 and removable audio input/output peripherals, such as output-only headphones or a headset with both output (e.g., a headphone for one or both ears) and input (e.g., a microphone).

I/O subsystem 406 couples the input/output peripherals of peripheral electronic device 400, such as touch-sensitive display system 412 (e.g., dynamic function row 104, FIGS. 2A-2D), to peripherals interface 418. I/O subsystem 406 optionally includes display controller 456, intensity sensor controller 459, haptic feedback controller 461, and one or more input controllers 460 for other input or control devices 416. The one or more other input controllers 460 receive/send electrical signals from/to other input or control devices 416. The other input or control devices 416 optionally include physical buttons (e.g., push buttons, rocker buttons, etc.), dials, slider switches, joysticks, click wheels, a set of physical keys, a touchpad, and so forth.

Touch-sensitive display system 412 (e.g., dynamic function row 104, FIGS. 2A-2D) provides an input/output interface between peripheral electronic device 400 and a user. Touch-sensitive display (TSD) controller 456 receives and/or sends electrical signals from/to touch-sensitive display system 412. Touch-sensitive display system 412 displays visual output to the user. The visual output optionally includes graphics, text, icons, video, and any combination thereof (collectively termed "graphics"). In some embodiments, some or all of the visual output corresponds to user-interface objects/elements.

Touch-sensitive display system 412 (e.g., dynamic function row 104, FIGS. 2A-2D) includes a touch-sensitive surface, sensor, or set of sensors that accepts input from the user based on haptic and/or tactile contact. As such, touch-sensitive display system 412 and TSD controller 456 (along with any associated modules and/or sets of instructions in memory 402) detect contact (and any movement or breaking of the contact) on touch-sensitive display system 412 and convert the detected contact into signals used to select or control user-interface objects (e.g., one or more soft keys, icons, web pages, or images) that are displayed on touch-sensitive display system 412. In one example embodiment, a point of contact between touch-sensitive display system 412 and the user corresponds to an area of touch-sensitive display system 412 in contact with a finger of the user.

Touch-sensitive display system 412 (e.g., dynamic function row 104, FIGS. 2A-2D) optionally uses LCD (liquid crystal display) technology, LPD (light emitting polymer display) technology, LED (light emitting diode) technology, or OLED (organic light emitting diode) technology, although other display technologies are used in other embodiments. Touch-sensitive display system 412 and TSD controller 456 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 412. In one example embodiment, projected mutual capacitance sensing technology is used, such as that found in the iPHONE®, iPODTOUCH®, and iPAD® from Apple Inc. of Cupertino, Calif.

Touch-sensitive display system 412 (e.g., dynamic function row 104, FIGS. 2A-2D) optionally has a video resolution in excess of 400 dpi (e.g., 500 dpi, 800 dpi, or greater). In some embodiments, the user makes contact with touch-sensitive display system 412 using a stylus, a finger, and so forth. In some embodiments, the user interface is designed to work primarily with finger-based contacts and gestures.

In some embodiments, in addition to touch-sensitive display system 412, peripheral electronic device 400 optionally includes a touchpad (e.g., touchpad 108, FIGS. 2B-2C). In some embodiments, the touchpad is a touch-sensitive area of peripheral electronic device 400 that, unlike touch-sensitive display system 412, does not display visual output. In some embodiments, the touchpad is, optionally, a touch-sensitive surface that is separate from touch-sensitive display system 412, or an extension of the touch-sensitive surface formed by touch-sensitive display system 412.

Peripheral electronic device 400 also includes power system 462 for powering the various components. Power system 462 optionally includes a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in portable devices.

Peripheral electronic device 400 optionally also includes one or more contact intensity sensors 465 coupled with intensity sensor controller 459 in I/O subsystem 406. Contact intensity sensor(s) 465 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 465 receives contact intensity information (e.g., pressure information or a proxy for pressure information) from the environment. In some embodiments, at least one contact intensity sensor is collocated with, or proximate to, a touch-sensitive surface (e.g., touch-sensitive display system 412 and/or touchpad 108, FIGS. 2B-2C).

Peripheral electronic device 400 optionally also includes one or more tactile output generators 467 coupled with haptic feedback controller 461 in I/O subsystem 406. Tactile output generator(s) 467 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor(s) 465 receives tactile feedback generation instructions from haptic feedback module 433 and generates tactile outputs that are capable of being sensed by a user of peripheral electronic device 400. In some embodiments, at least one tactile output generator is collocated with, or proximate to, a touch-sensitive surface (e.g., touch-sensitive display system 412 and/or touchpad 108, FIGS. 2B-2C) and, optionally, generates a tactile output by moving the touch-sensitive surface vertically (e.g., in/out of a surface of peripheral electronic device 400) or laterally (e.g., back and forth in the same plane as a surface of peripheral electronic device 400).

In some embodiments, the software components stored in memory 402 include operating system 426, communication module 428 (or set of instructions), contact/motion module 430 (or set of instructions), and dynamic function row module 450 (or sets of instructions). Furthermore, in some embodiments, memory 402 stores device state 457 including the display state, indicating what views or other information occupy various regions of touch-sensitive display system 412 (e.g., dynamic function row 104, FIGS. 2A-2D).

Operating system 426 includes various software components and/or drivers for controlling and managing general system tasks (e.g., memory management, storage device control, power management, etc.) and facilitates communication between various hardware and software components.

Communication module 428 facilitates communication with other devices (e.g., computing device 202, FIGS. 2A-2D) over one or more external ports 424 and/or RF circuitry 408 and also includes various software components for sending/receiving data via RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.).

Contact/motion module 430 optionally detects contact with touch-sensitive display system 412 and other touch sensitive devices (e.g., a touchpad or physical click wheel). Contact/motion module 430 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 430 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 430 also detects contact on a touchpad (e.g., touchpad 108, FIGS. 2B-2C).

In some embodiments, contact/motion module 430 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of peripheral electronic device 400). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 430 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap contact includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and in some embodiments also followed by detecting a finger-up (lift off) event.

Haptic feedback module 433 includes various software components for generating instructions used by tactile output generator(s) 467 to produce tactile outputs at one or more locations on peripheral electronic device 400 in response to user interactions with peripheral electronic device 400.

Dynamic function row (DFR) module 450 includes: focus obtaining module 451, DFR determining module 452, and DFR presenting module 453. In some embodiments, focus obtaining module 451 is configured to obtain an indication of an active user interface element that is the current focus of the graphical user interface displayed on primary display 102 of peripheral display device 204 (FIGS. 2A-2D) from computing device 202 (FIGS. 2A-2D). In some embodiments, DFR determining module 452 is configured to determine graphics (e.g., a set of one or more affordances) based on the active user interface element that is current focus. Alternatively, in some embodiments, computing device 202 (FIGS. 2A-2D) determines the graphics (e.g., the set of one or more affordances) based on the active user interface element that is in focus and provides the graphics to peripheral electronic device 400 or a component thereof (e.g., DFR module 450) for display on touch-sensitive display system 412 (e.g., dynamic function row 104, FIGS. 2A-2D). In some embodiments, DFR presenting module 453 is configured to render the graphics determined by DFR determining module 452 (or provided by computing device 202) on touch-sensitive display system 412 (e.g., dynamic function row 104, FIGS. 2A-2D). DFR presenting module 453 includes various known software components for rendering and causing display of graphics on touch-sensitive display system 412, including components for changing the visual impact (e.g., brightness, transparency, saturation, contrast or other visual property) of graphics that are displayed. In some embodiments, DFR module 450 includes other modules for: adjusting the sensitivity of dynamic function row 104; adjusting the audible and/or haptic feedback provided by dynamic function row 104; adjusting the settings of affordances and information displayed by dynamic function row 104 (e.g., size, brightness, font, language, and the like); adjusting the current power mode of dynamic function row 104 (e.g., normal and low-power modes); and the like.

In some embodiments, memory 402 includes event sorter 470 (e.g., in operating system 426). In some embodiments, event sorter 470 performs the same functions as event sorter 370 (FIG. 3B) and includes a subset or superset of the modules, procedures, and instructions of event sorter 370 (FIG. 3B). As such, event sorter 470 will not be described for the sake of brevity.

It should be appreciated that peripheral electronic device 400 is only an example and that peripheral electronic device 400 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Each of the above identified modules correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 108 in FIG. 1A or of a touch-sensitive display system 412 in FIG. 4) while the cursor is over a particular user interface element (e.g., a button, window, slider or other user interface element), the particular user interface element is adjusted in accordance with the detected input. In some implementations that include a touch-screen display that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of the portable computing system 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

In some embodiments one or more predefined intensity thresholds are used to determine whether a particular input satisfies an intensity-based criterion. For example, the one or more predefined intensity thresholds include (i) a contact detection intensity threshold $IT_0$, (ii) a light press intensity threshold $IT_L$, (iii) a deep press intensity threshold $IT_D$ (e.g., that is at least initially higher than $I_L$), and/or (iv) one or more other intensity thresholds (e.g., an intensity threshold $I_H$ that is lower than $I_L$). In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 3C:
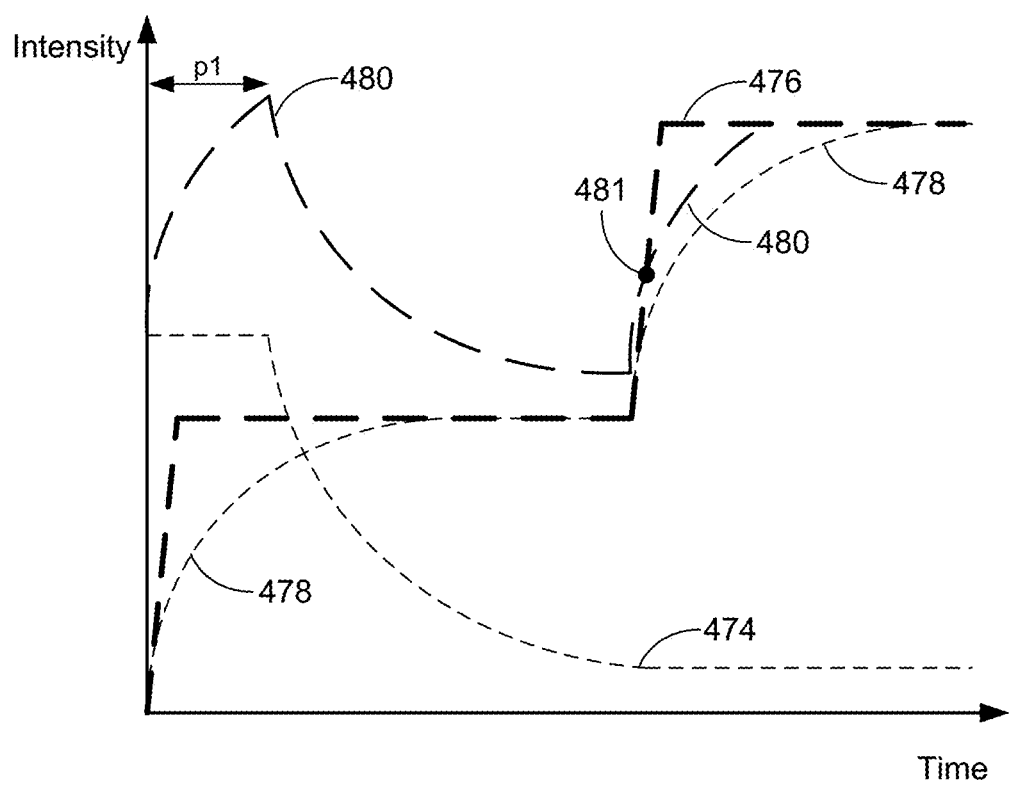
FIGS. 3C-3E illustrate examples of dynamic intensity thresholds in accordance with some embodiments.

For example, FIG. 3C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 3C), the "deep press" response is triggered.

Figure 3D:
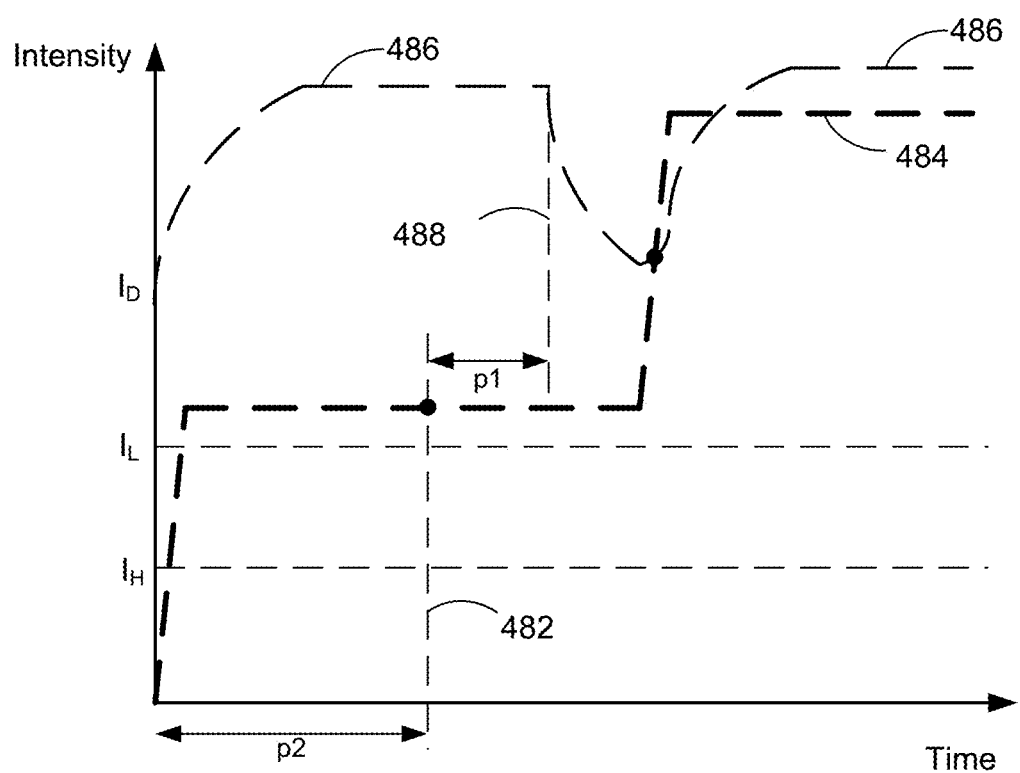

FIG. 3D illustrates another dynamic intensity threshold 486 (e.g., intensity threshold $I_D$). FIG. 3D also illustrates two other intensity thresholds: a first intensity threshold $I_H$ and a second intensity threshold $I_L$. In FIG. 3D, although touch input 484 satisfies the first intensity threshold $I_H$ and the second intensity threshold $I_L$ prior to time p2, no response is provided until delay time p2 has elapsed at time 482. Also in FIG. 3D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 3E:
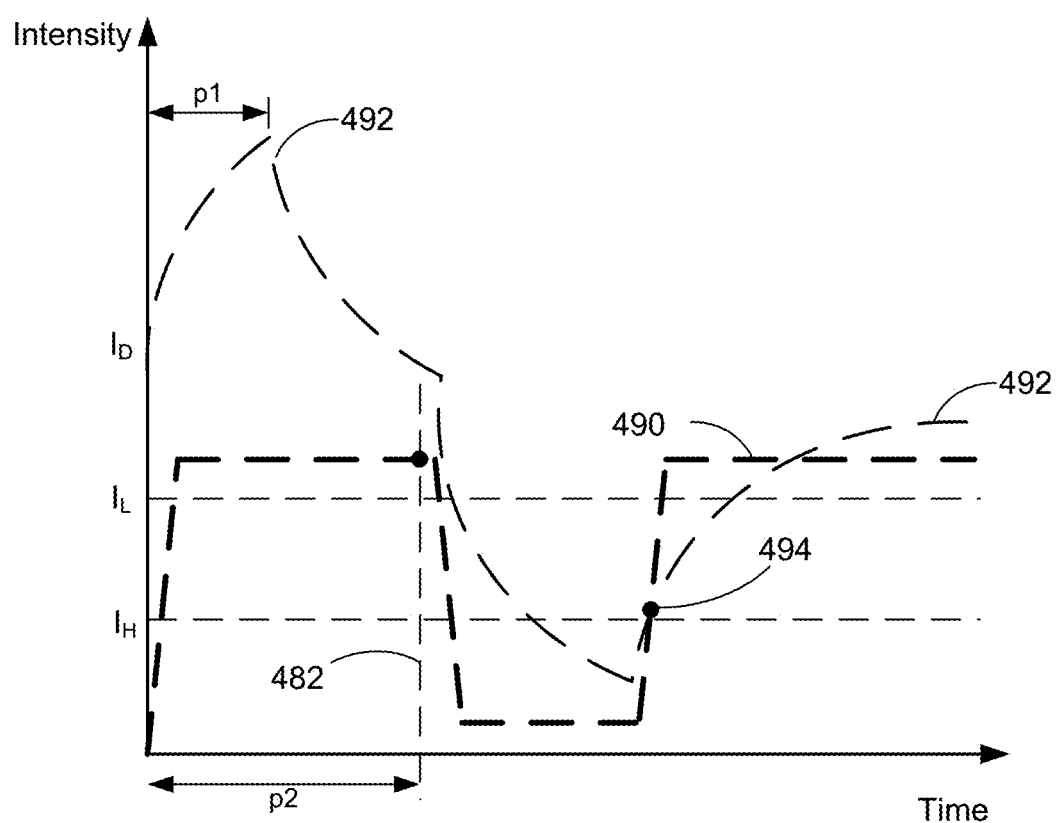

FIG. 3E illustrate yet another dynamic intensity threshold 492 (e.g., intensity threshold $I_D$). In FIG. 3E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold ITS is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UIs") and associated processes that may be implemented by portable computing system 100 (FIG. 1A) or desktop computing system 200 (FIGS. 2A-2D). In some embodiments, primary display 102 is implemented in display portion 110 of portable computing system 100 (FIG. 1A). Alternatively, in some embodiments, primary display 102 is implemented in peripheral display device 204 (FIGS. 2A-2D). In some embodiments, dynamic function row 104 is a touch-sensitive secondary display implemented in body portion 120 of portable computing system 100 (FIGS. 1A-1B). Alternatively, in some embodiments, dynamic function row 104 is a touch-sensitive secondary display implemented in peripheral keyboard 206 (FIGS. 2A-2B), first peripheral input mechanism 212 (FIG. 2C), or second peripheral input mechanism 222 (FIG. 2D).

FIGS. 5A-5N are schematics of primary and secondary displays used to illustrate example user interfaces for enabling low-vision users to interact with touch-sensitive secondary displays, in accordance with some embodiments. The user interfaces in these figures are used to illustrate the methods and/or processes described below, including the methods in FIGS. 6A-6C, 7A-7C, and 8A-8C. One of ordinary skill in the art will appreciate that the following user interfaces are merely examples. Moreover, one of ordinary skill in the art will appreciate that additional affordances and/or user interface elements, or that fewer affordances and/or user interface elements may be used in practice.

FIG. 5A illustrates primary display 102 displaying a user interface for a system preferences application, in which an Accessibility option for "Enable TouchBar Zoom" is presented. As is also shown in FIG. 5A, affordances displayed at the touch-sensitive secondary display 104 are used to activate or control application-specific functionality associated with the system preferences application that is currently displayed at the primary display 102. For example, the touch-sensitive secondary display includes application-specific affordances for enabling touchbar zoom, navigating between menu options (affordances next to the system-level "esc" affordance), and a "show all" affordance for causing the primary display to exit the Accessibility menu and instead present all of the system preference menu options. FIG. 5A also illustrates that, in addition to these application-specific affordances, the touch-sensitive secondary display 104 includes system-level affordances 5085-5088 for controlling system-level functions (as discussed below in reference to method 600).

FIG. 5A shows user selection of the enable touchbar zoom checkbox using a cursor 504 (in some embodiments, the primary display is also touch-sensitive and, thus, a user may provide an input using their finger or a stylus instead of using the cursor 504). In response to user selection of the checkbox, the touchbar zoom accessibility mode is then enabled for the touch-sensitive secondary display 104 (as shown be the selected checkbox at both the primary and the touch-sensitive secondary displays in FIG. 5B). In some embodiments, an accessibility mode is a mode of operation in which certain features are activated to enable users with vision, hearing, physical and motor skills, or learning and literacy impairments to interact with their electronic devices (i.e., to allow people with disabilities to drive a user interface in non-traditional ways), and these certain features are not available (or may be disabled) during a normal mode of operation for electronic devices. For example, as described herein, a touchbar zoom accessibility mode is a mode of operation for a touch-sensitive secondary display in which interactions at the touch-sensitive secondary display cause a zoomed-in representation of affordances and user interfaces displayed at the touch-sensitive secondary display to be presented at a primary display, thereby enabling low-vision users of the touch-sensitive secondary display to view and interact with these affordances and user interfaces. Stated another way, activating the touchbar zoom accessibility mode allows people with vision impairments to drive user interfaces presented at the touch-sensitive secondary display in a non-traditional way, i.e., by viewing a zoomed-in representation on a primary display and providing selection and other inputs at the touch-sensitive secondary display. In some embodiments, the touchbar zoom accessibility mode is disabled by default and must be activated using, e.g., the user interfaces shown in FIGS. 5A-5B.

Figure 5B:
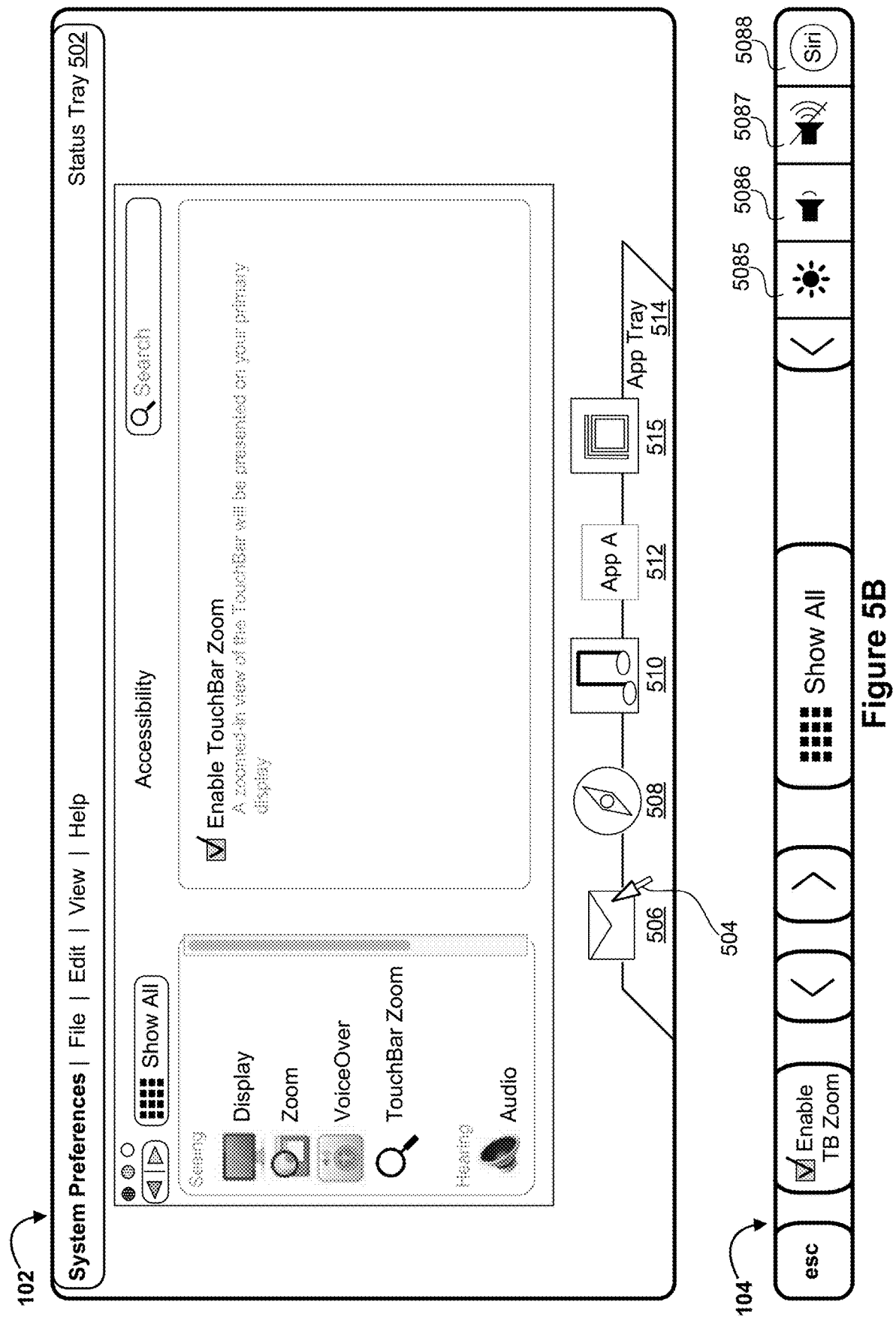

FIG. 5B also illustrates user selection of a mail icon 506, using cursor 504, from within an app tray 514 that includes affordances 506-515 for activating various applications. In response to the user selection of the mail icon 506, a user interface for the mail/email application 580 is then presented on the primary display 102 and the touch-sensitive secondary display 104 is updated to include new application-specific affordances that correspond to functions available within the mail application 580 (e.g., affordances 5080-5084).

Figure 5C:
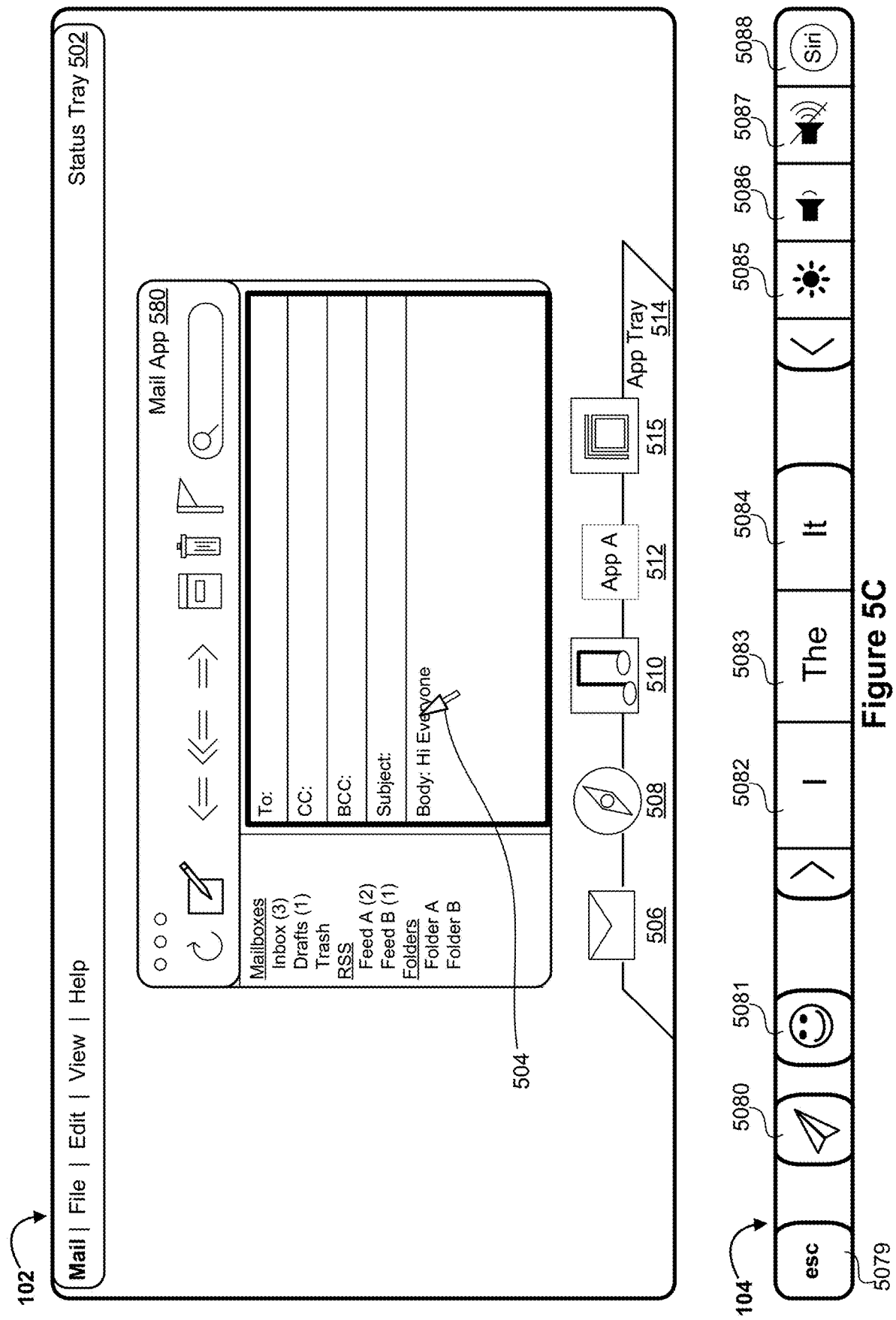
Figure 5D:
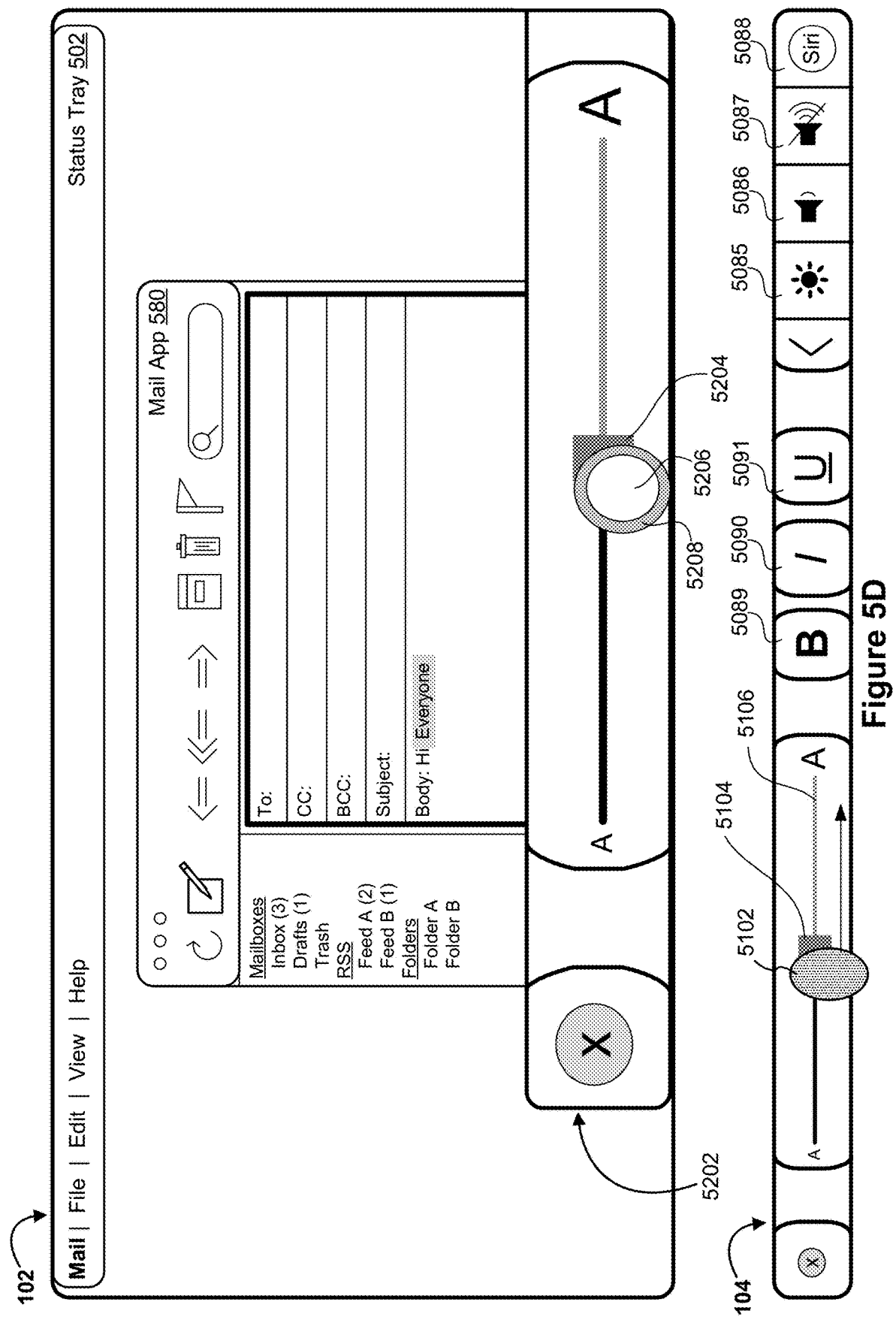

FIG. 5C also illustrates a user selecting text "Everyone," using cursor 504, within the body of an email that is displayed at the user interface for the email application 580. As shown in FIG. 5D, in response to the user selecting this text, the text is then highlighted at the primary display 102 and the touch-sensitive secondary display is updated to include application-specific affordances that are used to manipulate how the selected text is rendered or displayed (e.g., affordances 5102, 5106, and 5089-5091).

FIG. 5D also illustrates an input 5102 at the touch-sensitive secondary display 104 that contacts the affordance 5104 and, in response to the input 5102, the primary display is updated to present a zoomed-in representation of the contacted affordance 5104 (e.g., zoomed-in representation 5204) that is shown within the user interface 5202 that includes zoomed-in representations of other affordances displayed at the secondary display 104. Additionally, a focus indicator 5206 is presented at the user interface 5202 that is positioned to correspond to the position of the input 5102 at the secondary display 104. By providing larger affordances and a focus indicator, in response to just a single input at the secondary display 104, low-vision users are enabled to interact with (and have sustained interactions with) the touch-sensitive secondary display 104 (as explained in more detail below in reference to the methods 600-800).

Figure 5E:
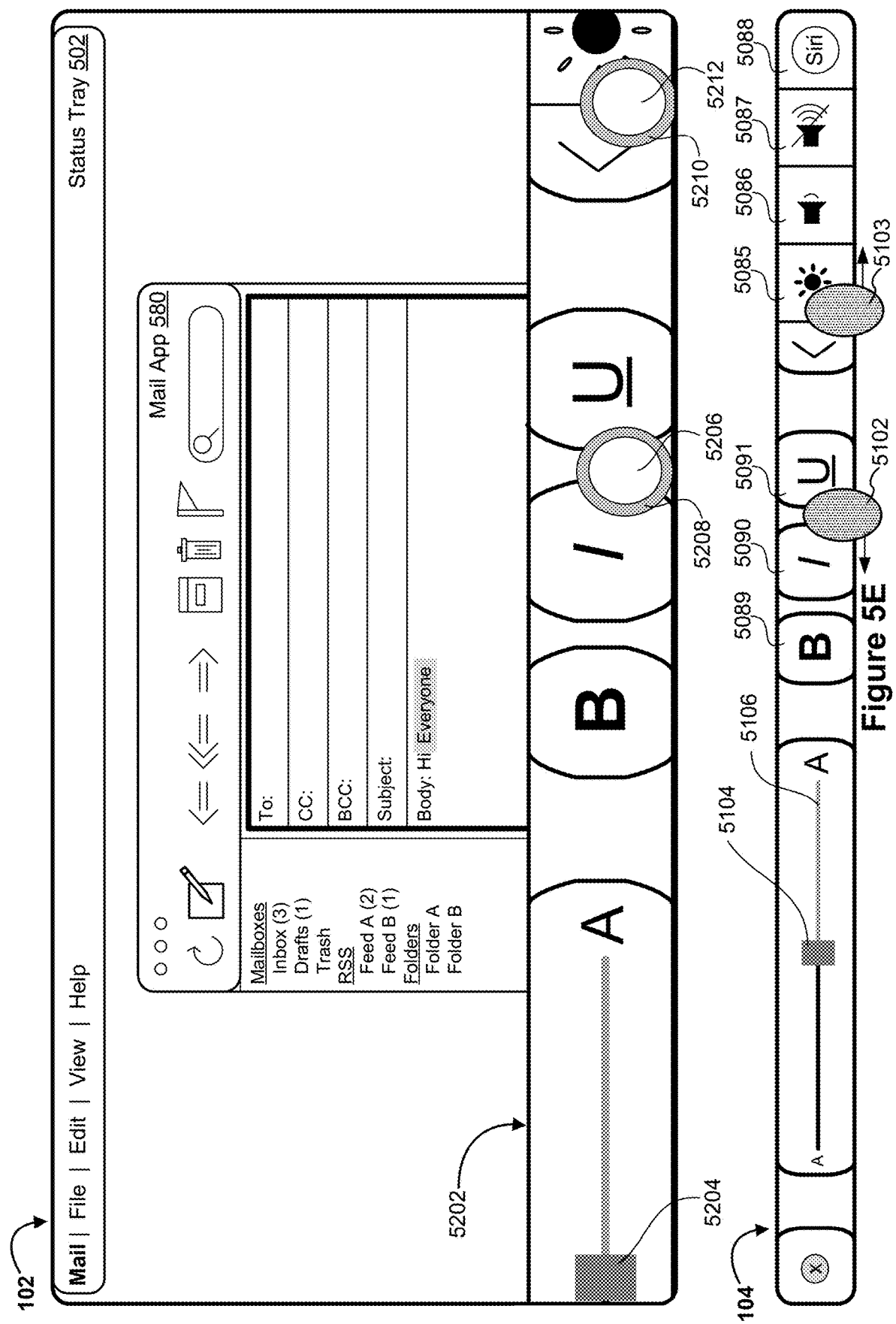
Figure 5F:
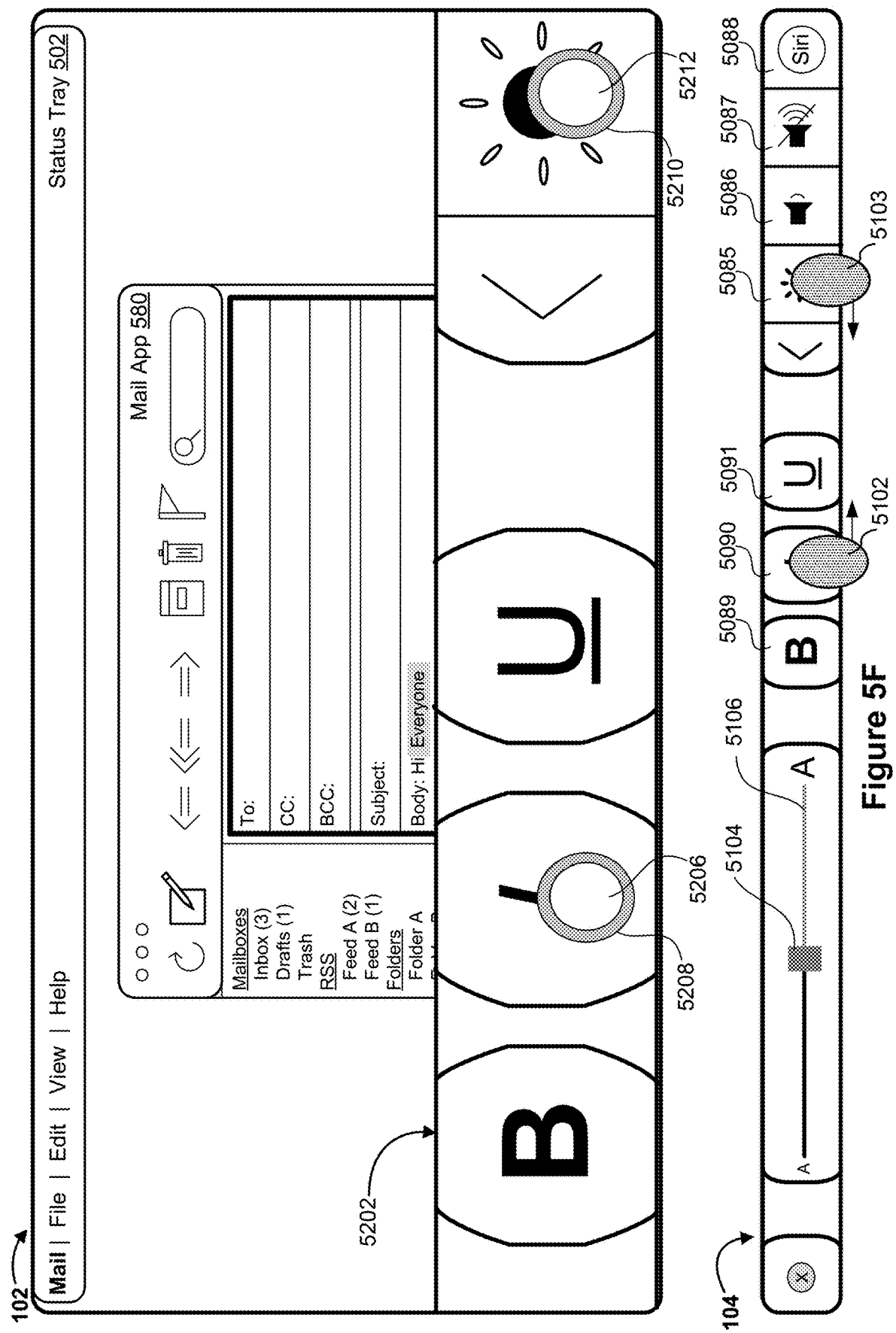

FIG. 5D also shows that as the input 5102 begins moving laterally across the secondary display 104 and, in response, the user interface 5202 is shifted in accordance with this lateral movement and to reveal other zoomed-in representations of affordances on the primary display (as shown in FIG. 5E, the user interface 5202 shifts to the right to reveal additional zoomed-in affordances). FIG. 5E shows a second input 5103 that contacts the touch-sensitive secondary display 104 (in response a second focus indicator is presented at the zoomed-in user interface 5202 that is positioned based on a position of the second input 5103 at the secondary display 104). As shown in FIG. 5E, the input 5102 and the second input 5103 then are used to provide a de-pinch gesture in which the two inputs move in substantially opposite directions across the secondary display 104 and, in response to this de-pinch gesture, the zoom level of the zoomed-in user interface 5202 is increased (as shown in FIG. 5F). In some embodiments, a user also presses a key, such as a "Command" key before providing the de-pinch gesture, to modify the zoom level of the zoomed-in user interface via a de-pinch gesture.

Figure 5G:
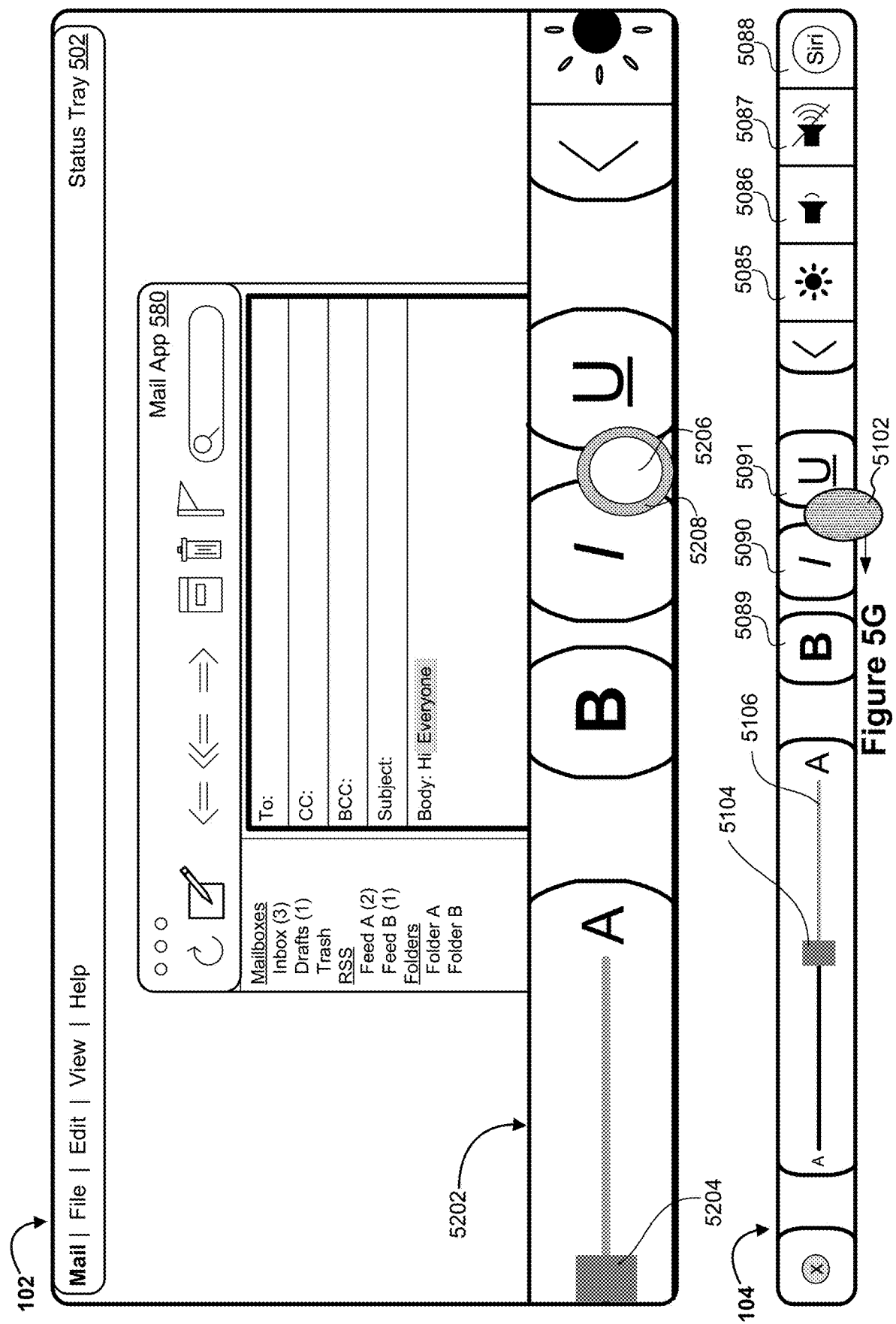

In some embodiments, users are also able to decrease the zoom level by providing a pinch gesture (as shown for inputs 5102 and 5103 in FIG. 5F) and, in response, a zoom level of the zoomed-in user interface 5202 is decreased accordingly (as shown in FIG. 5G). FIG. 5G then illustrates input 5102 moving laterally across the secondary display 104 and back to its original position (FIG. 5H) that was shown in FIG. 5D. FIG. 5H illustrates that a user may activate the affordance 5104 by providing a split-tap gesture, e.g., maintaining input 5102 at the secondary display 104 and also providing momentary tap 5106 at the secondary display 104. In response, an appearance of the focus indicator 5206 may change (FIG. 5K) and the affordances 5104 and 5204 are then movable across their respective associated sliders.

Figure 5J:
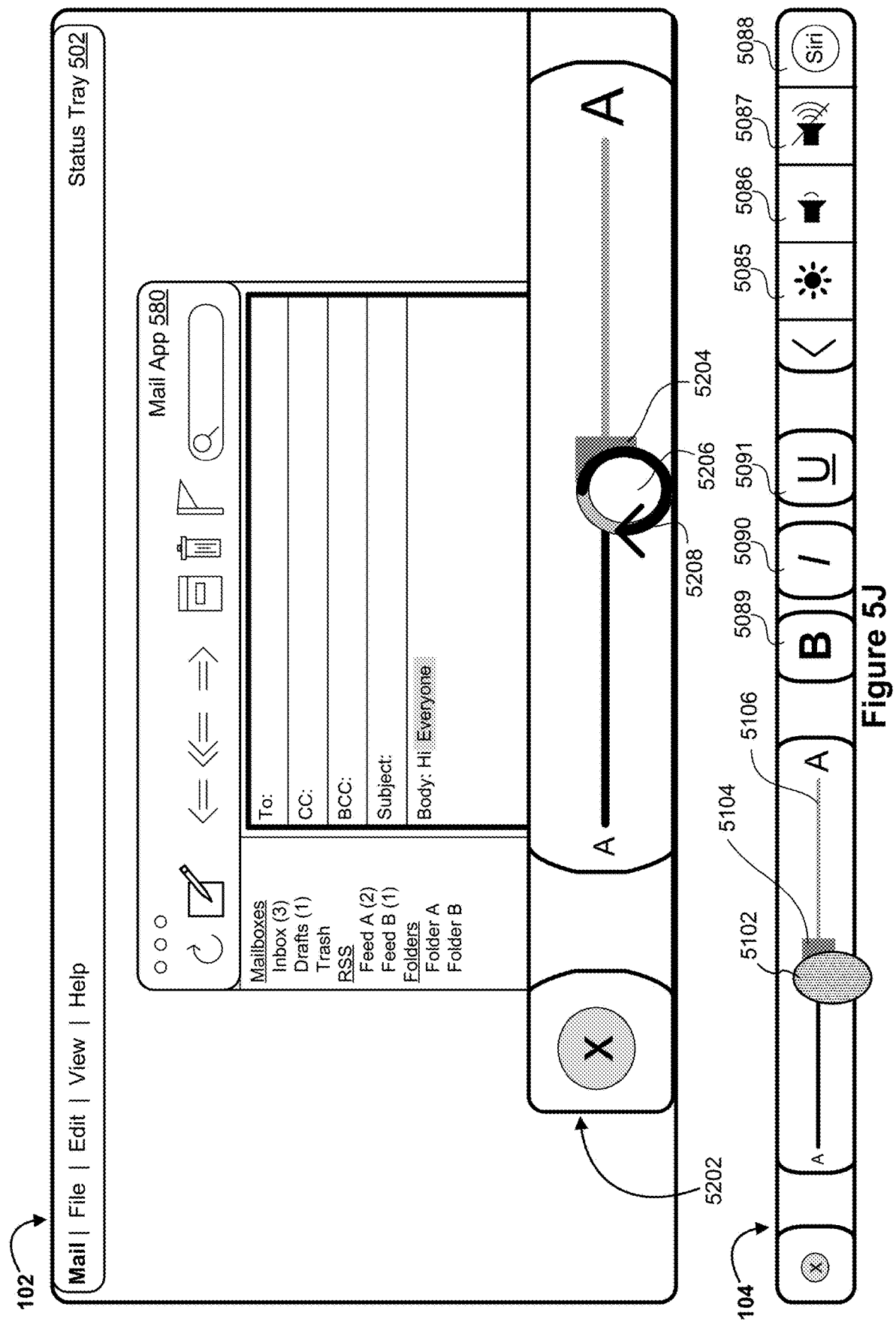

Alternatively, instead of providing the split-tap gesture, a user may maintain contact with affordance 5104 for more than a predetermined period of time (e.g., 0.5 seconds, 0.75 seconds, or 1 second) and, in response, a representation of a countdown timer 5208 is updated to being counting down until the affordance 5104 is activated (as shown in FIGS. 5I-5K in which the countdown timer that surrounds the focus indicator 5206 moves in a clockwise direction until it expires and the affordances 5104 and 5204 are then movable).

Figure 5L:
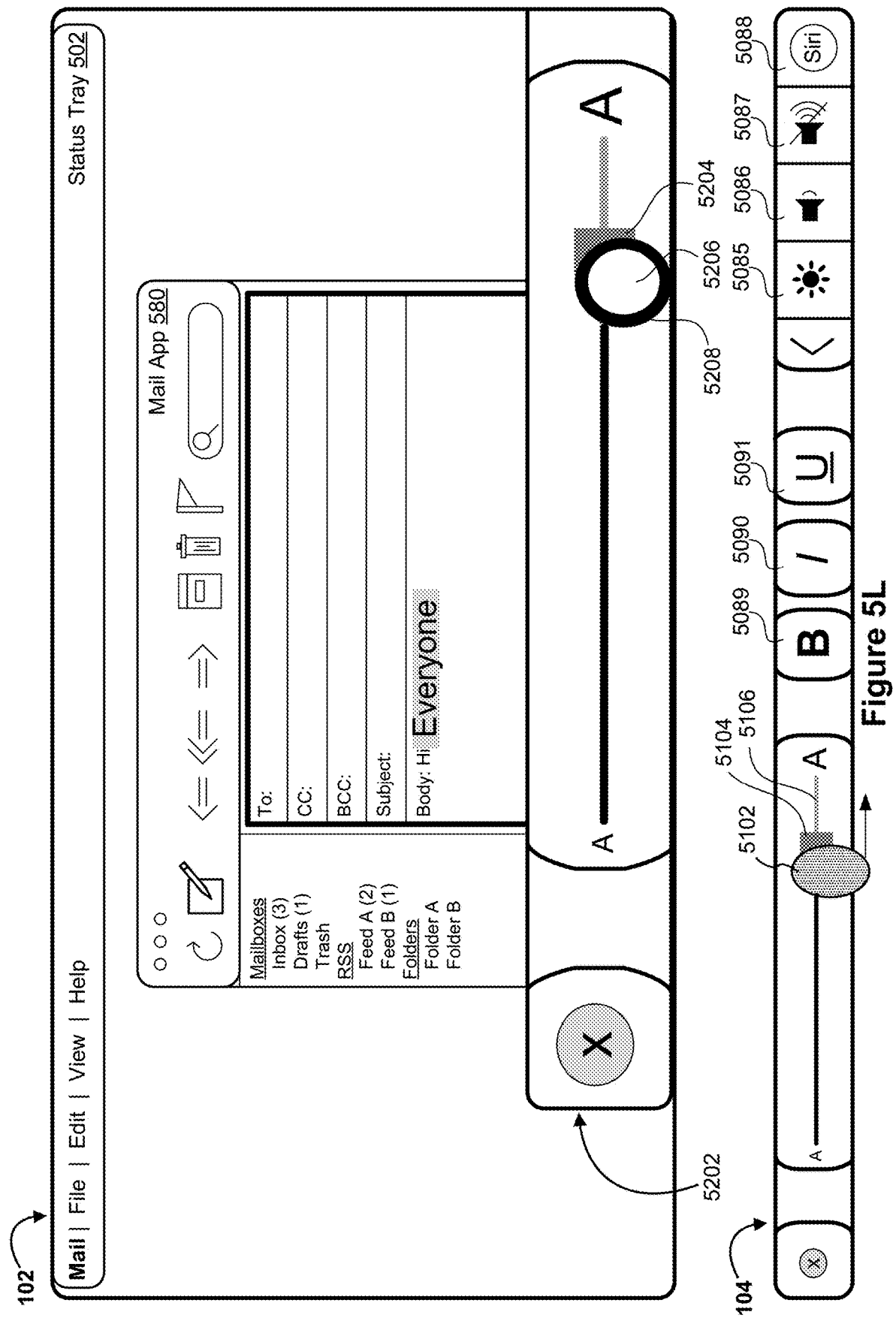

As shown in FIG. 5L, a user may then move the affordances 5104 and 5204 across their respective sliders to manipulate a text size associated with the selected "Everyone" text. For example, as the user moves the affordances 5104/5204 across the sliders, the text size for "Everyone" is dynamically increased in accordance with the movement across the sliders (FIG. 5L).

Figure 5M:
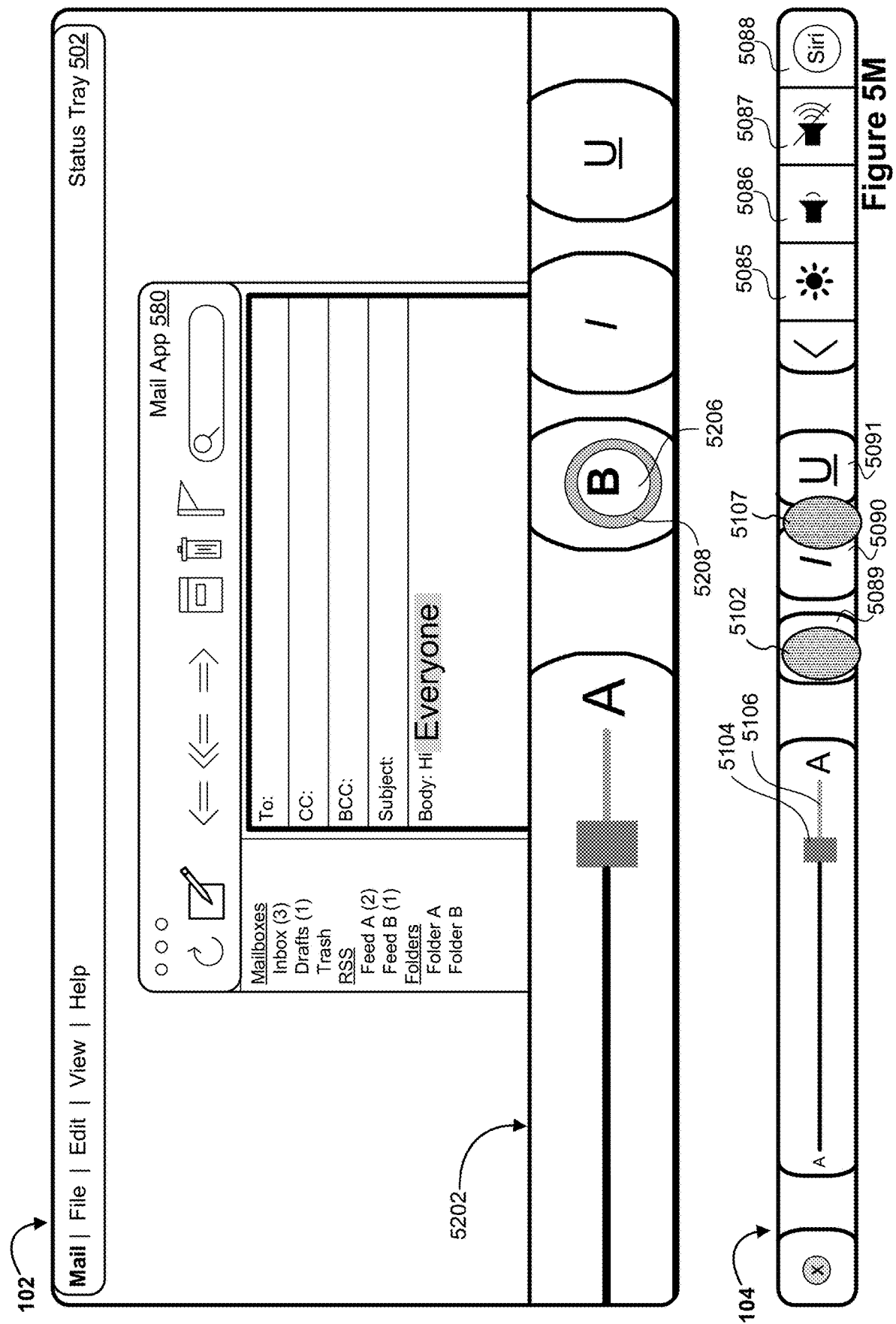
Figure 5N:
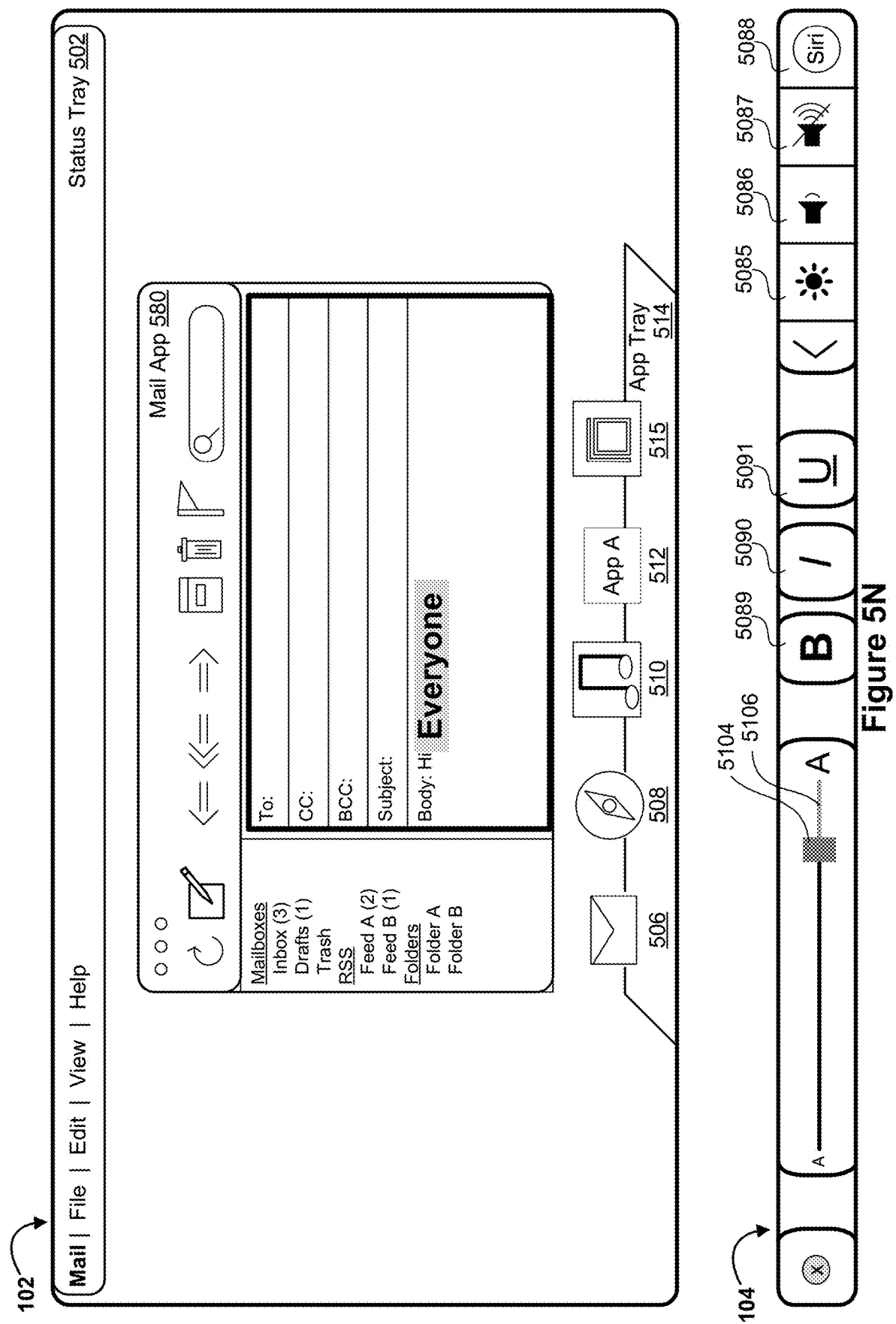

Turning now to FIG. 5M, an additional example of a split-tap gesture is provided, in which the input 5102 remains in contact with an affordance (e.g., affordance 5089 for bolding text in the email application) and a momentary tap 5107 is detected that is not over the affordance. In response to this split-tap gesture, the affordance contacted by the input 5102 (e.g., affordance 5089) is activated and a function associated with that affordance is performed (e.g., as shown in FIG. 5N, the selected text "Everyone" now appears bolded). FIG. 5N also illustrates that input 5102 has lifted-off from the touch-sensitive secondary display 104 and, in response, the zoomed-in representations are no longer presented at the primary display 102.

Additional descriptions regarding FIGS. 5A-5N are provided below in references to methods 600-800.

Figure 6B:
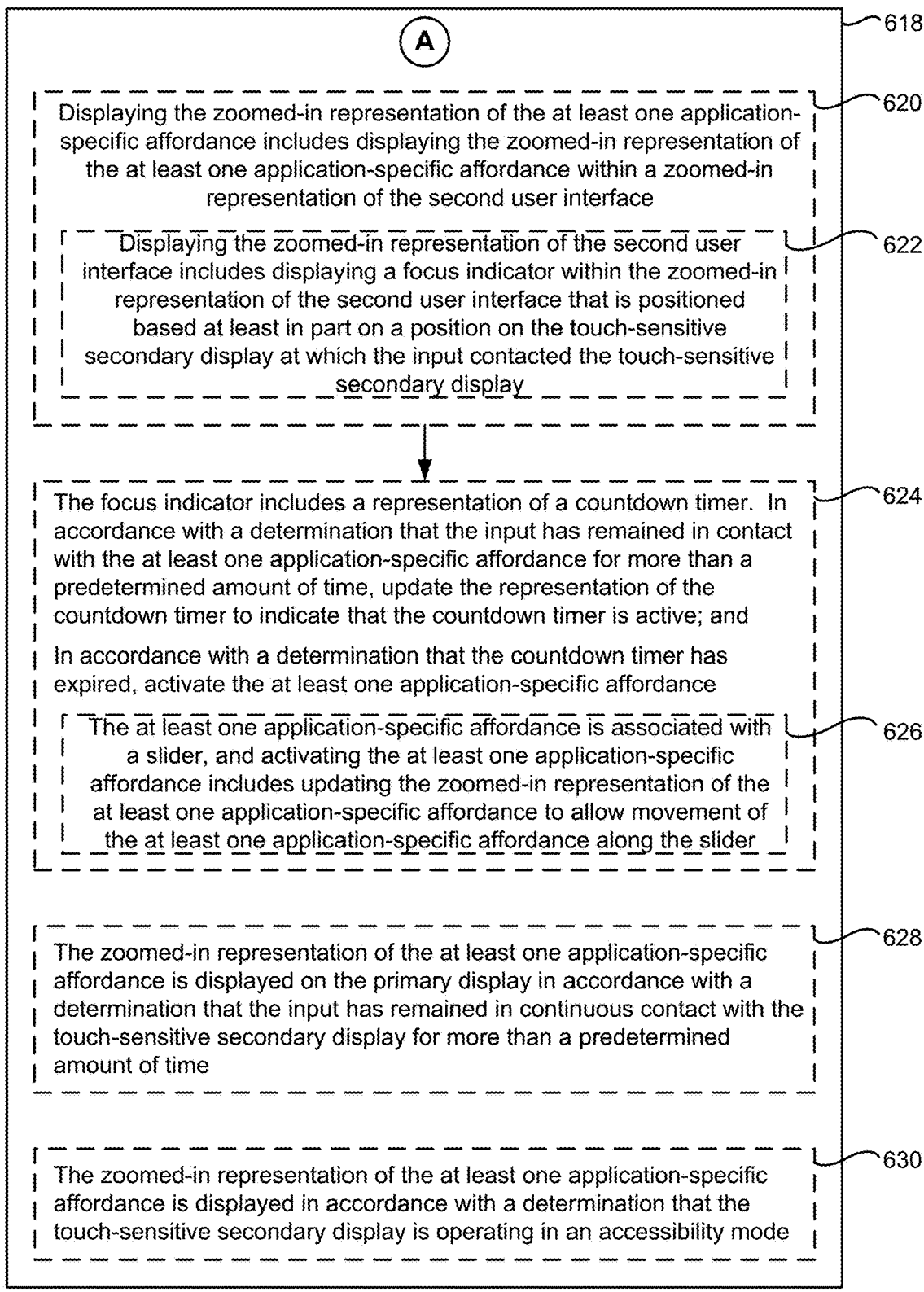

FIGS. 6A-6C are a flowchart of a method 600 that enables low-vision users to interact with touch-sensitive secondary displays, in accordance with some embodiments. The method 600 is performed (602) at a computing system including one or more processors, memory, a first housing including a primary display, and a second housing at least partially containing a touch-sensitive secondary display that is distinct from the primary display. Some operations in method 600 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A) and the second housing is a body portion 120 of the portable computing system 100, and the second housing at least partially contains the touch-sensitive secondary display (e.g., dynamic function row 104, FIGS. 1A-1B) and a physical keyboard (e.g., the set of physical keys 106) (604).

In some embodiments, the second housing is not connected to the first housing (606), e.g., because the first housing is part of a first device and the second housing is part of a different device other than the first device (e.g., the second housing could be part of a mobile phone, a tablet device, or any other device that includes affordances that are displayed on a smaller secondary display while that other device is connected to a computing system that includes a larger primary display). As one non-limiting example, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). As another example, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard. As one more example, in some embodiments, the second housing is part of a wearable computing device (608), such as a smart watch.

As described below, the method 600 (and associated interfaces) enables low-vision users to interact with touch-sensitive secondary displays. As shown in FIG. 6A, the method 600 includes displaying (610), on the primary display, a first user interface for an application (e.g., as shown in FIG. 5C, a first user interface for an email application is shown as displayed on the primary display 102). The method 600 also includes: displaying (612), on the touch-sensitive secondary display, a second user interface that includes a plurality of application-specific affordances that control functions available within the application, and each of the plurality of application-specific affordances is displayed with a first display size. For example, the plurality of application-specific affordances are selected to control contextually-relevant functions in the application, such as functions that are a user would need to access based on what they are currently doing within the application (such as the plurality of application-specific affordances shown in FIG. 5C that may be used to send an email, add emoticons to an email message, and to select various autocomplete options). In some embodiments or circumstances, the plurality of application-specific affordances also changes based on the user's interactions with the application (e.g., FIG. 5C shows that the user is selecting text in an email message using cursor 504 and, in response to selection of the text, the plurality of application-specific affordances that are displayed in the touch-sensitive secondary display 104 is updated to include text-editing options, such as slider knob 5104 for editing text size by dragging it along slider 5106 and affordances 5082-5084 for selecting bold, italic, and underline options, as shown in FIG. 5D). Additional details and numerous examples regarding how affordances may change at a touch-sensitive secondary display based on a user's interactions at a primary display are provided in commonly-owned U.S. patent application Ser. No. 15/275,298, which is hereby incorporated by reference in its entirety.

In some embodiments, and as shown in FIG. 5C, the touch-sensitive secondary also includes one or more system-level affordances for activating or controlling system-level functions (e.g., affordance 5079 for performing an escape function, affordance 5085 for controlling brightness of the primary display 102, affordance 5086 for controlling volume levels for the computing system, affordance 5087 for muting sound at the computing system, and affordance 5088 for controlling or activating a virtual personal assistant available via the computing system).

In some embodiments, each of the application-specific affordances is (only) selectable via one or more inputs at the touch-sensitive secondary display (614). Stated another way, the affordances (any of the plurality of application-specific affordances and any system-level affordances) may not be selected in any other way except by providing inputs at the secondary display. In some embodiments, the one or more inputs include a quick tap that includes a liftoff of the input followed by a tap shortly thereafter, a split-tap (as described below), and a selection event that occurs after expiration of a countdown timer (as described below).

The method 600 also includes detecting (616), via the touch-sensitive secondary display, an input that contacts at least one application-specific affordance of the plurality of application-specific affordances (e.g., input 5102 at affordance 5104, FIG. 5D). In response to detecting the input and while the input remains in contact with the touch-sensitive secondary display, the method 600 includes (618) continuing to display, on the primary display, the first user interface for the application (e.g., the primary display continues to display the first user interface for the email application) and displaying, on the primary display, a zoomed-in representation of the at least one application-specific affordance (e.g., zoomed-in representation 5204). The zoomed-in representation of the at least one application-specific affordance is displayed with a second display size that is larger than the first display size (as shown in FIG. 5D affordance 5204 is shown with a larger display size than affordance 5104).

In some instances, users of computing systems (in particular, low-vision users) are unable to accurately view icons or affordances that are displayed with a small display size (such as those shown on a smart watch). Populating a touch-sensitive secondary display with application-specific affordances and then displaying a zoomed-in representation of one of those affordances at a larger, primary display in response to a single input (as explained above) provides these users with clear visual feedback indicating which affordance they may be selecting. Providing this improved visual feedback to the user enhances operability of the device and makes the human-machine interface more efficient (e.g., by helping the user to provide proper inputs and reducing user mistakes when operating/interacting with affordances displayed on the secondary display). Additionally, allowing these users to accurately view affordances displayed on a small screen enables a sustained interaction with the touch-sensitive secondary display that would not otherwise be possible due to frequent mistakes (e.g., incorrect selections) and the need to waste time correcting these mistakes.

In some embodiments, displaying the zoomed-in representation of the at least one application-specific affordance includes (620) displaying the zoomed-in representation of the at least one application-specific affordance within a zoomed-in representation of the second user interface (e.g., zoomed-in affordance 5204 is displayed within zoomed-in representation 5202 of the second user interface). In some embodiments, displaying the zoomed-in representation of the second user interface includes displaying on the primary display a zoomed-in representation of a second application-specific affordance that is adjacent to the application-specific affordance on the touch-sensitive secondary display.

Displaying a zoomed-in view of the at least one application-specific affordance within a zoomed-in representation of the second user interface in response to a single input provides users with clear visual feedback indicating which affordance they may be selecting and indicating which affordances are located in proximity thereto. Providing this improved visual feedback to the user enhances operability of the device and makes the human-machine interface more efficient (e.g., by helping the user to provide proper inputs and reducing user mistakes when operating/interacting with affordances and other neighboring affordances displayed on the secondary display). Additionally, allowing these users to accurately view affordances displayed on a small screen enables a sustained interaction with the touch-sensitive secondary display that would not otherwise be possible due to frequent mistakes (e.g., incorrect selections) and the need to waste time correcting these mistakes.

In some other embodiments, instead of (or in addition to) displaying the zoomed-in representation of the at least one application-specific affordance within the zoomed-in representation of the second user interface, the zoomed-in representation of the at least one application-specific affordance is displayed in a central region of the primary display (e.g., overlaying the first user interface for the email application).

Turning now to FIG. 6B, in some embodiments, displaying the zoomed-in representation of the second user interface includes (622) displaying a focus indicator (e.g., focus indicator 5206, including a representation of a countdown timer 5208, FIG. 5D) within the zoomed-in representation of the second user interface that is positioned based at least in part on a position on the touch-sensitive secondary display at which the input contacted the touch-sensitive secondary display (e.g., the position of focus indicator 5206 within zoomed-in representation 5202 generally corresponds to the position of input 5102 at the touch-sensitive secondary display 104). In some embodiments, the focus indicator is displayed in response to the input and provides low-vision users with a clear visual indication as to where their fingers are located on the touch-sensitive secondary display, to allow these users to accurately select displayed affordances from within the touch-sensitive secondary display. Displaying a focus indicator within the zoomed-in representation of the second user interface provides users with clear visual feedback as to the location of their finger on the touch-sensitive secondary display. In some instances, the users may not be able to see small affordances displayed on the touch-sensitive secondary display due to vision problems or due to their finger obscuring affordances located underneath. Therefore, providing the focus indicator within the zoomed-in representation enhances operability of the device and makes the human-machine interface more efficient (e.g., by helping the user to provide proper inputs and reducing user mistakes when operating/interacting with affordances and other neighboring affordances displayed on the secondary display). Additionally, allowing these users to accurately understand the location of their finger on the touch-sensitive secondary display enables a sustained interaction with the touch-sensitive secondary display that would not otherwise be possible due to frequent mistakes (e.g., incorrect selections) and the need to waste time correcting these mistakes.

In some embodiments, the focus indicator includes (624) a representation of a countdown timer (e.g., representation 5208 of a countdown timer that encircles a focus indicator 5206). In some embodiments, the method 600 includes: in accordance with a determination that the input has remained in contact with the at least one application-specific affordance for more than the predetermined amount of time (this determination may also include determining that the user has not moved the input beyond a threshold distance (e.g., 5 px) over a threshold period of time (e.g., 1 second)), updating the representation of the countdown timer to indicate that the countdown timer is active. For example, as shown in FIGS. 5H-5K, the representation 5208 of the countdown timer that encircles the focus indicator 5206 moves in a clockwise direction to reflect that the timer is counting down. In accordance with a determination that the countdown timer has expired (e.g., after a period of 1, 1.5, or 2 seconds), the method 600 includes: activating the at least one application-specific affordance. Displaying a focus indicator with a representation of a countdown timer that begins counting down after an input has remained in contact with an affordance for more than a predetermined period of time provides users with clear visual feedback that they are about to select an affordance. In some instances, the users may not be able to see small affordances displayed on the touch-sensitive secondary display due to vision problems or due to their finger obscuring affordances located underneath and, thus, these users may not realize when they are activating/selecting various affordances. Therefore, providing the focus indicator with the countdown timer enhances operability of the device and makes the human-machine interface more efficient (e.g., by helping the user to provide proper inputs and reducing user mistakes when operating/interacting with affordances and other neighboring affordances displayed on the secondary display). Additionally, allowing these users to accurately understand when they are about to activate an affordance enables a sustained interaction with the touch-sensitive secondary display that would not otherwise be possible due to frequent mistakes (e.g., incorrect selections) and the need to waste time correcting these mistakes.

In some embodiments, activating the application-specific affordance may include any of the following: (i) performing a function that is associated with the at least one application-specific affordance (such as a function available via the application); (ii) expanding the affordance within the touch-sensitive secondary display and the primary display to reveal additional functionality (such as expanding a volume affordance to display a slider that allows for modifying volume settings); and (iii) allowing a user to move the affordance along a slider. In some embodiments, and as explained below, activating the at least one application-specific affordance may be performed based on receiving other types of inputs. For example, activation of the affordance may occur in accordance with a determination that a quick tap gesture has been received over the at least one application-specific affordance or that a split-tap has been received that selects the at least one application-specific affordance (i.e., a first input is over the affordance and a second tap is not over the affordance but causes selection of the affordance).

In some embodiments, the at least one application-specific affordance is associated (626) with a slider (e.g., affordance 5104 is associated with slider 5106), and activating the at least one application-specific affordance includes updating the zoomed-in representation of the at least one application-specific affordance in accordance with (or, more generally, to allow) movement of the at least one application-specific affordance along the slider (e.g., as shown in FIG. 5K affordance 5204 is now movable along the slider, in response to the countdown timer of focus indicator 5206 having expired). In some embodiments, the at least one application-specific affordance is not slid-able prior to it being activated after expiration of the countdown timer (or after its activation in response to the quick tap and split-tap inputs discussed above). In some embodiments, the touch-sensitive secondary display is also updated to allow this same movement of the at least one application-specific affordance (e.g., affordance 5104 now moves along slider 5106). In some embodiments, after the expiration of the countdown timer, a visual characteristic used to render (or that is associated with) the focus indicator is modified to indicate that the focus indicator is now able to move the at least one application-specific affordance (e.g., as shown in FIGS. 5K-5L, the representation of the countdown timer remains in its expired state to indicate that the affordance located underneath is now movable/slid-able).

Activating an affordance that is associated with a slider after expiration of a countdown timer helps to enhance operability of the device and makes the human-machine interface more efficient (e.g., by reducing user mistakes when operating/interacting with affordances and helping to avoid accidental modification of a slider). Additionally, allowing users to accurately understand when they are able to manipulate a slider enables a sustained interaction with the touch-sensitive secondary display that would not otherwise be possible due to frequent mistakes (e.g., incorrect or accidental manipulations of a slider) and the need to waste time correcting these mistakes.

In some embodiments, the zoomed-in representation of the at least one application-specific affordance is displayed (628) on the primary display in accordance with a determination that the input has remained in continuous contact with the touch-sensitive secondary display for more than a predetermined amount of time (e.g., 0.5 seconds, 0.75 seconds, or 1 second pass, while the input 5012 remains in continuous contact with the touch-sensitive secondary display 104, before the zoomed-in representation is presented at the primary display). In some embodiments, if the input remains in such continuous contact with the touch-sensitive secondary display then the device determines that the input is not a selection or tap input and, based on that determination, the devices then presents the zoomed-in representation of the at least one application-specific affordance at the primary display (in some embodiments, and as discussed below, the device conducts this determination only when the touch-sensitive secondary display is operating in an accessibility mode).

In some embodiments, the zoomed-in representation of the at least one application-specific affordance is displayed (630) in accordance with a determination that the touch-sensitive secondary display is operating in an accessibility mode. (e.g., the accessibility mode is activated by selecting a system preference, as shown in FIGS. 5A-5B, and as explained in more detail below in reference to method 700).

With reference now to FIG. 6C, the method 600, in some embodiments, includes: while the input remains in contact with the at least one application-specific affordance at the touch-sensitive secondary display, detecting (632) a tap gesture (e.g., tap 5105, FIG. 5H) at the touch-sensitive secondary display that does not contact the at least one application-specific affordance. In some embodiments, the touch-sensitive secondary display includes a first area comprising the at least one application-specific affordance and a second area comprising other affordances in the plurality of application-specific affordances (i.e., these other affordances do not include the at least one application-specific affordance), and the tap gesture is received at the second area and thus does not contact the at least one application-specific affordance. In some embodiments, this "split-tap gesture" is an alternative selection option (instead of having to wait for a countdown timer to expire). In response to detecting the tap gesture, the method 600 includes: activating the at least one application-specific affordance (e.g., allowing a user to move affordances 5204/5104 along respective sliders, as explained above in reference to FIG. 5K-5L). Another example is shown in FIGS. 5M-5N, in which the input 5102 remains in contact with the touch-sensitive secondary display at affordance 5090 and then tap gesture 5107 is received that is not over the affordance 5090 and, in response, the affordance 5090 is activated which causes the selected text "Everyone" at the primary display 102 to be bolded. Allowing activation of an affordance that is in contact with an input in response to a tap gesture that is not over the affordance (the split-tap gesture) enhances operability of the device and makes the human-machine interface more efficient (e.g., by allowing users to place a first finger over a desired affordance and then use a different finger to perform a selection of that desired affordance). Additionally, allowing users to move their first finger freely around the touch-sensitive secondary display allows users to maintain a sustained interaction with the touch-sensitive secondary display (by exploring which affordances are displayed at the touch-sensitive secondary display), that would not otherwise be possible due to frequent mistakes (e.g., incorrect or accidental selections of affordances) and the need to waste time correcting these mistakes.

In some embodiments, users are also able to activate various types of affordances using the split-tap gesture. For example, in some embodiments, users are able to manipulate date or time ranges for calendar events by first placing their fingers at either end of the date-range-modification affordance (such as the examples shown in FIGS. 36J-36Q of commonly-owned patent application Ser. No. 15/275,298, incorporated by reference above). In some embodiments, the primary display is then updated to include focus indicators with countdown timers at each end of the date-range-modification affordance and the user is able to manipulate the date range upon expiration of both of the countdown timers (as shown in FIGS. 5E-5F, focus indicators 5206 and 5212 are provided with each input at the touch-sensitive secondary display). In some embodiments, users may modify one end of an affordance that includes a range of values by allowing the countdown timer of a focus indicator to expire at either end of the affordance (e.g., to manipulate just one end of the affordance).

In some embodiments, the method 600 includes: detecting (634), at the touch-sensitive secondary display, a predefined gesture (e.g., user presses command button and then performs a pinch gesture with inputs 5102 and 5103 (FIG. 5F) or de-pinch gesture with inputs 5102 and 5103 (FIG. 5E) at the touch-sensitive secondary display) that manipulates a zoom level that is used to display the zoomed-in representation of the at least one application-specific affordance at the primary display. In response to detecting the predefined gesture (or in response to detecting each incremental manipulation of the zoom level during the predefined gesture), the method 600 includes: updating the zoomed-in representation at the primary display as the zoom level is manipulated using the predefined gesture (e.g., zooming-in further in response to the de-pinch gesture of FIG. 5E or zooming-out in response to the pinch gesture of FIG. 5F). Allowing users to manipulate a zoom level for the zoomed-in representation using a predefined gesture enhances operability of the device and makes the human-machine interface more efficient (e.g., by allowing users to quickly and easily adjust the zoom level to suit their personal preferences). Additionally, allowing users to manipulate the zoom level allows users to maintain a sustained interaction with the touch-sensitive secondary display by ensuring that these users are able to adjust the zoom level so that they are able to accurately view affordances that may be displayed at different display sizes, which is important for low-vision users of various sight levels.

It should be understood that the particular order in which the operations in FIGS. 6A-6C have been described is merely one example and is not intended to indicate that the described order is the only order in which the operations could be performed. One of ordinary skill in the art would recognize various ways to reorder the operations described herein.

Figure 7B:
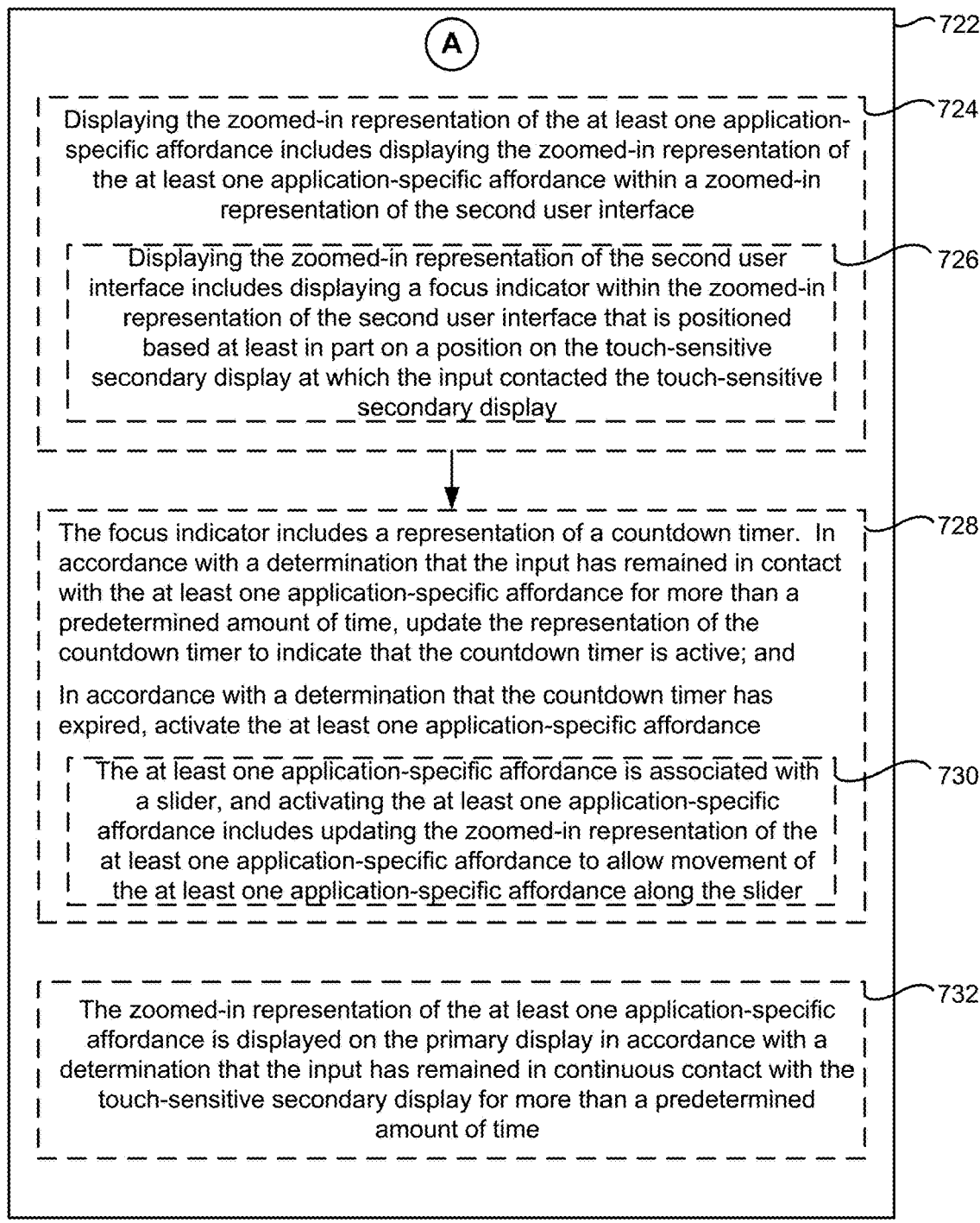

FIGS. 7A-7C are a flowchart of a method 700 that enables low-vision users to interact with touch-sensitive secondary displays, in accordance with some embodiments. The method 700 is performed (702) at a computing system including one or more processors, memory, a first housing including a primary display, and a second housing at least partially containing a touch-sensitive secondary display that is distinct from the primary display. Some operations in method 700 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A) and the second housing is a body portion 120 of the portable computing system 100, and the second housing at least partially contains the touch-sensitive secondary display (e.g., dynamic function row 104, FIGS. 1A-1B) and a physical keyboard (e.g., the set of physical keys 106) (704).

In some embodiments, the second housing is not connected to the first housing (706), e.g., because the first housing is part of a first device and the second housing is part of a different device other than the first device (e.g., the second housing could be part of a mobile phone, a tablet device, or any other device that includes affordances that are displayed on a smaller secondary display while that other device is connected to a computing system that includes a larger primary display). As one non-limiting example, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). As another example, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard. As one more example, in some embodiments, the second housing is part of a wearable computing device (708), such as a smart watch.

As described below, the method 700 (and associated interfaces) enables low-vision users to interact with touch-sensitive secondary displays. As compared to method 600, method 700 includes operating the touch-sensitive secondary display in an accessibility mode before providing zoomed-in representations at the primary display. The examples and descriptions provided above in reference to method 600 are also applicable to method 700 and, for brevity, those examples and descriptions are generally not repeated here. As shown in FIG. 7A, the method 700 includes: operating (710) the touch-sensitive secondary display in an accessibility mode. For example, as shown in FIGS. 5A-5B, a system preference option is available that allows users to enable the accessibility mode for the touch-sensitive secondary display (e.g., by selecting the checkbox to "Enable TouchBar Zoom" using a cursor 504). In some embodiments, a checkmark option is also presented at the touch-sensitive secondary display 104 that allows users to enable or disable accessibility mode by providing an input at the touch-sensitive secondary display 104 (as shown in FIG. 5A-5B).

The remaining operations of method 700 (operations 714-738) are each performed (712) while operating the touch-sensitive secondary display in the accessibility mode. The method 700 includes displaying (714), on the primary display, a first user interface for an application (e.g., an example user interface is shown for an email application in FIG. 5C). The method also includes displaying (716), on the touch-sensitive secondary display, a second user interface that includes: (i) a plurality of application-specific affordances that control functions available within the application (e.g., affordances 5080-5084, with additional description provided for these affordances above in reference to method 600) and (ii) at least one system-level affordance that controls a system-level function (e.g., affordances 5079 and 5085-5088, with additional description provided for these affordances above in reference to method 600). Each of the plurality of application-specific affordances and the at least one system-level affordance are displayed with a first display size. In some embodiments, each respective affordance is (only) selectable (718) via one or more inputs at the touch-sensitive secondary display (additional details regarding operation 718 are provided above in reference to operation 614).

The method 700 further includes: detecting (720), via the touch-sensitive secondary display, an input (e.g., input 5102, FIG. 5D) that contacts at least one application-specific affordance of the plurality of application-specific affordances (e.g., affordance 5104). In response to the detecting the input and while the input remains in contact with the touch-sensitive secondary display (722), the method includes: continuing to display, on the primary display, the first user interface for the application and displaying, on the primary display, a zoomed-in representation of the at least one application-specific affordance. The zoomed-in representation of the at least one application-specific affordance is displayed with a second display size that is larger than the first display size. Additional details and examples of operation 722 are provided above in reference to operation 618.

In some instances, low-vision users of computing systems rely on memorized key locations on a keyboard so that they are able to accurately provide inputs to a computing system. For computing systems that include a touch-sensitive secondary display with often-changing affordances, these users are not able to rely solely on memorization to provide accurate inputs. Displaying a zoomed-in representation of at least one affordance of the application-specific affordance improves operability of the computing system, because low-vision users are able to interact with controls available at the touch-sensitive secondary display that may be too small (or may be occluded from view because a user's finger is covering up the displayed controls) for the low-vision users to view accurately. In this way, low-vision users are able to take advantage of an improved man-machine interface by, e.g., having sustained interactions with a touch-sensitive secondary display (instead of having to constantly correct erroneous inputs).

Turning now to FIG. 7B, displaying the zoomed-in representation of the at least one application-specific affordance includes (724) displaying the zoomed-in representation of the at least one application-specific affordance within a zoomed-in representation of the second user interface. Additional details and examples regarding operation 724 are provided above in reference to operation 620. Displaying a zoomed-in view of the at least one application-specific affordance within a zoomed-in representation of the second user interface in response to a single input provides users with clear visual feedback indicating which affordance they may be selecting and indicating which affordances are located in proximity thereto. Providing this improved visual feedback to the user enhances operability of the device and makes the human-machine interface more efficient (e.g., by helping the user to provide proper inputs and reducing user mistakes when operating/interacting with affordances and other neighboring affordances displayed on the secondary display). Additionally, allowing these users to accurately view affordances displayed on a small screen enables a sustained interaction with the touch-sensitive secondary display that would not otherwise be possible due to frequent mistakes (e.g., incorrect selections) and the need to waste time correcting these mistakes.

In some embodiments, displaying the zoomed-in representation of the second user interface includes (726) displaying a focus indicator within the zoomed-in representation of the second user interface that is positioned based at least in part on a position on the touch-sensitive secondary display at which the input contacted the touch-sensitive secondary display. Additional details and examples regarding operation 726 are provided above in reference to operation 622. Displaying a focus indicator within the zoomed-in representation of the second user interface provides users with clear visual feedback as to the location of their finger on the touch-sensitive secondary display. In some instances, the users may not be able to see small affordances displayed on the touch-sensitive secondary display due to vision problems or due to their finger obscuring affordances located underneath. Therefore, providing the focus indicator within the zoomed-in representation enhances operability of the device and makes the human-machine interface more efficient (e.g., by helping the user to provide proper inputs and reducing user mistakes when operating/interacting with affordances and other neighboring affordances displayed on the secondary display). Additionally, allowing these users to accurately understand the location of their finger on the touch-sensitive secondary display enables a sustained interaction with the touch-sensitive secondary display that would not otherwise be possible due to frequent mistakes (e.g., incorrect selections) and the need to waste time correcting these mistakes.

In some embodiments, the focus indicator includes (728) a representation of a countdown timer and the method 700 includes: in accordance with a determination that the input has remained in contact with the at least one application-specific affordance for more than a predetermined amount of time, the method 700 includes updating the representation of the countdown timer to indicate that the countdown timer is active. In accordance with a determination that the countdown timer has expired, the method 700 includes activating the at least one application-specific affordance. Additional details and examples regarding operation 728 are provided above in reference to operation 624. Displaying a focus indicator with a representation of a countdown timer that begins counting down after an input has remained in contact with an affordance for more than a predetermined period of time provides users with clear visual feedback that they are about to select an affordance. In some instances, the users may not be able to see small affordances displayed on the touch-sensitive secondary display due to vision problems or due to their finger obscuring affordances located underneath and, thus, these users may not realize when they are activating/selecting various affordances. Therefore, providing the focus indicator with the countdown timer enhances operability of the device and makes the human-machine interface more efficient (e.g., by helping the user to provide proper inputs and reducing user mistakes when operating/interacting with affordances and other neighboring affordances displayed on the secondary display). Additionally, allowing these users to accurately understand when they are about to activate an affordance enables a sustained interaction with the touch-sensitive secondary display that would not otherwise be possible due to frequent mistakes (e.g., incorrect selections) and the need to waste time correcting these mistakes.

In some embodiments, the at least one application-specific affordance is associated (730) with a slider, and activating the at least one application-specific affordance includes updating the zoomed-in representation of the at least one application-specific in accordance with (or, more generally, to allow) movement of the at least one application-specific affordance along the slider. Additional details and examples regarding operation 730 are provided above in reference to operation 626. Activating an affordance that is associated with a slider after expiration of a countdown timer helps to enhance operability of the device and makes the human-machine interface more efficient (e.g., by reducing user mistakes when operating/interacting with affordances and helping to avoid accidental modification of a slider). Additionally, allowing users to accurately understand when they are able to manipulate a slider enables a sustained interaction with the touch-sensitive secondary display that would not otherwise be possible due to frequent mistakes (e.g., incorrect or accidental manipulations of a slider) and the need to waste time correcting these mistakes.

In some embodiments, the zoomed-in representation of the at least one application-specific affordance is displayed (732) on the primary display in accordance with a determination that the input has remained in continuous contact with the touch-sensitive secondary display for more than a predetermined amount of time. Additional details and examples regarding operation 732 are provided above in reference to operation 628.

Attention is now directed to FIG. 7C. In some embodiments, the method 700 also includes: while the input remains in contact with at least one application-specific affordance at the touch-sensitive secondary display, detecting (736) a tap gesture at the touch-sensitive secondary display that does not contact the at least one application-specific affordance (e.g., tap 5107, FIG. 5M, or tap 5105, FIG. 5H). In some embodiments, the touch-sensitive secondary display includes a first area comprising the at least one application-specific affordance and a second area comprising other affordances in the plurality of application-specific affordances (i.e., these other affordances do not include the at least one application-specific affordance), and the tap gesture is received at the second area and thus does not contact the at least one application-specific affordance. In response to detecting the tap gesture, the method 700 includes: activating the at least one application-specific affordance. Additional details and examples regarding operation 736 are provided above in reference to operation 632. Allowing activation of an affordance that is in contact with an input in response to a tap gesture that is not over the affordance (a "split-tap gesture") enhances operability of the device and makes the human-machine interface more efficient (e.g., by allowing users to place a first finger over a desired affordance and then use a different finger to perform a selection of that desired affordance). Additionally, allowing users to move their first finger freely around the touch-sensitive secondary display allows users to maintain a sustained interaction with the touch-sensitive secondary display (by exploring which affordances are displayed at the touch-sensitive secondary display), that would not otherwise be possible due to frequent mistakes (e.g., incorrect or accidental selections of affordances) and the need to waste time correcting these mistakes.

In some embodiments, the method 700 includes: detecting (738), at the touch-sensitive secondary display, a predefined gesture (such as those example predefined gestures discussed above in reference to operation 634) that manipulates a zoom level that is used to display the zoomed-in representation of the at least one application-specific affordance at the primary display. In response to detecting the predefined gesture (or in response to detecting each incremental manipulation of the zoom level), the method 700 includes: updating the zoomed-in representation at the primary display as the zoom level is manipulated using the predefined gesture. Additional details and examples regarding operation 738 are provided above in reference to operation 634. Allowing users to manipulate a zoom level for the zoomed-in representation using a predefined gesture enhances operability of the device and makes the human-machine interface more efficient (e.g., by allowing users to quickly and easily adjust the zoom level to suit their personal preferences). Additionally, allowing users to manipulate the zoom level allows users to maintain a sustained interaction with the touch-sensitive secondary display by ensuring that these users are able to adjust the zoom level so that they are able to accurately view affordances that may be displayed at different display sizes, which is important for low-vision users of various sight levels.

It should be understood that the particular order in which the operations in FIGS. 7A-7C have been described is merely one example and is not intended to indicate that the described order is the only order in which the operations could be performed. One of ordinary skill in the art would recognize various ways to reorder the operations described herein.

Figure 8B:
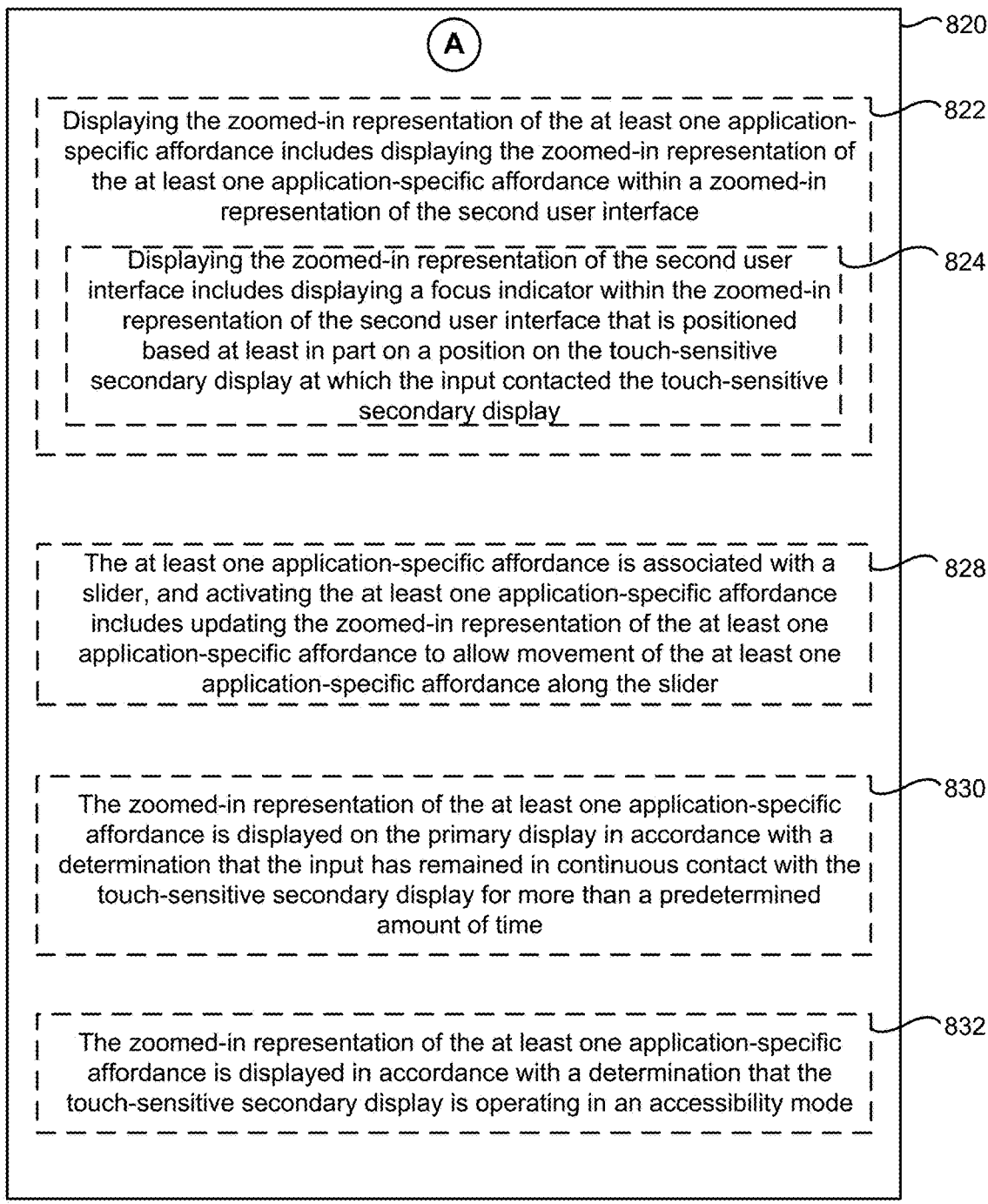

FIGS. 8A-8C are a flowchart of a method 800 that enables low-vision users to interact with touch-sensitive secondary displays, in accordance with some embodiments. The method 800 is performed (802) at a computing system including one or more processors, memory, a first housing including a primary display, and a second housing at least partially containing a touch-sensitive secondary display that is distinct from the primary display. Some operations in method 800 are, optionally, combined and/or the order of some operations is, optionally, changed.

In some embodiments, the computing system is portable computing system 100 (FIG. 1A) or desktop computing system 200 (FIGS. 2A-2D). In some embodiments, the primary display is primary display 102 (FIG. 1A) which is implemented in display portion 110 (also referred to herein as a first housing 110 that includes the primary display 102) of portable computing system 100 (FIG. 1A) and the second housing is a body portion 120 of the portable computing system 100, and the second housing at least partially contains the touch-sensitive secondary display (e.g., dynamic function row 104, FIGS. 1A-1B) and a physical keyboard (e.g., the set of physical keys 106) (804).

In some embodiments, the second housing is not connected to the first housing (806), e.g., because the first housing is part of a first device and the second housing is part of a different device other than the first device (e.g., the second housing could be part of a mobile phone, a tablet device, or any other device that includes affordances that are displayed on a smaller secondary display while that other device is connected to a computing system that includes a larger primary display). As one non-limiting example, in some embodiments, the second housing is peripheral keyboard 206 (FIGS. 2A-2B) of desktop computing system 200, which at least partially contains the touch-sensitive secondary display (e.g., dynamic function row 104, FIGS. 2A-2B) and the physical keyboard (e.g., the set of physical keys 106, FIGS. 2A-2B). As another example, in some embodiments, the second housing is first peripheral input mechanism 212 (FIG. 2C) of desktop computing system 200, which at least partially contains the touch-sensitive secondary display (e.g., dynamic function row 104, FIG. 2C) and the second housing includes an input mechanism (e.g., touchpad 108, FIG. 2C) and does not include the physical keyboard. As one more example, in some embodiments, the second housing is part of a wearable computing device (808), such as a smart watch.

As described below, the method 800 (and associated interfaces) enables low-vision users to interact with touch-sensitive secondary displays. The examples and descriptions provided above in reference to methods 600 and 700 are also applicable to method 800 and, for brevity, those examples and descriptions are generally not repeated here. As shown in FIG. 8A, the method 800 includes displaying (802), on the primary display, a first user interface for an application (e.g., user interface for an email application, FIG. 5C). The method 800 also includes displaying (812), on the touch-sensitive secondary display, a second user interface that includes: (i) a plurality of application-specific affordances that control functions available within the application (e.g., affordances 5080-5084, with additional description provided for these affordances above in reference to method 600) and (ii) at least one system-level affordance that controls a system-level function (e.g., affordances 5079 and 5085-5088, with additional description provided for these affordances above in reference to method 600). In some embodiments, each respective affordance is (only) selectable (814) via one or more inputs at the touch-sensitive secondary display (additional details regarding operation 814 are provided above in reference to operation 614).

In some embodiments, the first application-specific affordance is displayed at the touch-sensitive secondary display with a first display size, and the method 800 further includes (818): in response to detecting the first input and while the first input remains in contact with the first application-specific affordance: continuing to display, on the primary display, the first user interface for the application; and displaying a zoomed-in representation of the first application-specific affordance on the primary display, wherein the zoomed-in representation is displayed with a second display size that is larger than the first display size. Additional details and examples regarding operation 818 are provided above in reference to operation 618.

The method 800 additionally includes: detecting, via the touch-sensitive secondary display, a first input over a first application-specific affordance of the plurality of application-specific affordances (e.g., input 5102 over affordance 5089, FIG. 5M). While the first input remains in contact with the first application-specific affordance, the method 800 includes (820): detecting, via the touch-sensitive secondary display, a second input that is not over the first application-specific affordance (e.g., input 5107 that is not over the affordance 5089, FIG. 5M) and in response to detecting the second input, activating the first application-specific affordance (e.g., bolding selected text on the primary display due to activation of the affordance 5089, FIG. 5N). Additional examples and descriptions of operation 820 are provided above in reference to operation 632. Allowing activation of an affordance that is in contact with an input in response to a tap gesture that is not over the affordance (a "split-tap gesture") enhances operability of the device and makes the human-machine interface more efficient (e.g., by allowing users to place a first finger over a desired affordance and then use a different finger to perform a selection of that desired affordance, thereby ensuring that only the desired affordance is activated and helping to minimize erroneous selections/activations). Additionally, allowing users to move their first finger freely around the touch-sensitive secondary display (without selecting affordances) allows users to maintain a sustained interaction with the touch-sensitive secondary display (by exploring which affordances are displayed at the touch-sensitive secondary display), that would not otherwise be possible due to frequent mistakes (e.g., incorrect or accidental selections of affordances) and the need to waste time correcting these mistakes.

Attention is now directed to FIG. 8B. In some embodiments, displaying the zoomed-in representation of the at least one application-specific affordance includes (822) displaying the zoomed-in representation of the at least one application-specific affordance within a zoomed-in representation of the second user interface. Additional details and examples regarding operation 822 are provided above in reference to operation 620. Displaying a zoomed-in view of the at least one application-specific affordance within a zoomed-in representation of the second user interface in response to a single input provides users with clear visual feedback indicating which affordance they may be selecting and indicating which affordances are located in proximity thereto. Providing this improved visual feedback to the user enhances operability of the device and makes the human-machine interface more efficient (e.g., by helping the user to provide proper inputs and reducing user mistakes when operating/interacting with affordances and other neighboring affordances displayed on the secondary display). Additionally, allowing these users to accurately view affordances displayed on a small screen enables a sustained interaction with the touch-sensitive secondary display that would not otherwise be possible due to frequent mistakes (e.g., incorrect selections) and the need to waste time correcting these mistakes.

In some embodiments, displaying the zoomed-in representation of the second user interface includes (824) displaying a focus indicator within the zoomed-in representation of the second user interface that is positioned based at least in part on a position on the touch-sensitive secondary display at which the input contacted the touch-sensitive secondary display. Additional details and examples regarding operation 824 are provided above in reference to operation 622. Displaying a focus indicator within the zoomed-in representation of the second user interface provides users with clear visual feedback as to the location of their finger on the touch-sensitive secondary display. In some instances, the users may not be able to see small affordances displayed on the touch-sensitive secondary display due to vision problems or due to their finger obscuring affordances located underneath. Therefore, providing the focus indicator within the zoomed-in representation enhances operability of the device and makes the human-machine interface more efficient (e.g., by helping the user to provide proper inputs and reducing user mistakes when operating/interacting with affordances and other neighboring affordances displayed on the secondary display). Additionally, allowing these users to accurately understand the location of their finger on the touch-sensitive secondary display enables a sustained interaction with the touch-sensitive secondary display that would not otherwise be possible due to frequent mistakes (e.g., incorrect selections) and the need to waste time correcting these mistakes.

In some embodiments, the at least one application-specific affordance is associated (828) with a slider, and activating the at least one application-specific affordance includes updating the zoomed-in representation of the at least one application-specific in accordance with (or, more generally, to allow) movement of the at least one application-specific affordance along the slider. Additional details and examples regarding operation 828 are provided above in reference to operation 626. Activating an affordance that is associated with a slider after expiration of a countdown timer helps to enhance operability of the device and makes the human-machine interface more efficient (e.g., by reducing user mistakes when operating/interacting with affordances and helping to avoid accidental modification of a slider). Additionally, allowing users to accurately understand when they are able to manipulate a slider enables a sustained interaction with the touch-sensitive secondary display that would not otherwise be possible due to frequent mistakes (e.g., incorrect or accidental manipulations of a slider) and the need to waste time correcting these mistakes.

In some embodiments, the zoomed-in representation of the at least one application-specific affordance is displayed (830) on the primary display in accordance with a determination that the input has remained in continuous contact with the touch-sensitive secondary display for more than a predetermined amount of time. Additional details and examples regarding operation 830 are provided above in reference to operation 628.

In some embodiments, the zoomed-in representation of the at least one application-specific affordance is displayed in accordance with a determination that the touch-sensitive secondary display is operating in an accessibility mode. Additional details and examples regarding operation 832 are provided above in reference to operations 630, 710, and 712.

Turning now to FIG. 8C, in some embodiments, the method 800 includes: detecting (834), at the touch-sensitive secondary display, a predefined gesture (e.g., examples are provided above in reference to operation 634) that manipulates a zoom level that is used to display the zoomed-in representation of the at least one application-specific affordance at the primary display; and in response to detecting the predefined gesture, updating the zoomed-in representation at the primary display as the zoom level is manipulated using the predefined gesture. Additional details and examples regarding operation 834 are provided above in reference to operation 634. Allowing users to manipulate a zoom level for the zoomed-in representation using a predefined gesture enhances operability of the device and makes the human-machine interface more efficient (e.g., by allowing users to quickly and easily adjust the zoom level to suit their personal preferences). Additionally, allowing users to manipulate the zoom level allows users to maintain a sustained interaction with the touch-sensitive secondary display by ensuring that these users are able to adjust the zoom level so that they are able to accurately view affordances that may be displayed at different display sizes, which is important for low-vision users of various sight levels.

It should be understood that the particular order in which the operations in FIGS. 8A-8C have been described is merely one example and is not intended to indicate that the described order is the only order in which the operations could be performed. One of ordinary skill in the art would recognize various ways to reorder the operations described herein.

Figure 9:
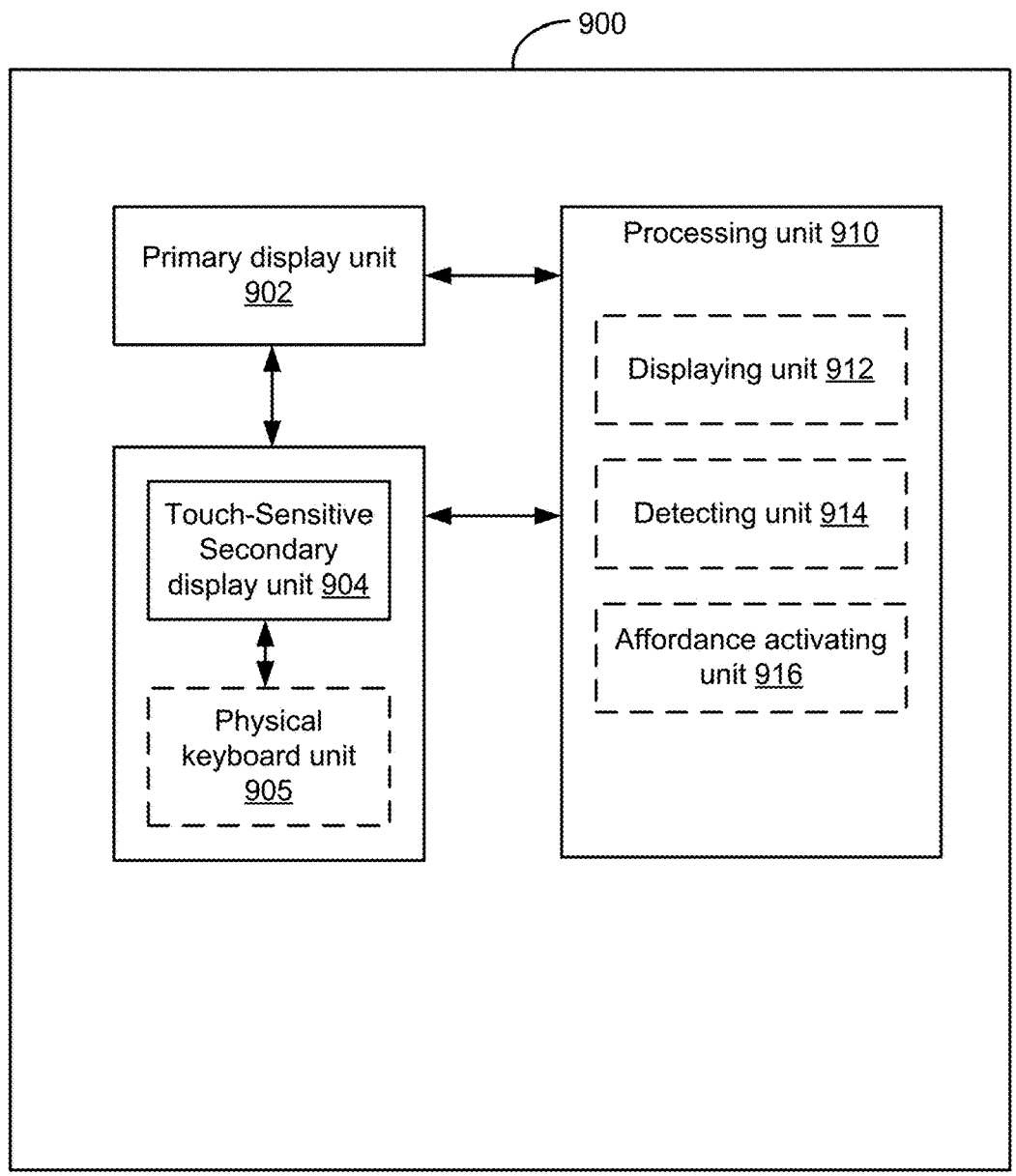
FIGS. 9-11 illustrate functional block diagrams of a computing system, in accordance with some embodiments.

In accordance with some embodiments, FIG. 9 shows a functional block diagram of a computing system 900 (also referred to, in accordance with some embodiments, as an electronic device 900) configured in accordance with the principles of the various described embodiments. The functional blocks of the system are, optionally, implemented by hardware, software, firmware, or a combination thereof to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein. For ease of discussion, the computing system 900 is implemented as a portable computing system 100 (FIG. 1A). In some embodiments, the computing system 900 is implemented in accordance with any of the devices/systems shown in FIGS. 1A-2D.

As shown in FIG. 9, the computing system 900, includes a primary display unit 902 configured to display information (e.g., touch-sensitive display system 112, also referred to as a primary touch screen, primary touch-sensitive display, and primary touch screen display, FIG. 1A), a touch-sensitive secondary display unit 904 configured to receive contacts, gestures, and other user inputs on the touch-sensitive secondary display, and a processing unit 910. The system 900 optionally includes a physical keyboard unit 905 configured to receive keyboard inputs, and, in some embodiments, the optional physical keyboard unit is included with the touch-sensitive secondary display unit 904 in a second housing that is distinct from a first housing that includes the primary display unit 902. In some embodiments the first and second housings are rotatably connected (e.g., for embodiments in which the computing system 900 is a laptop computer) and in other embodiments, the first and second housings are not connected and may be part of separate computing devices that form the system 900 (e.g., the first housing is part of a laptop computer and the second housing is part of a separate device such as a wearable computing device, like a smart watch). The processing unit 910 is coupled with the primary display unit 902, the touch-sensitive secondary display unit 904, and optionally the physical keyboard unit 905. In some embodiments, the processing unit 910 includes a displaying unit (e.g., displaying unit 912), a detecting unit 914 (e.g., detecting unit 914), and an affordance activating unit (e.g., affordance activating unit 916).

The processing unit is configured to: display (e.g., with the displaying unit 912 in conjunction with the primary display unit 902), on the primary display, a first user interface for an application; display (e.g., with the displaying unit 912 in conjunction with the touch-sensitive secondary display unit 904), on the touch-sensitive secondary display, a second user interface that includes a plurality of application-specific affordances that control functions available within the application, and each of the plurality of application-specific affordances is displayed with a first display size; detect (e.g., with the detecting unit 914 in conjunction with the touch-sensitive secondary display unit 904), via the touch-sensitive secondary display, an input that contacts at least one application-specific affordance of the plurality of application-specific affordances; and in response to detecting the input and while the input remains in contact with the touch-sensitive secondary display: (i) continue to display (e.g., with the displaying unit 912 in conjunction with the primary display unit 902), on the primary display, the first user interface for the application and (ii) display (e.g., with the displaying unit 912 in conjunction with the primary display unit 902), on the primary display, a zoomed-in representation of the at least one application-specific affordance, and the zoomed-in representation of the at least one application-specific affordance is displayed with a second display size that is larger than the first display size.

In accordance with some embodiments of the computing system 900, displaying the zoomed-in representation of the at least one application-specific affordance includes displaying the zoomed-in representation of the at least one application-specific affordance within a zoomed-in representation of the second user interface.

In accordance with some embodiments of the computing system 900, displaying the zoomed-in representation of the second user interface includes displaying a focus indicator within the zoomed-in representation of the second user interface that is positioned based at least in part on a position on the touch-sensitive secondary display at which the input contacted the touch-sensitive secondary display.

In accordance with some embodiments of the computing system 900, the focus indicator includes a representation of a countdown timer and the processing unit is further configured to: in accordance with a determination that the input has remained in contact with the at least one application-specific affordance for more than a predetermined amount of time, update the representation of the countdown timer to indicate that the countdown timer is active (e.g., with the displaying unit 912 in conjunction with the primary display unit 902); and in accordance with a determination that the countdown timer has expired, activate the at least one application-specific affordance (e.g., with the affordance activating unit 916).

In accordance with some embodiments of the computing system 900, the at least one application-specific affordance is associated with a slider, and activating the at least one application-specific affordance includes updating the zoomed-in representation of the at least one application-specific in accordance with (or, more generally, to allow) movement of the at least one application-specific affordance along the slider In accordance with some embodiments of the computing system 900, the processing unit is further configured to: while the input remains in contact with the at least one application-specific affordance at the touch-sensitive secondary display, detect a tap gesture at the touch-sensitive secondary display (e.g., with the detecting unit 914 in conjunction with the touch-sensitive secondary display unit 904) that does not contact the at least one application-specific affordance; and in response to detecting the tap gesture, activate the at least one application-specific affordance (e.g., with the affordance activating unit 916). In some embodiments, the touch-sensitive secondary display includes a first area comprising the at least one application-specific affordance and a second area comprising other affordances in the plurality of application-specific affordances (i.e., these other affordances do not include the at least one application-specific affordance), and the tap gesture is received at the second area and thus does not contact the at least one application-specific affordance.

In accordance with some embodiments of the computing system 900, the processing unit is further configured to: detect (e.g., with the detecting unit 914 in conjunction with the touch-sensitive secondary display unit 904), at the touch-sensitive secondary display, a predefined gesture that manipulates a zoom level that is used to display the zoomed-in representation of the at least one application-specific affordance at the primary display; and in response to detecting the predefined gesture, update the zoomed-in representation at the primary display as the zoom level is manipulated using the predefined gesture (e.g., with the displaying unit 912 in conjunction with the primary display unit 902).

In accordance with some embodiments of the computing system 900, the zoomed-in representation of the at least one application-specific affordance is displayed on the primary display in accordance with a determination that the input has remained in continuous contact with the touch-sensitive secondary display for more than a predetermined amount of time.

In accordance with some embodiments of the computing system 900, the zoomed-in representation of the at least one application-specific affordance is displayed in accordance with a determination that the touch-sensitive secondary display is operating in an accessibility mode.

In accordance with some embodiments of the computing system 900, each of the plurality of application-specific affordances is selectable via one or more inputs at the touch-sensitive secondary display.

In accordance with some embodiments of the computing system 900, the second housing also at least partially contains a physical keyboard.

In accordance with some embodiments of the computing system 900, the second housing is not connected to the first housing.

In accordance with some embodiments of the computing system 900, the second housing is part of a wearable computing device.

Figure 10:
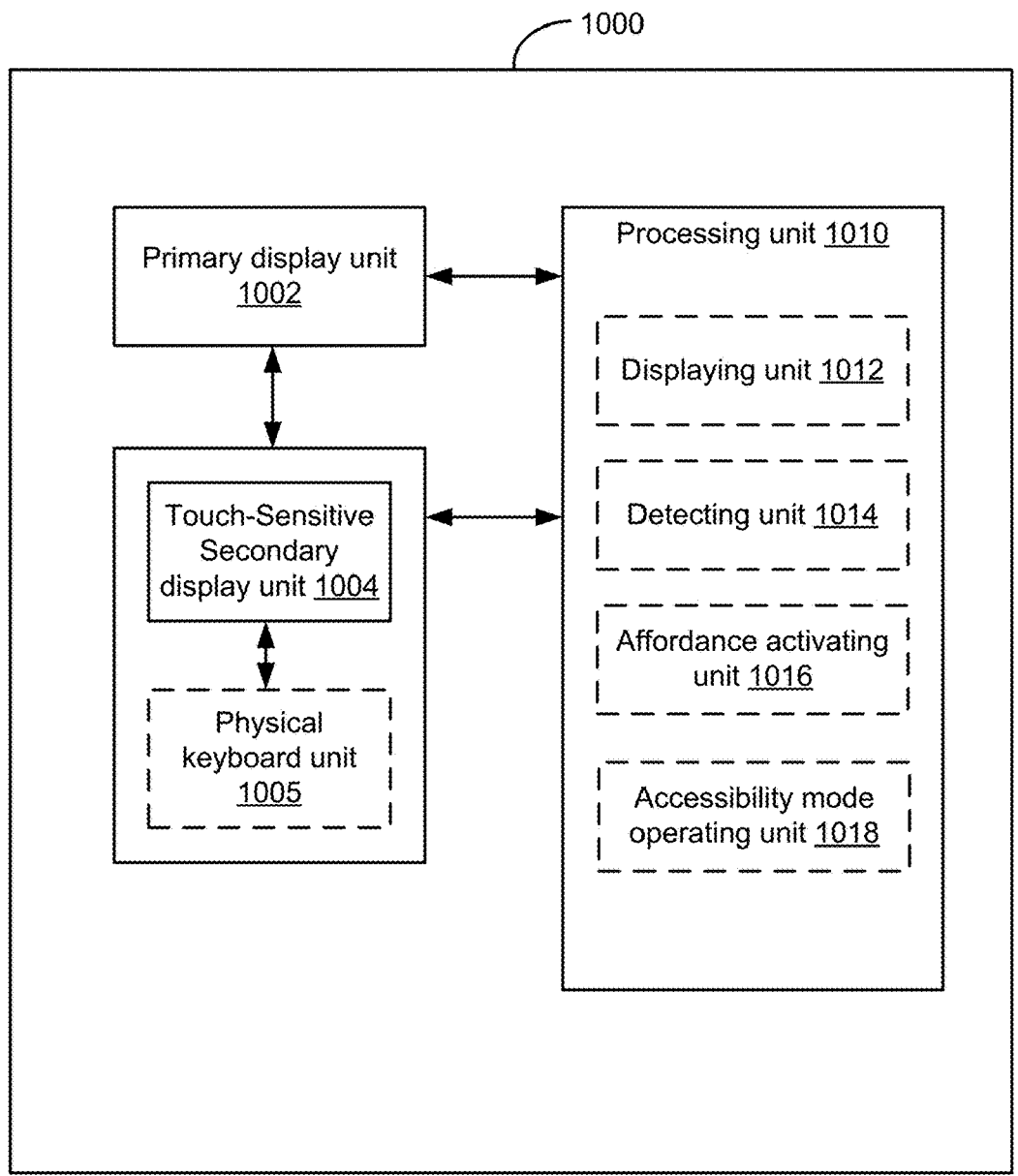

In accordance with some embodiments, FIG. 10 shows a functional block diagram of a computing system 1000 (also referred to, in accordance with some embodiments, as an electronic device 1000) configured in accordance with the principles of the various described embodiments. The functional blocks of the system are, optionally, implemented by hardware, software, firmware, or a combination thereof to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein. For ease of discussion, the computing system 1000 is implemented as a portable computing system 100 (FIG. 1A). In some embodiments, the computing system 1000 is implemented in accordance with any of the devices/systems shown in FIGS. 1A-2D.

As shown in FIG. 10, the computing system 1000, includes a primary display unit 1002 configured to display information (e.g., touch-sensitive display system 112, also referred to as a primary touch screen, primary touch-sensitive display, and primary touch screen display, FIG. 1A), a touch-sensitive secondary display unit 1004 configured to receive contacts, gestures, and other user inputs on the touch-sensitive secondary display, and a processing unit 1010. The system 1000 optionally includes a physical keyboard unit 1005 configured to receive keyboard inputs, and, in some embodiments, the optional physical keyboard unit is included with the touch-sensitive secondary display unit 1004 in a second housing that is distinct from a first housing that includes the primary display unit 1002. In some embodiments the first and second housings are rotatably connected (e.g., for embodiments in which the computing system 1000 is a laptop computer) and in other embodiments, the first and second housings are not connected and may be part of separate computing devices that form the system 1000 (e.g., the first housing is part of a laptop computer and the second housing is part of a separate device such as a wearable computing device, like a smart watch). The processing unit 1010 is coupled with the primary display unit 1002, the touch-sensitive secondary display unit 1004, and optionally the physical keyboard unit 1005. In some embodiments, the processing unit 1010 includes a displaying unit (e.g., displaying unit 1012), a detecting unit 1014 (e.g., detecting unit 1014), an affordance activating unit (e.g., affordance activating unit 1016), and an accessibility mode operating unit (e.g., accessibility mode operating unit 1018).

The processing unit is configured to: operate the touch-sensitive secondary display in an accessibility mode; while operating the touch-sensitive secondary display in the accessibility mode: display (e.g., with the displaying unit 1012 in conjunction with the primary display unit 1002), on the primary display, a first user interface for an application; and display (e.g., with the displaying unit 1012 in conjunction with the touch-sensitive secondary display unit 1004), on the touch-sensitive secondary display, a second user interface that includes: (i) a plurality of application-specific affordances that control functions available within the application and (ii) at least one system-level affordance that controls a system-level function, and each of the plurality of application-specific affordances and the at least one system-level affordance are displayed with a first display size; detect (e.g., with the detecting unit 1014 in conjunction with the touch-sensitive secondary display unit 1004), via the touch-sensitive secondary display, an input that contacts at least one application-specific affordance of the plurality of application-specific affordances; and in response to the detecting the input and while the input remains in contact with the touch-sensitive secondary display: continue to display (e.g., with the displaying unit 1012 in conjunction with the primary display unit 1002), on the primary display, the first user interface for the application and display (e.g., with the displaying unit 1012 in conjunction with the primary display unit 1002), on the primary display, a zoomed-in representation of the at least one application-specific affordance, and the zoomed-in representation of the at least one application-specific affordance is displayed with a second display size that is larger than the first display size.

In accordance with some embodiments of the computing system 1000, displaying the zoomed-in representation of the at least one application-specific affordance includes displaying the zoomed-in representation of the at least one application-specific affordance within a zoomed-in representation of the second user interface.

In accordance with some embodiments of the computing system 1000, displaying the zoomed-in representation of the second user interface includes displaying a focus indicator within the zoomed-in representation of the second user interface that is positioned based at least in part on a position on the touch-sensitive secondary display at which the input contacted the touch-sensitive secondary display.

In accordance with some embodiments of the computing system 1000, the focus indicator includes a representation of a countdown timer and the processing unit is further configured to: in accordance with a determination that the input has remained in contact with the at least one application-specific affordance for more than a predetermined amount of time, update the representation of the countdown timer to indicate that the countdown timer is active (e.g., with the displaying unit 1012 in conjunction with the primary display unit 1002); and in accordance with a determination that the countdown timer has expired, activate the at least one application-specific affordance (e.g., with the affordance activating unit 1016).

In accordance with some embodiments of the computing system 1000, the at least one application-specific affordance is associated with a slider, and activating the at least one application-specific affordance includes updating the zoomed-in representation of the at least one application-specific in accordance with (or, more generally, to allow) movement of the at least one application-specific affordance along the slider.

In accordance with some embodiments of the computing system 1000, the processing unit is further configured to: while the input remains in contact with at least one application-specific affordance at the touch-sensitive secondary display, detect a tap gesture at the touch-sensitive secondary display that does not contact the at least one application-specific affordance (e.g., with the detecting unit 1012 in conjunction with the touch-sensitive secondary display unit 1004); and in response to detecting the tap gesture, activate the at least one application-specific affordance (e.g., with the affordance activating unit 1016). In some embodiments, the touch-sensitive secondary display includes a first area comprising the at least one application-specific affordance and a second area comprising other affordances in the plurality of application-specific affordances (i.e., these other affordances do not include the at least one application-specific affordance), and the tap gesture is received at the second area and thus does not contact the at least one application-specific affordance.

In accordance with some embodiments of the computing system 1000, the processing unit is further configured to: detect (e.g., with the detecting unit 1012 in conjunction with the touch-sensitive secondary display unit 1004), with the, at the touch-sensitive secondary display, a predefined gesture that manipulates a zoom level that is used to display the zoomed-in representation of the at least one application-specific affordance at the primary display; and in response to detecting the predefined gesture, update the zoomed-in representation at the primary display as the zoom level is manipulated using the predefined gesture (e.g., with the displaying unit 1012 in conjunction with the primary display unit 1002).

In accordance with some embodiments of the computing system 1000, the zoomed-in representation of the at least one application-specific affordance is displayed on the primary display in accordance with a determination that the input has remained in continuous contact with the touch-sensitive secondary display for more than a predetermined amount of time.

In accordance with some embodiments of the computing system 1000, each of the plurality of application-specific affordances is selectable via one or more inputs at the touch-sensitive secondary display.

In accordance with some embodiments of the computing system 1000, the second housing also at least partially contains a physical keyboard.

In accordance with some embodiments of the computing system 1000, the second housing is not connected to the first housing.

In accordance with some embodiments of the computing system 1000, the second housing is part of a wearable computing device.

Figure 11:
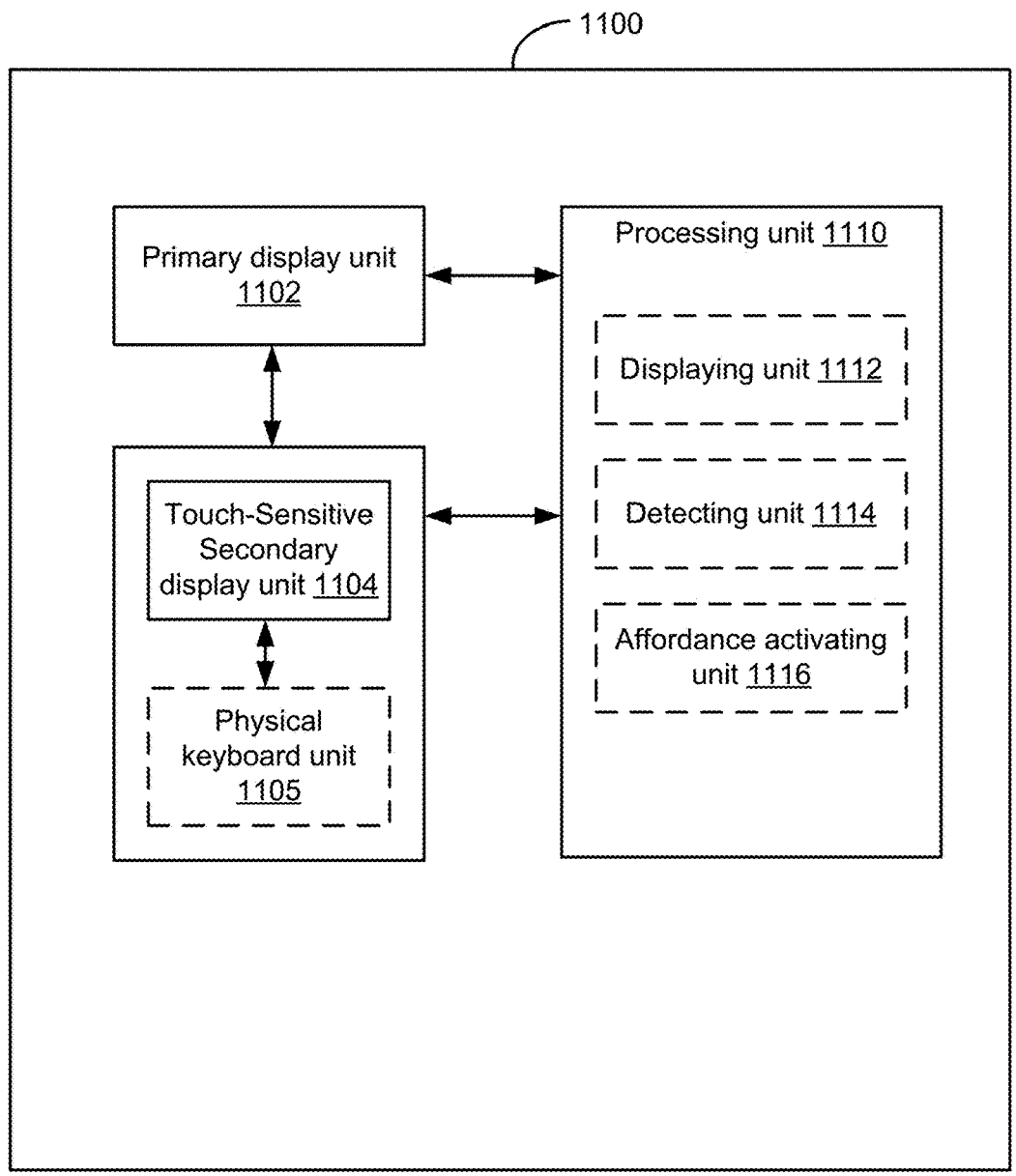

In accordance with some embodiments, FIG. 11 shows a functional block diagram of a computing system 1100 (also referred to, in accordance with some embodiments, as an electronic device 1100) configured in accordance with the principles of the various described embodiments. The functional blocks of the system are, optionally, implemented by hardware, software, firmware, or a combination thereof to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein. For ease of discussion, the computing system 1100 is implemented as a portable computing system 100 (FIG. 1A). In some embodiments, the computing system 1100 is implemented in accordance with any of the devices/systems shown in FIGS. 1A-2D.

As shown in FIG. 11, the computing system 1100, includes a primary display unit 1102 configured to display information (e.g., touch-sensitive display system 112, also referred to as a primary touch screen, primary touch-sensitive display, and primary touch screen display, FIG. 1A), a touch-sensitive secondary display unit 1104 configured to receive contacts, gestures, and other user inputs on the touch-sensitive secondary display, and a processing unit 1110. The system 1100 optionally includes a physical keyboard unit 1105 configured to receive keyboard inputs, and, in some embodiments, the optional physical keyboard unit is included with the touch-sensitive secondary display unit 1104 in a second housing that is distinct from a first housing that includes the primary display unit 1102. In some embodiments the first and second housings are rotatably connected (e.g., for embodiments in which the computing system 1100 is a laptop computer) and in other embodiments, the first and second housings are not connected and may be part of separate computing devices that form the system 1100 (e.g., the first housing is part of a laptop computer and the second housing is part of a separate device such as a wearable computing device, like a smart watch). The processing unit 1110 is coupled with the primary display unit 1102, the touch-sensitive secondary display unit 1104, and optionally the physical keyboard unit 1105. In some embodiments, the processing unit 1110 includes a displaying unit (e.g., displaying unit 1112), a detecting unit 1114 (e.g., detecting unit 1114), and an affordance activating unit (e.g., affordance activating unit 1116).

The processing unit is configured to: display (e.g., with the displaying unit 1112 in conjunction with the primary display unit 1102), on the primary display, a first user interface for an application; display (e.g., with the displaying unit 1112 in conjunction with the touch-sensitive secondary display unit 1104), on the touch-sensitive secondary display, a second user interface that includes: (i) a plurality of application-specific affordances that control functions available within the application and (ii) at least one system-level affordance that controls a system-level function; detect (e.g., with the detecting unit 1114 in conjunction with the touch-sensitive secondary display unit 1104), via the touch-sensitive secondary display, a first input over a first application-specific affordance of the plurality of application-specific affordances; and while the first input remains in contact with the first application-specific affordance: detect (e.g., with the detecting unit 1114 in conjunction with the touch-sensitive secondary display unit 1104), via the touch-sensitive secondary display, a second input that is not over the first application-specific affordance and in response to detecting the second input, activate the first application-specific affordance (e.g., with the affordance activating unit 1116).

In accordance with some embodiments of the computing system 1100, the processing unit is further configured to: in response to detecting the first input and while the first input remains in contact with the first application-specific affordance: continue to display (e.g., with the displaying unit 1112 in conjunction with the primary display unit 1102), on the primary display, the first user interface for the application; and display (e.g., with the displaying unit 1112 in conjunction with the primary display unit 1102) a zoomed-in representation of the first application-specific affordance on the primary display, wherein the zoomed-in representation is displayed with a second display size that is larger than the first display size.

In accordance with some embodiments of the computing system 1100, displaying the zoomed-in representation of the at least one application-specific affordance includes displaying the zoomed-in representation of the at least one application-specific affordance within a zoomed-in representation of the second user interface.

In accordance with some embodiments of the computing system 1100, displaying the zoomed-in representation of the second user interface includes displaying a focus indicator within the zoomed-in representation of the second user interface that is positioned based at least in part on a position on the touch-sensitive secondary display at which the input contacted the touch-sensitive secondary display.

In accordance with some embodiments of the computing system 1100, the at least one application-specific affordance is associated with a slider, and activating the at least one application-specific affordance includes updating the zoomed-in representation of the at least one application-specific in accordance with (or, more generally, to allow) movement of the at least one application-specific affordance along the slider.

In accordance with some embodiments of the computing system 1100, the processing unit is further configured to: detect (e.g., with the detecting unit 1114 in conjunction with the touch-sensitive secondary display unit 1104), at the touch-sensitive secondary display, a predefined gesture that manipulates a zoom level that is used to display the zoomed-in representation of the at least one application-specific affordance at the primary display; and in response to detecting the predefined gesture, update the zoomed-in representation at the primary display as the zoom level is manipulated using the predefined gesture (e.g., with the displaying unit 1112 in conjunction with the primary display unit 1102).

In accordance with some embodiments of the computing system 1100, the zoomed-in representation of the at least one application-specific affordance is displayed on the primary display in accordance with a determination that the input has remained in continuous contact with the touch-sensitive secondary display for more than a predetermined amount of time.

In accordance with some embodiments of the computing system 1100, the zoomed-in representation of the at least one application-specific affordance is displayed in accordance with a determination that the touch-sensitive secondary display is operating in an accessibility mode.

In accordance with some embodiments of the computing system 1100, each of the plurality of application-specific affordances and the at least one system-level affordance are selectable via one or more inputs at the touch-sensitive secondary display.

In accordance with some embodiments of the computing system 1100, the second housing also at least partially contains a physical keyboard.

In accordance with some embodiments of the computing system 1100, the second housing is not connected to the first housing.

In accordance with some embodiments of the computing system 1100, the second housing is part of a wearable computing device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable

What is claimed is:

1. A method, comprising:
at a computing system comprising one or more processors, a first housing that includes a primary display, memory, and a second housing at least partially containing a touch-sensitive secondary display that is distinct from the primary display:
displaying, on the primary display, a first user interface for an application;
displaying, on the touch-sensitive secondary display, a second user interface that includes a plurality of application-specific affordances that control functions available within the application, wherein each of the plurality of application-specific affordances is displayed with a first display size;
detecting, via the touch-sensitive secondary display, an input that contacts at least one application-specific affordance of the plurality of application-specific affordances; and
in response to detecting the input and while the input remains in contact with the touch-sensitive secondary display:
continuing to display, on the primary display, the first user interface for the application; and
displaying, on the primary display, a zoomed-in representation of the at least one application-specific affordance, wherein the zoomed-in representation of the at least one application-specific affordance is displayed with a second display size that is larger than the first display size.

2. The method of claim 1, wherein displaying the zoomed-in representation of the at least one application-specific affordance includes displaying the zoomed-in representation of the at least one application-specific affordance within a zoomed-in representation of the second user interface.

3. The method of claim 2, wherein displaying the zoomed-in representation of the second user interface includes displaying a focus indicator within the zoomed-in representation of the second user interface that is positioned based at least in part on a position on the touch-sensitive secondary display at which the input contacted the touch-sensitive secondary display.

4. The method of claim 3, wherein the focus indicator includes a representation of a countdown timer and the method includes:
in accordance with a determination that the input has remained in contact with the at least one application-specific affordance for more than a predetermined amount of time, updating the representation of the countdown timer to indicate that the countdown timer is active; and
in accordance with a determination that the countdown timer has expired, activating the at least one application-specific affordance.

5. The method of claim 4, wherein:
the at least one application-specific affordance is associated with a slider, and
activating the at least one application-specific affordance includes updating the zoomed-in representation of the at least one application-specific affordance in accordance with movement of the at least one application-specific affordance along the slider.

6. The method of claim 2, wherein the touch-sensitive secondary display includes a first area comprising the at least one application-specific affordance and a second area comprising other affordances distinct from the at least one application-specific affordance in the plurality of application-specific affordances, and the method further comprises:
while the input remains in contact with the at least one application-specific affordance at the first area of the touch-sensitive secondary display, detecting a tap gesture at the second area of the touch-sensitive secondary display; and
in response to detecting the tap gesture, activating the at least one application-specific affordance.

7. The method of claim 1, further comprising:
detecting, at the touch-sensitive secondary display, a predefined gesture that manipulates a zoom level that is used to display the zoomed-in representation of the at least one application-specific affordance at the primary display; and
in response to detecting the predefined gesture, updating the zoomed-in representation at the primary display as the zoom level is manipulated using the predefined gesture.

8. The method of claim 1, wherein the zoomed-in representation of the at least one application-specific affordance is displayed on the primary display in accordance with a determination that the input has remained in continuous contact with the touch-sensitive secondary display for more than a predetermined amount of time.

9. The method of claim 1, wherein the zoomed-in representation of the at least one application-specific affordance is displayed in accordance with a determination that the touch-sensitive secondary display is operating in an accessibility mode.

10. The method of claim 1, wherein each of the plurality of application-specific affordances is selectable via one or more inputs at the touch-sensitive secondary display.

11. The method of claim 1, wherein the second housing also at least partially contains a physical keyboard.

12. The method of claim 1, wherein the second housing is not connected to the first housing.

13. The method of claim 12, wherein the second housing is part of a wearable computing device.

14. A non-transitory computer-readable storage medium storing executable instructions that, when executed by a computing system with one or more processors, a first housing that includes a primary display, and a second housing at least partially containing a touch-sensitive secondary display that is distinct from the primary display, cause the computing system to:
display, on the primary display, a first user interface for an application;
display, on the touch-sensitive secondary display, a second user interface that includes a plurality of application-specific affordances that control functions available within the application, wherein each of the plurality of application-specific affordances is displayed with a first display size;
detect, via the touch-sensitive secondary display, an input that contacts at least one application-specific affordance of the plurality of application-specific affordances; and
in response to detecting the input and while the input remains in contact with the touch-sensitive secondary display:
continue to display, on the primary display, the first user interface for the application; and
display, on the primary display, a zoomed-in representation of the at least one application-specific affordance, wherein the zoomed-in representation of the at least one application-specific affordance is displayed with a second display size that is larger than the first display size.

15. The storage medium of claim 14, wherein the executable instructions that cause the computing system to display the zoomed-in representation of the at least one application-specific affordance include executable instructions that cause the computing system to display the zoomed-in representation of the at least one application-specific affordance within a zoomed-in representation of the second user interface.

16. The storage medium of claim 15, wherein the executable instructions that cause the computing system to display the zoomed-in representation of the second user interface include executable instructions that cause the computing system to display a focus indicator within the zoomed-in representation of the second user interface that is positioned based at least in part on a position on the touch-sensitive secondary display at which the input contacted the touch-sensitive secondary display.

17. The storage medium of claim 16, wherein the focus indicator includes a representation of a countdown timer and the executable instructions, when executed by the one or more processors, further cause the computing system to:
in accordance with a determination that the input has remained in contact with the at least one application-specific affordance for more than a predetermined amount of time, update the representation of the countdown timer to indicate that the countdown timer is active; and
in accordance with a determination that the countdown timer has expired, activate the at least one application-specific affordance.

18. The storage medium of claim 17, wherein:
the at least one application-specific affordance is associated with a slider, and
the executable instructions that cause the computing system to activate the at least one application-specific affordance include executable instructions that cause the computing system to update the zoomed-in representation of the at least one application-specific affordance in accordance with movement of the at least one application-specific affordance along the slider.

19. The storage medium of claim 15, wherein the touch-sensitive secondary display includes a first area comprising the at least one application-specific affordance and a second area comprising other affordances distinct from the at least one application-specific affordance in the plurality of application-specific affordances, and the executable instructions, when executed by the one or more processors, further cause the computing system to:
while the input remains in contact with the at least one application-specific affordance at the first area of the touch-sensitive secondary display, detect a tap gesture at the second area of the touch-sensitive secondary display; and
in response to detecting the tap gesture, activate the at least one application-specific affordance.

20. The storage medium of claim 14, wherein the executable instructions, when executed by the one or more processors, further cause the computing system to:
detect, at the touch-sensitive secondary display, a predefined gesture that manipulates a zoom level that is used to display the zoomed-in representation of the at least one application-specific affordance at the primary display; and
in response to detecting the predefined gesture, update the zoomed-in representation at the primary display as the zoom level is manipulated using the predefined gesture.

21. The storage medium of claim 14, wherein the zoomed-in representation of the at least one application-specific affordance is displayed on the primary display in accordance with a determination that the input has remained in continuous contact with the touch-sensitive secondary display for more than a predetermined amount of time.

22. The storage medium of claim 14, wherein the zoomed-in representation of the at least one application-specific affordance is displayed in accordance with a determination that the touch-sensitive secondary display is operating in an accessibility mode.

23. The storage medium of claim 14, wherein each of the plurality of application-specific affordances is selectable via one or more inputs at the touch-sensitive secondary display.

24. The storage medium of claim 14, wherein the second housing also at least partially contains a physical keyboard.

25. The storage medium of claim 14, wherein the second housing is not connected to the first housing.

26. The storage medium of claim 25, wherein the second housing is part of a wearable computing device.

27. A computing system, comprising:
one or more processors;
a first housing that includes a primary display;
a second housing at least partially containing a touch-sensitive secondary display that is distinct from the primary display; and
memory storing one or more programs that are configured for execution by the one or more processors, the one or more programs including instructions for:
displaying, on the primary display, a first user interface for an application;
displaying, on the touch-sensitive secondary display, a second user interface that includes a plurality of application-specific affordances that control functions available within the application, wherein each of the plurality of application-specific affordances is displayed with a first display size;
detecting, via the touch-sensitive secondary display, an input that contacts at least one application-specific affordance of the plurality of application-specific affordances; and
in response to detecting the input and while the input remains in contact with the touch-sensitive secondary display:
continuing to display, on the primary display, the first user interface for the application; and
displaying, on the primary display, a zoomed-in representation of the at least one application-specific affordance, wherein the zoomed-in representation of the at least one application-specific affordance is displayed with a second display size that is larger than the first display size.

28. The computing system of claim 27, wherein the instructions for displaying the zoomed-in representation of the at least one application-specific affordance include instructions for displaying the zoomed-in representation of the at least one application-specific affordance within a zoomed-in representation of the second user interface.

29. The computing system of claim 28, wherein the instructions for displaying the zoomed-in representation of the second user interface include instructions for displaying a focus indicator within the zoomed-in representation of the second user interface that is positioned based at least in part on a position on the touch-sensitive secondary display at which the input contacted the touch-sensitive secondary display.

30. The computing system of claim 29, wherein the focus indicator includes a representation of a countdown timer and the one or more programs include instructions for:
- in accordance with a determination that the input has remained in contact with the at least one application-specific affordance for more than a predetermined amount of time, updating the representation of the countdown timer to indicate that the countdown timer is active; and
- in accordance with a determination that the countdown timer has expired, activating the at least one application-specific affordance.

31. The computing system of claim 30, wherein:
- the at least one application-specific affordance is associated with a slider, and
- the instructions for activating the at least one application-specific affordance include instructions for updating the zoomed-in representation of the at least one application-specific affordance in accordance with movement of the at least one application-specific affordance along the slider.

32. The computing system of claim 28, wherein the touch-sensitive secondary display includes a first area comprising the at least one application-specific affordance and a second area comprising other affordances distinct from the at least one application-specific affordance in the plurality of application-specific affordances, and the one or more programs include instructions for:
- while the input remains in contact with the at least one application-specific affordance at the first area of the touch-sensitive secondary display, detecting a tap gesture at the second area of the touch-sensitive secondary display; and
- in response to detecting the tap gesture, activating the at least one application-specific affordance.

33. The computing system of claim 27, wherein the one or more programs further include instructions for:
- detecting, at the touch-sensitive secondary display, a predefined gesture that manipulates a zoom level that is used to display the zoomed-in representation of the at least one application-specific affordance at the primary display; and
- in response to detecting the predefined gesture, updating the zoomed-in representation at the primary display as the zoom level is manipulated using the predefined gesture.

34. The computing system of claim 27, wherein the zoomed-in representation of the at least one application-specific affordance is displayed on the primary display in accordance with a determination that the input has remained in continuous contact with the touch-sensitive secondary display for more than a predetermined amount of time.

35. The computing system of claim 27, wherein the zoomed-in representation of the at least one application-specific affordance is displayed in accordance with a determination that the touch-sensitive secondary display is operating in an accessibility mode.

36. The computing system of claim 27, wherein each of the plurality of application-specific affordances is selectable via one or more inputs at the touch-sensitive secondary display.

37. The computing system of claim 27, wherein the second housing also at least partially contains a physical keyboard.

38. The computing system of claim 27, wherein the second housing is not connected to the first housing.

39. The computing system of claim 38, wherein the second housing is part of a wearable computing device.

* * * * *